(12) United States Patent
Bansal-Mutalik et al.

(10) Patent No.: US 11,311,038 B2
(45) Date of Patent: Apr. 26, 2022

(54) FUNCTIONAL ADZUKI BEAN-DERIVED COMPOSITIONS

(71) Applicant: Hampton Creek, Inc., San Francisco, CA (US)

(72) Inventors: Ritu Bansal-Mutalik, Albany, CA (US); Siddharth Bhide, San Francisco, CA (US); Brenna Gibson, San Francisco, CA (US); Camilla Hall, San Jose, CA (US); Malgorzata Jakubasch, Laguna Nigel, CA (US); Jake Kleiner, Mill Valley, CA (US); Viviane Lanquar, Redwood City, CA (US); Swetha Mahadevan, Oakland, CA (US); Trevor Niekowal, Oakland, CA (US); Jade Proulx, Redwood City, CA (US); Ben Roche, San Francisco, CA (US); Meng Xu, Cupertino, CA (US); James Flatt, San Francisco, CA (US)

(73) Assignee: Eat JUST, Inc., San Francisco, CA (US)

( * ) Notice: Subject to any disclaimer, the term of this patent is extended or adjusted under 35 U.S.C. 154(b) by 0 days.

(21) Appl. No.: 15/436,724

(22) Filed: Feb. 17, 2017

(65) Prior Publication Data
US 2017/0265505 A1    Sep. 21, 2017

Related U.S. Application Data

(60) Provisional application No. 62/440,723, filed on Dec. 30, 2016, provisional application No. 62/297,788, filed on Feb. 19, 2016.

(51) Int. Cl.
| | | |
|---|---|---|
| *A23L 11/00* | (2021.01) | |
| *A23L 11/50* | (2021.01) | |
| *A23L 13/40* | (2016.01) | |
| *A23J 3/22* | (2006.01) | |
| *A23J 1/14* | (2006.01) | |
| *A23L 7/109* | (2016.01) | |
| *A23L 2/66* | (2006.01) | |
| *A23L 27/00* | (2016.01) | |
| *A23L 33/105* | (2016.01) | |
| *A23L 15/00* | (2016.01) | |
| *A21D 13/40* | (2017.01) | |
| *A21D 10/00* | (2006.01) | |
| *A23C 11/06* | (2006.01) | |
| *A23C 19/076* | (2006.01) | |
| *A23G 9/38* | (2006.01) | |
| *A23L 2/52* | (2006.01) | |

(52) U.S. Cl.
CPC ............ *A23L 11/50* (2021.01); *A21D 10/002* (2013.01); *A21D 13/40* (2017.01); *A23C 11/06* (2013.01); *A23C 19/076* (2013.01); *A23G 9/38* (2013.01); *A23J 1/14* (2013.01); *A23J 3/227* (2013.01); *A23L 2/52* (2013.01); *A23L 2/66* (2013.01); *A23L 7/109* (2016.08); *A23L 13/426* (2016.08); *A23L 15/35* (2016.08); *A23L 27/80* (2016.08); *A23L 33/105* (2016.08); *A23V 2002/00* (2013.01)

(58) Field of Classification Search
CPC . A23L 15/35; A23L 2/52; A23L 11/50; A23L 27/80; A23L 33/105; A21D 13/40; A21D 10/002; A23C 11/06; A23C 19/076; A23G 9/38; A23V 2002/00
USPC .......................................................... 426/46
See application file for complete search history.

(56) References Cited

U.S. PATENT DOCUMENTS

| | | | | |
|---|---|---|---|---|
| 3,966,702 A | * | 6/1976 | Carey ....................... | A23J 1/14 530/378 |
| 2007/0054031 A1 | * | 3/2007 | Liu ........................ | A23J 1/006 426/634 |
| 2013/0052304 A1 | * | 2/2013 | Li ............................ | A23J 1/12 426/74 |
| 2015/0313269 A1 | * | 11/2015 | Rodriguez .............. | A23P 30/20 426/602 |

FOREIGN PATENT DOCUMENTS

| | | |
|---|---|---|
| CN | 101703147 | 5/2010 |
| CN | 103743869 | 4/2014 |
| EP | 2 984 938 A1 | 2/2016 |

(Continued)

OTHER PUBLICATIONS

Fukuda, T. et al. 2007. J. Agric. Food Chem. 55: 3667-3674 (Year: 2007).*

(Continued)

*Primary Examiner* — Hamid R Badr
(74) *Attorney, Agent, or Firm* — Squire Patton Boggs (US) LLP

(57) ABSTRACT

Provided herein are methods for producing an adzuki bean protein isolate having high functionality for a broad range of food applications. In some embodiments, the methods for producing the isolate comprise one or more steps selected from: (a) extracting one or more adzuki bean proteins from an adzuki bean protein source in an aqueous solution, for example, at a pH between about 6.5-10.0; (b) purifying protein from the extract using at least one of two methods: (i) precipitating protein from the extract at a pH near the isoelectric point of a globulin-rich fraction, for example a pH between about 5.0-6.0; and/or (ii) fractionating and concentrating protein from the extract using filtration such as microfiltration, ultrafiltration or ion-exchange chromatography; and (c) recovering purified protein isolate.

24 Claims, 15 Drawing Sheets

Specification includes a Sequence Listing.

(56) References Cited

FOREIGN PATENT DOCUMENTS

| WO | WO 03/017777 A1 | 3/2003 |
|---|---|---|
| WO | WO 2013/067453 | 5/2013 |

OTHER PUBLICATIONS

Tjamjadi, C. et al. J. Food Sci. 53: 1438-1443 (1988) (Year: 1988).*
Meng, G. T. et al. Food Chem. 73: 453-460 (2001) (Year: 2001).*
Barac, M. B. et al. J. Food Sci Technol. 52: 2779-2787 (Year: 2015).*
Barac et al., "Comparative study of the functional properties of three legume seed isolates: adzuki, pea and soy bean", *Journal of Food Science and Technology, Springer (INDIA) Private LTD, INDIA*, Mar. 5, 2014, vol. 52, No. 5, pp. 2779-2787.
Ferreira et al., "Hypocholesterolaemic effect of rat-administered oral doses of the isolated 7S globulins from cowpeas and adzuki beans", *Journal of Nutritional Science*, (2015), vol. 4, e7, p. 1 of 9.
International Search Report and the Written Opinion of the International Searching Authority dated Jun. 7, 2017 for application No. PCT/US2017/018523, 14 pages.
Kagawa et al., "Soybean basic 7 S globulin represents a protein widely distributed in legume species", *FEBS Letters*, Dec. 1987, vol. 226, No. 1, pp. 145-149.
Meng et al., "Thermal properties of *Phaseolus angularis* (red bean) globulin", *Food Chemistry 73* (2001) pp. 453-460.
Tang et al., "Properties of cast films of vicilin-rich protein isolates from Phaseolus legumes: Influence of heat curing", *LWT—Food Science and Technology, Academic Press, United Kingdom*, Dec. 1, 2009, vol. 42, No. 10, pp. 1659-1666.
First (cover) page of the Chinese Patent Application for Invention No. 201780012329.1 dated Jun. 3, 2021.
Bo et al, "Optimization of protein extraction from adzuki bean residues by response surface methodology", vol. 33, No. 07, 2012, with English abstract; DOI:10.13386/j.issn1002-0306.2012.07.080.
Nie Li-Jie, "Physicochemical and Functional Roperties of Dehulled and Defatted Flours and Proteins From Different Legumes", Thesis for Master's Degree Northwest A&F University in 2013, Yangling Shaanxi China, with English abstract.

* cited by examiner

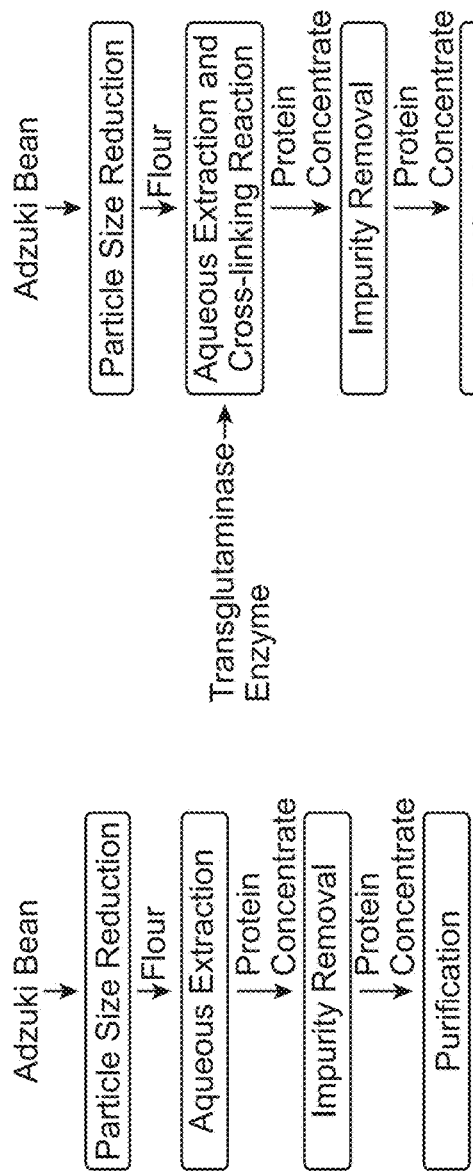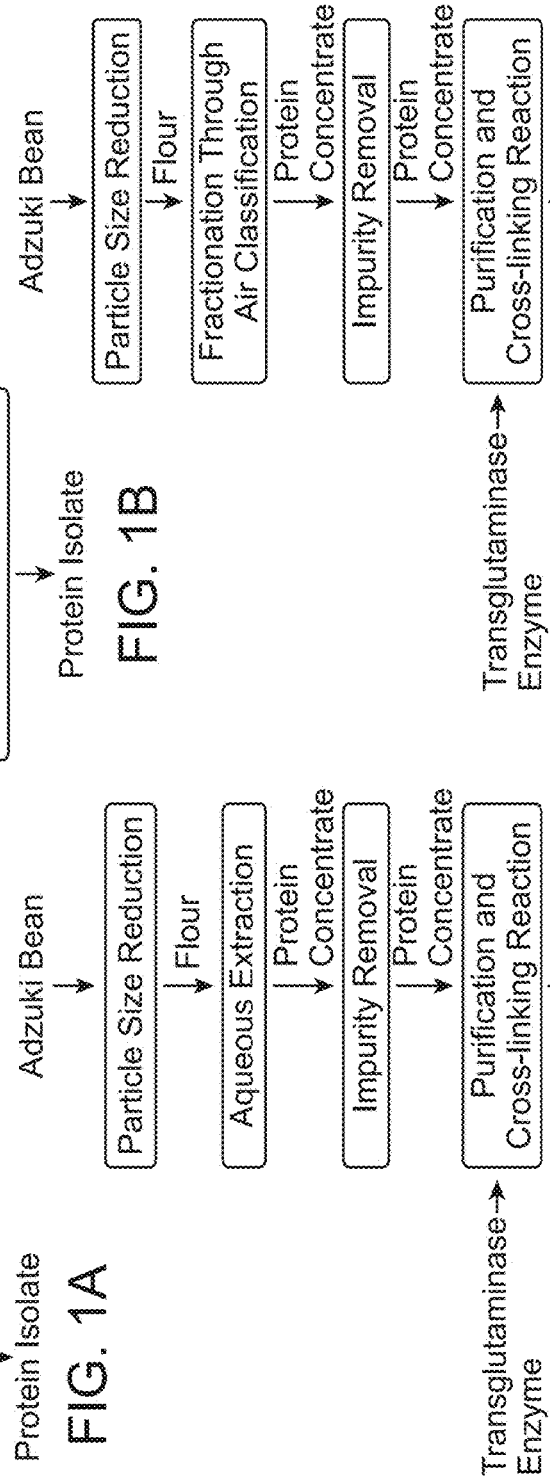

SEQUENCE LISTING

```
<160> NUMBER OF SEQ ID NOS: 6

<210> SEQ ID NO 1
<211> LENGTH: 503
<212> TYPE: PRT
<213> ORGANISM: Vigna angularis
<220> FEATURE:
<221> NAME/KEY: misc_feature
<223> OTHER INFORMATION: Vang06g13860.1

<400> SEQUENCE: 1

Met Ala Arg Pro Phe Thr Leu Ser Leu Leu Ser Leu Cys Leu Leu Leu
1               5                   10                  15
```

-continued

Ser Ala Trp Ser Cys Phe Gly Gly Ser Ser Thr Asn Arg Phe Asn
         20                  25                  30

Ile Cys Gln Leu Asn Ser Leu Asn Ala Leu Lys Pro Asp His Arg Val
         35                  40                  45

Glu Thr Asp Gly Gly Leu Val Glu Thr Trp Ser Ser Arg His Pro Glu
 50                  55                  60

Leu Glu Cys Ala Gly Val Thr Val Thr Arg Arg Thr Leu Tyr Arg Asn
65                  70                  75                  80

Gly Phe Gln Met Pro Ser Tyr Ser Pro Tyr Ser Gln Met Ile Met Ala
                 85                  90                  95

Ile Gln Gly Lys Gly Ala Leu Gly Leu Ala Leu Ser Gly Cys Ala Glu
             100                 105                 110

Thr Tyr Glu Glu Pro Ala Lys Glu Ser Ser Ser Ser Gln Lys Pro
         115                 120                 125

Ser Asp Ser His Gln Lys Ile Arg Gln Phe Asp Gln Gly His Val Met
         130                 135                 140

Leu Ile Pro Arg Gly Val Pro Phe Trp Ile Phe Asn Thr Gly Asp Glu
145                 150                 155                 160

Pro Leu Ile Thr Val Thr Leu Leu Asp Thr Ser Ser Glu Asp Asn Gln
                 165                 170                 175

Leu Asp Gln Ser Pro Arg Glu Phe Tyr Leu Ala Gly Asn Pro Asp Ile
             180                 185                 190

Glu His Pro Glu Ala Met Lys Glu Lys Gln Gln Gln Ala Glu Glu
         195                 200                 205

Glu Gly Gly Asn Val Leu Ser Gly Phe Gly Lys Arg Phe Leu Ala Arg
210                 215                 220

Ala Leu Asn Ile Asp Gln Asp Thr Ala Asn Lys Leu Ile Ser Pro Asp
225                 230                 235                 240

Asp Glu Met Lys Gln Ile Arg Lys Gln Trp Leu Asn Leu Thr Leu Met
                 245                 250                 255

Glu Ser Met Tyr Thr Lys Arg Gly Val Glu Glu Glu Asp Glu Ser Glu
             260                 265                 270

Asp Thr Lys Gly His Lys Thr Arg His Glu Lys Thr Arg His Glu Lys
         275                 280                 285

Ser Trp Lys Glu His Arg Pro Glu Gly Glu Asp Val Glu Lys Gly Glu
290                 295                 300

Ala His Glu Glu Trp Glu Thr Arg Pro Ser Lys Asp Lys Pro His Gly
305                 310                 315                 320

Ser Asn Gly Leu Asp Glu Thr Ile Cys Ser Ser Lys Leu Gln Phe Asn
                 325                 330                 335

Ile Ala Arg Pro Lys Gly Ala Asp Phe Tyr Asn Pro Lys Ala Gly Arg
             340                 345                 350

Ile Lys Asn Leu Asn Ser Gln Ser Leu Pro Ala Leu Gln His Phe Gly
         355                 360                 365

Leu Ser Ala Gln Tyr Val Val Leu Tyr Lys Asn Gly Ile Tyr Ser Pro
370                 375                 380

His Trp Asn Met Asp Ala Asn Ser Val Ile Tyr Val Ile Arg Gly Gln
385                 390                 395                 400

Gly Gln Val Arg Val Val Asn Asn Glu Gly Ile Val Met Phe Asp Asp
                 405                 410                 415

Glu Leu Lys Lys Gly Gln Leu Leu Val Val Pro Gln Asn Phe Met Val
             420                 425                 430

Ala Glu Glu Ala Gly Asp Gln Gly Phe Glu Tyr Val Val Phe Lys Thr

```
                     435                 440                 445

Asn Asp Asn Ala Val Thr Ser Tyr Leu Lys Glu Thr Phe Arg Ala Phe
            450                 455                 460

Pro Ala Glu Val Leu Val Asn Ile Tyr Lys Leu Lys His Ser Gln Val
465                 470                 475                 480

His Asp Leu Lys Tyr Asn Gly Asn Leu Gly Pro Leu Val Asn Pro Glu
                485                 490                 495

Asn Ser Leu Asp Gln Ser Ser
            500

<210> SEQ ID NO 2
<211> LENGTH: 403
<212> TYPE: PRT
<213> ORGANISM: Vigna angularis
<220> FEATURE:
<221> NAME/KEY: misc_feature
<223> OTHER INFORMATION: Vang06g05170.1

<400> SEQUENCE: 2

Met Met Arg Ala Arg Val Pro Leu Leu Leu Leu Gly Ile Leu Phe
1               5                   10                  15

Leu Ala Ser Leu Ser Val Ser Phe Gly Ile Val His Arg Glu His His
                20                  25                  30

Glu Ser Arg Glu Glu Val Ser Val Leu Ser Gly Lys Asn Asn Pro Phe
            35                  40                  45

Tyr Phe Asn Ser Asp Arg Trp Phe Arg Thr Leu Tyr Arg Asn Glu Leu
        50                  55                  60

Gly Arg Ile Arg Val Leu Gln Arg Phe Asp Gln Arg Ser Lys Gln Met
65                  70                  75                  80

Gln Asn Leu Glu Asn Tyr Arg Val Val Glu Phe Lys Ser Lys Pro Asn
                85                  90                  95

Thr Leu Leu Leu Pro His His Ala Asp Ala Asp Phe Leu Leu Val Val
            100                 105                 110

Leu Asn Gly Thr Ala Val Leu Thr Leu Asp Phe Phe Leu Ser Ser Thr
        115                 120                 125

Glu Ala Gln Gln Ser Tyr Leu Gln Gly Phe Ser Lys Asn Ile Leu Glu
    130                 135                 140

Ala Ser Phe Asp Ser Asp Ile Lys Glu Ile Asn Arg Val Leu Phe Gly
145                 150                 155                 160

Glu Glu Gly Gln Gln Gln Gly Glu Ser Gln Gln Glu Gly Val
                165                 170                 175

Phe Val Glu Leu Lys Arg Glu Gln Ile Glu Leu Thr Lys His Ala
            180                 185                 190

Lys Ser Ser Lys Lys Ser Leu Ser Ser Glu Asp Glu Pro Phe Asn
        195                 200                 205

Leu Arg Asn Gln Lys Pro Ile Tyr Ser Asn Lys Phe Gly Lys Leu Tyr
    210                 215                 220

Glu Ile Thr Pro Glu Lys Asn Pro Gln Leu Lys Asp Leu Asp Val Phe
225                 230                 235                 240

Leu Ser Ser Val Asp Met Lys Glu Gly Ser Leu Leu Leu Pro His Tyr
                245                 250                 255

Asn Ser Lys Ala Met Val Ile Leu Val Ile Asn Glu Gly Lys Ala Asn
            260                 265                 270

Ile Glu Leu Val Gly Leu Arg Glu Gln Glu Gln Gln Gln Gln Glu Gln
        275                 280                 285
```

-continued

```
Gln Glu Glu Met Leu Glu Val Gln Arg Tyr Arg Ala Lys Val Ser Lys
        290                 295                 300

His Asp Val Phe Val Ile Pro Ala Ala Tyr Pro Val Ala Ile Asn Ala
305                 310                 315                 320

Thr Ser Asn Leu Asn Phe Phe Ala Phe Gly Ile Asn Ala Glu Asn Asn
                325                 330                 335

Gln Arg Asn Phe Leu Ala Gly Glu Lys Asp Asn Val Ile Ser Glu Ile
            340                 345                 350

Pro Thr Glu Val Leu Asp Leu Ala Phe Pro Ala Pro Gly Glu Lys Val
        355                 360                 365

Glu Lys Leu Ile Glu Lys Gln Thr Gly Ser His Phe Val Asp Ala Gln
370                 375                 380

Pro Glu Glu Gln Gln Arg Glu Glu Gly Pro Lys Gly Arg Lys Val His
385                 390                 395                 400

Phe Val Tyr

<210> SEQ ID NO 3
<211> LENGTH: 424
<212> TYPE: PRT
<213> ORGANISM: Vigna angularis
<220> FEATURE:
<221> NAME/KEY: misc_feature
<223> OTHER INFORMATION: Vang03g11940.2

<400> SEQUENCE: 3

Met Ala Ser Ile Leu Tyr Phe Leu Val Leu Ser Leu Cys Ser Phe
1               5                   10                  15

Leu Phe Ser Leu Ser Glu Ser Asn Tyr Val Met Asn Pro Ala Tyr Leu
            20                  25                  30

Leu Val Leu Pro Thr Gln Lys Asp Ala Ser Thr Gly Leu His Trp Thr
        35                  40                  45

Asn Leu Leu Lys Arg Thr Pro Leu Thr Gln Val Pro Val Leu Val Asp
    50                  55                  60

Leu Asn Gly Asn Gln Val Trp Leu Asn Cys Glu Gln His Tyr Ser Ser
65                  70                  75                  80

Lys Thr Tyr Glu Ala Pro Phe Cys His Ser Ala Gln Cys Phe Arg Ala
                85                  90                  95

Asn Thr Asn Gln Cys Leu Ser Cys Pro Ala Ala Ser Arg Pro Gly Cys
            100                 105                 110

His Lys Asn Thr Cys Gly Leu Met Ser Thr Asn Pro Val Thr Gln Gln
        115                 120                 125

Asn Gly Leu Gly Glu Leu Gly Gln Asp Val Leu Ala Ile His Ile Ser
    130                 135                 140

Leu Gly Thr Gln Leu Gly Glu Leu Phe Thr Val Pro Gln Phe Leu Phe
145                 150                 155                 160

Ser Cys Ala Pro Ser Phe Leu Leu Gln Lys Gly Leu Pro Arg Asn Ile
                165                 170                 175

Glu Gly Val Ala Gly Leu Gly His Ala Pro Ile Ser Leu Pro Asn Gln
            180                 185                 190

Leu Ala Ser His Phe Gly Leu Gln Arg Gln Phe Thr Thr Cys Leu Ser
        195                 200                 205

Arg Tyr Ser Ser Ser Lys Gly Ala Ile Ile Phe Gly Asp Ala Pro
    210                 215                 220

Asn Asn Leu Arg Glu Phe His Gly His Ala Ile Phe His Asp Leu Ala
225                 230                 235                 240
```

Tyr Thr Pro Leu Thr Ile Thr Pro Gln Gly Glu Tyr Asn Val Arg Val
             245                 250                 255

Asn Ser Ile Arg Ile Asn Gln Tyr Ser Val Thr Pro Ser Lys Ile
         260                 265                 270

Ser Ser Thr Thr Val Gly His Ser Gly Gly Thr Met Ile Ser Thr Ser
             275                 280                 285

Thr Pro His Met Val Leu Gln Gln Ser Leu Tyr Met Ser Phe Val Gln
         290                 295                 300

Val Phe Ala Gln Gln Leu Pro Lys Gln Ala Gln Val Lys Ala Val Ala
305                 310                 315                 320

Pro Phe Glu Leu Cys Phe His Ser Lys Asn Ile Ser Glu Tyr Pro Ser
                 325                 330                 335

Val Glu Leu Val Met Glu Lys Pro Asn Gly Pro Val Trp Arg Ile Ser
             340                 345                 350

Gly Glu Asp Leu Thr Val Gln Thr Gln Pro Gly Val Ser Cys Leu Ala
         355                 360                 365

Val Val Asn Gly Gly Met Gln Pro Ser Ala Glu Ile Thr Ile Gly Ala
370                 375                 380

Arg Gln Leu Glu Glu Asn Leu Val Val Phe Asp Leu Ala Lys Ser Arg
385                 390                 395                 400

Val Gly Phe Ser Thr Ser Pro Leu Ser Ser Leu Gly Val Lys Cys Gly
                 405                 410                 415

Asp Leu Phe Asn Phe Val Asn Ala
         420

<210> SEQ ID NO 4
<211> LENGTH: 770
<212> TYPE: PRT
<213> ORGANISM: Vigna angularis
<220> FEATURE:
<221> NAME/KEY: misc_feature
<223> OTHER INFORMATION: Vang0032ss01820.1

<400> SEQUENCE: 4

Met Lys Val Leu Leu Glu Ile Leu Lys Val Gln Glu Thr Arg Pro His
1               5                   10                  15

Val His Ala Pro Gly Glu Glu Lys Val Met Thr Arg Lys Gln Lys
             20                  25                  30

Ala Glu Ser Lys Ala His Glu Val Glu His Ser Pro Lys Lys Ala Lys
         35                  40                  45

Val Glu Asn Glu Asp Gly His Val Asn Gly Lys Thr Val Ala Asp Val
     50                  55                  60

Ala Glu Glu Tyr Asp Glu Phe Cys Lys Ala Thr Ser Glu His Leu Pro
65                  70                  75                  80

Leu Glu Gln Met Lys Glu Ile Leu Glu Ala Asn Gly Leu Asp Ser Ser
                 85                  90                  95

Gly Thr Asp Leu Glu Ile Thr Arg Arg Cys Gln Asp Leu Leu Phe Tyr
             100                 105                 110

Gly Pro Leu Asp Lys Cys Ser Val Cys Asn Gly Ser Leu Glu Phe Asp
         115                 120                 125

Gly Arg Arg Tyr Val Cys Arg Gly Phe Tyr Ser Glu Trp Ala Ser Cys
     130                 135                 140

Ile Phe Ser Thr Arg Asn Pro Pro Arg Lys Gln Glu Pro Ile Lys Leu
145                 150                 155                 160

Pro Asp Ser Leu Gln Asn Ser Val Pro Ser Asp Leu Leu Lys Lys Tyr
                 165                 170                 175

```
Gln Asp Pro Ser His Arg Pro His Arg Asp Leu Gly Leu Ala Glu Lys
                180                 185                 190

Pro Phe Thr Gly Met Met Ile Ser Leu Met Gly Arg Leu Thr Arg Thr
            195                 200                 205

His His Tyr Trp Lys Thr Val Ile Glu Lys Gln Gly Gly Lys Val Ala
210                 215                 220

Asn Ser Ile Leu Gly Ala Thr Cys Leu Val Ala Ser Pro Ala Glu Arg
225                 230                 235                 240

Glu Arg Gly Gly Thr Ser Lys Leu Ala Glu Ala Met Glu Arg Ser Ile
                245                 250                 255

Pro Val Val Arg Glu Ala Trp Leu Val Asp Ser Ile Glu Lys Gln Glu
            260                 265                 270

Pro Gln Pro Leu Glu Ala Tyr Asp Leu Val Ser Asp Leu Ser Val Asp
        275                 280                 285

Gly Lys Gly Ile Pro Trp Asp Lys Gln Asp Pro Gly Glu Glu Ala Ile
    290                 295                 300

Glu Ser Leu Ser Ala Glu Leu Lys Leu Tyr Gly Lys Arg Gly Val Tyr
305                 310                 315                 320

Lys Asp Thr Lys Leu Gln Glu Gln Gly Gly Lys Ile Phe Glu Lys Asp
                325                 330                 335

Gly Ile Leu Tyr Asn Cys Ala Phe Ser Leu Cys Asp Gln Gly Arg Gly
            340                 345                 350

Leu Asn Asp Tyr Cys Ile Met Gln Leu Ile Val Val Pro Glu Asn Arg
        355                 360                 365

Leu His Met Tyr Phe Lys Lys Gly Arg Val Gly Asp Asp Pro Asn Ala
    370                 375                 380

Glu Glu Arg Leu Glu Glu Trp Asp Asn Glu Gly Ser Cys Leu Lys Glu
385                 390                 395                 400

Phe Ala Arg Leu Phe Glu Glu Ile Thr Gly Asn Glu Phe Glu Pro Trp
                405                 410                 415

Glu Arg Glu Lys Lys Phe Gln Lys Lys Pro Leu Lys Phe Tyr Pro Ile
            420                 425                 430

Asp Met Asp Asp Gly Val Glu Val Arg His Gly Ala Leu Gly Leu Arg
        435                 440                 445

Gln Leu Gly Ile Ala Val Thr His Cys Lys Leu Glu Pro Leu Val Ala
    450                 455                 460

Asn Phe Met Lys Val Leu Cys Ser Lys Glu Ile Tyr Lys Tyr Ala Leu
465                 470                 475                 480

Met Glu Met Gly Tyr Asp Ser Pro Asp Leu Pro Ile Gly Met Val Thr
                485                 490                 495

Asn Leu His Leu Lys Arg Cys Glu Asp Val Leu Leu Glu Phe Ile Gly
            500                 505                 510

Lys Val Lys Ser Leu Lys Glu Thr Gly Pro Lys Ala Glu Ala Val Trp
        515                 520                 525

Thr Asp Phe Ser Gln Arg Trp Phe Thr Leu Met His Ser Thr Arg Pro
    530                 535                 540

Phe Asn Phe Arg Asp Tyr Gln Glu Ile Ala Asp His Ala Ala Ala Ala
545                 550                 555                 560

Leu Glu Gly Ala Arg Asp Ile Thr Leu Ala Ser His Leu Ile Gly Asp
                565                 570                 575

Met Thr Gly Ser Thr Ile Asp Asp Pro Leu Ser Glu Tyr Lys Lys
            580                 585                 590
```

```
Leu Gly Cys Ser Ile Thr Pro Leu Asp Lys Ser Ser Asn Asp Tyr Gln
            595                 600                 605

Met Ile Val Lys Tyr Leu Glu Asn Thr Tyr Glu Pro Val Lys Val Gly
610                 615                 620

Asp Ile Glu Tyr Gly Val Ser Val Glu Asn Ile Phe Ser Val Gln Thr
625                 630                 635                 640

Gly Gly Cys Pro Ser Tyr Glu Asp Ile Val Lys Leu Pro Asn Lys Val
                645                 650                 655

Leu Leu Trp Cys Gly Lys Ile Leu Lys His Phe Leu Lys Ile Glu Arg
            660                 665                 670

Thr Arg Ser Ser Asn Leu Leu Arg His Leu His Lys Gly Phe Leu Glu
        675                 680                 685

Ala Ile Cys Ser Leu Pro Val Pro Gly Tyr Met Phe Gly Lys Ala Ile
690                 695                 700

Val Cys Ser Asp Ala Ala Ala Glu Ala Ala Arg Tyr Asp Asp Ile Lys
705                 710                 715                 720

Val Pro Cys Gly Lys Leu Val Ala Ser Asp His Gln Asp Ser Pro Leu
                725                 730                 735

Glu Tyr Asn Glu Tyr Ala Val Tyr Asp Pro Lys Gln Ala Arg Ile Ser
            740                 745                 750

Tyr Leu Val Gly Val Lys Tyr Glu Glu Lys Gly Val Glu Ile Asp Thr
        755                 760                 765

Ala Glu
    770

<210> SEQ ID NO 5
<211> LENGTH: 736
<212> TYPE: PRT
<213> ORGANISM: Vigna angularis
<220> FEATURE:
<221> NAME/KEY: misc_feature
<223> OTHER INFORMATION: Vang02g13530.1

<400> SEQUENCE: 5

Met Ala Met Lys Ser Ala Ala Ser Ser Ala Ile Arg Ser Leu Leu Ser
1               5                   10                  15

Ser Ser Ser Ser Thr Phe Ser Arg Asn Leu His Ala Pro Ala Glu Arg
            20                  25                  30

Lys Lys Ile Val Gly Val Phe Tyr Lys Gly Gly Glu Tyr Ala Lys Leu
        35                  40                  45

Asn Pro Asn Phe Val Gly Cys Val Glu Gly Ala Leu Gly Ile Arg Glu
    50                  55                  60

Trp Leu Glu Ser Leu Gly His Gln Tyr Ile Val Thr Asp Asp Lys Glu
65                  70                  75                  80

Gly Ser Asn Ser Glu Leu Asp Lys His Leu His Asp Ala His Ile Ile
            85                  90                  95

Ile Ser Thr Pro Phe His Pro Ala Tyr Val Thr Ala Glu Arg Ile Lys
        100                 105                 110

Lys Ala Lys Asn Leu Glu Leu Leu Leu Thr Ala Gly Ile Gly Ser Asp
    115                 120                 125

His Val Asp Leu Lys Ala Ala Ala Ala Ala Gly Leu Thr Val Ala Glu
130                 135                 140

Val Thr Gly Ser Asn Val Val Ser Val Ala Glu Asp Glu Leu Leu Arg
145                 150                 155                 160

Ile Leu Val Leu Val Arg Asn Phe Leu Pro Gly Tyr His Gln Ala Val
            165                 170                 175
```

```
Asn Gly Glu Trp Asn Val Ala Gly Ile Ala His Arg Ala Tyr Asp Leu
            180                 185                 190

Glu Gly Lys Thr Ile Gly Thr Val Gly Ala Gly Arg Ile Gly Lys Leu
        195                 200                 205

Leu Leu Gln Arg Leu Lys Pro Phe Asn Cys Asn Leu Leu Tyr Tyr Asp
    210                 215                 220

Arg Leu Arg Met Asn Pro Glu Leu Glu Lys Glu Ile Gly Ala Lys Phe
225                 230                 235                 240

Glu Glu Glu Leu Asp Ala Met Leu Pro Lys Cys Asp Val Ile Val Ile
                245                 250                 255

Asn Met Pro Leu Thr Glu Gln Thr Arg Gly Leu Phe Asp Lys Asn Arg
            260                 265                 270

Ile Ala Lys Cys Lys Lys Gly Val Val Ile Val Asn Asn Ala Arg Gly
        275                 280                 285

Ala Ile Met Asp Thr Gln Ala Ile Ala Asp Ala Cys Thr Ser Gly His
    290                 295                 300

Val Ala Gly Tyr Gly Gly Asp Val Trp Pro Val Gln Pro Ala Pro Lys
305                 310                 315                 320

Asp His Pro Trp Arg Phe Met Pro Asn His Ala Met Thr Pro His Ile
                325                 330                 335

Ser Gly Thr Thr Ile Asp Ala Gln Leu Arg Tyr Ala Ala Gly Val Lys
            340                 345                 350

Asp Ile Gln Ile Ile Met Ala Met Lys Arg Ala Val Gly Ser Ser Ala
        355                 360                 365

Ile Arg Ser Leu Phe Ser Ser Thr Phe Phe Arg Asn Leu His Val Ser
    370                 375                 380

Gly Glu Lys Lys Lys Ile Val Gly Val Phe Tyr Lys Gly Asn Glu Tyr
385                 390                 395                 400

Ala Lys Leu Asn Pro Asp Phe Val Gly Cys Val Glu Gly Ala Leu Gly
                405                 410                 415

Ile Arg Gln Trp Leu Glu Ser Gln Gly His Gln Tyr Ile Val Thr Asp
            420                 425                 430

Asp Lys Glu Gly Pro Asp Ser Glu Leu Glu Arg Asn Leu Tyr Asp Ala
        435                 440                 445

His Val Ile Ile Ser Thr Pro Phe His Pro Ala Tyr Val Thr Ala Glu
    450                 455                 460

Arg Ile Lys Lys Ala Lys Asn Leu Glu Leu Leu Leu Thr Ala Gly Ile
465                 470                 475                 480

Gly Ser Asp His Ile Asp Leu Lys Ala Ala Ala Ala Ala Gly Ile Thr
                485                 490                 495

Val Ala Glu Val Thr Gly Ser Asn Val Val Ser Val Ala Glu Asp Glu
            500                 505                 510

Leu Met Arg Ile Leu Ile Leu Ile Arg Asn Phe Leu Pro Gly Tyr His
        515                 520                 525

Gln Ser Val Asn Gly Glu Trp Asn Val Ala Gly Ile Ala His Arg Ala
    530                 535                 540

Tyr Asp Leu Glu Gly Lys Thr Val Gly Thr Val Gly Ala Gly Arg Ile
545                 550                 555                 560

Gly Lys Leu Leu Leu Gln Arg Leu Lys Pro Phe Asn Cys Asn Leu Leu
                565                 570                 575

Tyr Phe Asp Arg Ile Arg Met Asp Leu Gly Leu Glu Lys Glu Ile Gly
            580                 585                 590
```

```
Ala Lys Phe Glu Glu Asp Leu Asp Ala Met Leu Pro Lys Cys Asp Val
            595                 600                 605

Ile Val Ile Asn Thr Pro Leu Thr Glu Gln Thr Arg Gly Leu Phe Asp
        610                 615                 620

Lys Asp Lys Ile Ser Lys Cys Lys Lys Gly Val Leu Ile Val Asn Asn
625                 630                 635                 640

Ala Arg Gly Ala Ile Met Asp Thr Gln Ala Val Ala Asp Ala Cys Ser
                645                 650                 655

Asn Gly His Val Ala Gly Tyr Ser Gly Asp Val Trp Phe Pro Gln Pro
            660                 665                 670

Ala Pro Lys Asp His Pro Trp Arg Tyr Met Pro Asn His Ala Met Thr
        675                 680                 685

Pro His Val Ser Gly Thr Thr Ile Asp Ala Gln Leu Arg Tyr Ala Ala
        690                 695                 700

Gly Val Lys Asp Met Leu Asp Arg His Phe Arg Gly Glu Asp Phe Pro
705                 710                 715                 720

Glu Gln Asn Tyr Ile Val Lys Glu Gly Gln Leu Ala Ser Gln Tyr Arg
                725                 730                 735

<210> SEQ ID NO 6
<211> LENGTH: 489
<212> TYPE: PRT
<213> ORGANISM: Vigna angularis
<220> FEATURE:
<221> NAME/KEY: misc_feature
<223> OTHER INFORMATION: Vang0053ss00110.1

<400> SEQUENCE: 6

Met Asp Ala Lys Ala Thr Tyr Lys Met Thr Met Thr Glu Asp Val Val
1               5                   10                  15

Val Glu Asn Ala Ser Asp Glu Ala Thr Arg Ser Val Ser Leu Arg
            20                  25                  30

Leu Arg Ile Pro Asn Asp Trp Pro Ser Leu Leu Ala Lys Glu Lys Val
        35                  40                  45

His Ile Asn Ile Val Val Ile Gly His Val Asp Ser Gly Lys Ser Thr
    50                  55                  60

Thr Thr Gly His Leu Ile Tyr Lys Leu Gly Gly Ile Asp Lys Arg Val
65                  70                  75                  80

Ile Glu Arg Phe Glu Lys Glu Ala Ala Glu Met Asn Lys Arg Ser Phe
                85                  90                  95

Lys Tyr Ala Trp Val Leu Asp Lys Leu Lys Ala Glu Arg Glu Arg Gly
            100                 105                 110

Ile Thr Ile Asp Ile Ala Leu Trp Lys Phe Glu Thr Thr Lys Tyr Tyr
        115                 120                 125

Cys Thr Val Ile Asp Ala Pro Gly His Arg Asp Phe Ile Lys Asn Met
    130                 135                 140

Ile Thr Gly Thr Ser Gln Ala Asp Cys Ala Val Leu Ile Ile Asp Ser
145                 150                 155                 160

Thr Thr Gly Gly Phe Glu Ala Gly Ile Ser Lys Asp Gly Gln Thr Arg
                165                 170                 175

Glu His Ala Leu Leu Ala Phe Thr Leu Gly Val Lys Gln Met Ile Cys
            180                 185                 190

Cys Cys Asn Lys Met Asp Ala Thr Thr Pro Lys Tyr Ser Lys Ala Arg
        195                 200                 205

Tyr Asp Glu Ile Val Lys Glu Val Ser Ser Tyr Leu Lys Lys Val Gly
    210                 215                 220
```

-continued

```
Tyr Asn Pro Asp Lys Ile Pro Phe Val Pro Ile Ser Gly Phe Glu Gly
225                 230             235                 240

Asp Asn Met Ile Glu Arg Ser Thr Asn Leu Asp Trp Tyr Lys Gly Pro
            245             250                 255

Thr Leu Leu Glu Ala Leu Asp Gln Ile Asn Glu Pro Lys Arg Pro Ser
        260             265                 270

Asp Lys Pro Leu Arg Leu Pro Leu Gln Asp Val Tyr Lys Ile Gly Gly
    275             280                 285

Ile Gly Thr Val Pro Val Gly Arg Val Glu Thr Gly Val Leu Lys Pro
    290             295             300

Gly Met Val Val Thr Phe Ala Pro Thr Gly Leu Thr Thr Glu Val Lys
305             310             315                 320

Ser Val Glu Met His His Glu Ala Leu Gln Glu Ala Leu Pro Gly Asp
            325             330             335

Asn Val Gly Phe Asn Val Lys Asn Val Ala Val Lys Asp Leu Lys Arg
            340             345             350

Gly Phe Val Ala Ser Asn Ser Lys Asp Pro Ala Lys Glu Ala Ala
    355             360             365

Asn Phe Thr Ser Gln Val Ile Ile Met Asn His Pro Gly Gln Ile Gly
    370             375             380

Asn Gly Tyr Ala Pro Val Leu Asp Cys His Thr Ser His Ile Ala Val
385             390             395             400

Lys Phe Ala Glu Leu Val Thr Lys Ile Asp Arg Arg Ser Gly Lys Glu
            405             410             415

Leu Glu Lys Glu Pro Lys Phe Leu Asn Gly Asp Ala Gly Tyr Val
            420         425             430

Lys Met Ile Pro Thr Lys Pro Met Val Val Glu Thr Phe Ser Glu Tyr
        435             440             445

Pro Pro Leu Gly Arg Phe Ala Val Arg Asp Met Arg Gln Thr Val Ala
    450             455             460

Val Gly Val Ile Lys Ser Val Glu Lys Lys Asp Pro Ser Gly Ala Lys
465             470             475             480

Val Thr Lys Ala Ala Gln Lys Lys Lys
                485
```

FUNCTIONAL ADZUKI BEAN-DERIVED COMPOSITIONS

1. CROSS REFERENCE TO RELATED APPLICATIONS

This application claims priority to U.S. Provisional Application No. 62/297,788, entitled "Plant Protein Isolates, Methods and Compositions," filed Feb. 19, 2016, and U.S. Provisional Application No. 62/440,723, entitled "Adzuki Bean Protein Isolates," filed Dec. 30, 2016, each of which is hereby incorporated by reference.

2. FIELD OF THE INVENTION

The present disclosure relates to adzuki bean protein isolate compositions, methods for producing such compositions, and food products derivable from such compositions.

3. BACKGROUND

Conventional methods and processes used for extracting legume protein isolates and concentrates include alkaline extraction and acid precipitation or ultrafiltration (wet process) and air classification (dry process). The quality of the legume protein compositions produced by these methods is directly dependent on the operating conditions used to prepare them. Application of an acidic, alkaline or neutral extraction process directly influences functional properties, e.g., the foaming or emulsifying properties of the protein compositions obtained, which makes the resulting protein compositions unsuitable for certain applications. It may therefore be necessary to modify the protein compositions so as to confer desired properties in the context of food applications.

Use of plant-based proteins such as soy and pea as animal protein substitutes have garnered increasing attention largely as consumers seek alternatives to conventional animal-based products, however, replicating functional properties while removing off-flavors are still challenges that need to be addressed.

What is needed, therefore, is a method and composition for producing purified plant protein isolates that exhibit one or more desired functional properties including replicating one or more desired organoleptic properties suitable for various applications. Disclosed herein are methods addressing the limitations of the current art.

4. SUMMARY OF THE INVENTION

Described herein are methods and compositions for producing a purified adzuki bean protein isolate. In some embodiments, the adzuki bean protein isolate comprises adzuki bean protein content of at least 60% by weight. In some embodiments, the adzuki bean protein isolate comprises a reduced oxidative enzyme activity relative to an otherwise unmodified source of the adzuki bean protein. In some embodiments, adzuki bean protein isolate comprises one or more modulated organoleptic properties that differ from the otherwise unmodified source of the adzuki bean protein.

Also provided herein are methods for producing an adzuki bean protein isolate having high functionality for a broad range of food applications. In some embodiments, the methods for producing the isolate comprise one or more steps selected from:

(a) Extracting one or more adzuki bean proteins from an adzuki bean protein source in an aqueous solution. In some embodiments, the extraction is performed at a pH between about 6.5-10.0.

(b) Purifying protein from the extract using at least one of two methods:

(i) precipitating protein from the extract at a pH near the isoelectric point of a globulin-rich fraction, for example a pH between about 5.0-6.0; and/or (ii) fractionating and concentrating protein from the extract using filtration such as microfiltration, ultrafiltration or ion-exchange chromatography.

(c) Recovering purified protein isolate.

In particular embodiments, the extraction is performed at a pH of about 7.0. In other particular embodiments, the isoelectric precipitation of adzuki bean protein is performed at pH 5.6+/−0.2.

Also disclosed is a process to produce an edible adzuki bean protein isolate from a source of an adzuki bean protein, the process comprising: subjecting the source of the adzuki bean protein to a fractionation process to obtain a protein-rich fraction, wherein at least 50% by weight of the protein-rich fraction comprises or consists of one or more globulin-type proteins; reducing at least one impurity, the at least one impurity associated with an off-odor or an off-flavor in the edible adzuki bean protein isolate; and purifying the protein-rich fraction to obtain the edible adzuki bean protein isolate, wherein: at least 60% by weight of the edible protein isolate is adzuki bean protein, an oxidative enzymatic activity of the edible protein isolate is lower than a corresponding oxidative enzymatic activity of the source of the adzuki bean protein, and an organoleptic property of the edible protein isolate differs from a corresponding organoleptic property of the source of the adzuki bean protein.

In accordance with preferred aspects of the present invention, methods and compositions for egg replacement are provided, said composition comprising a plant-based protein isolate modified by transglutaminase; wherein said composition is essentially egg-free and, wherein said composition comprises one or more functional properties of a natural egg. Preferably, composition comprises emulsifying properties of a natural egg. More preferably, the composition provides plant-based protein isolate modified by 0.0001% to 0.0125% transglutaminase and exhibits significantly reduced activity lipoxygenase or other enzymes that can oxidize lipids.

In certain aspects, the methods and compositions described herein provide purified protein isolates having modulated organoleptic properties of one or more of the following characteristics: astringent, beany, bitter, burnt, buttery, nutty, sweet, sour, fruity, floral, woody, earthy, beany, spicy, metallic, sweet, musty, grassy, green, oily, vinegary, neutral and bland flavor or aromas. Preferably, the purified protein isolates exhibit modulated organoleptic properties such as a reduction or absence in one or more of the following: astringent, beany, bitter, burnt, buttery, nutty, sweet, sour, fruity, floral, woody, earthy, beany, spicy, metallic, sweet, musty, grassy, green, oily, vinegary neutral and bland flavor or aromas.

The purified protein isolates are suitable for various food applications and have been incorporated into, e.g., edible egg-free emulsion, egg analog, egg-free scrambled eggs, egg-free patty, egg-free pound cake, egg-free angel food cake, egg-free yellow cake, egg- and dairy-free cream cheese, egg-free pasta dough, egg-free custard, egg-free ice cream, and dairy-free milk. The purified protein isolates are also suitable for use as plant-based analogs for cream cheese, pasta dough, pasta, milk or milk-like beverage, a food product comprising said milk or milk-like beverage, custard, ice cream, frozen desert, meat replicas (e.g., deli meat replicas; emulsified extruded meats (e.g., sausages, fish cake replicas); dips, fillings and spreads, chips, and crackers. Other applications are also suitable for the functional adzuki bean protein isolates described herein, and the foregoing list is non-limiting.

5. BRIEF DESCRIPTION OF THE FIGURES

FIG. 1A depicts a general process diagram for adzuki bean protein isolation in accordance with the methods described herein.

FIG. 1B depicts a general process diagram for protein isolation using transglutaminase in the aqueous extraction step.

FIG. 1C depicts a general process diagram for protein isolation using transglutaminase in the purification step.

FIG. 1D depicts a general process diagram for dry-fractionation protein isolation using transglutaminase in the purification step.

Figure 2:
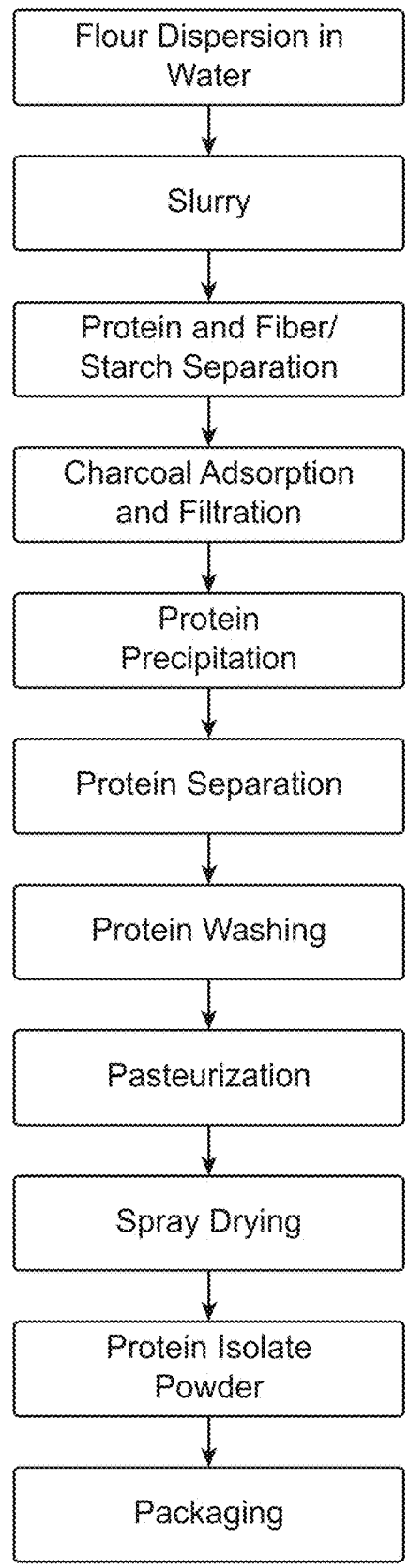

FIG. 2 provides one embodiment of a process for preparation of protein isolate in accordance with the methods provided herein.

Figure 3:
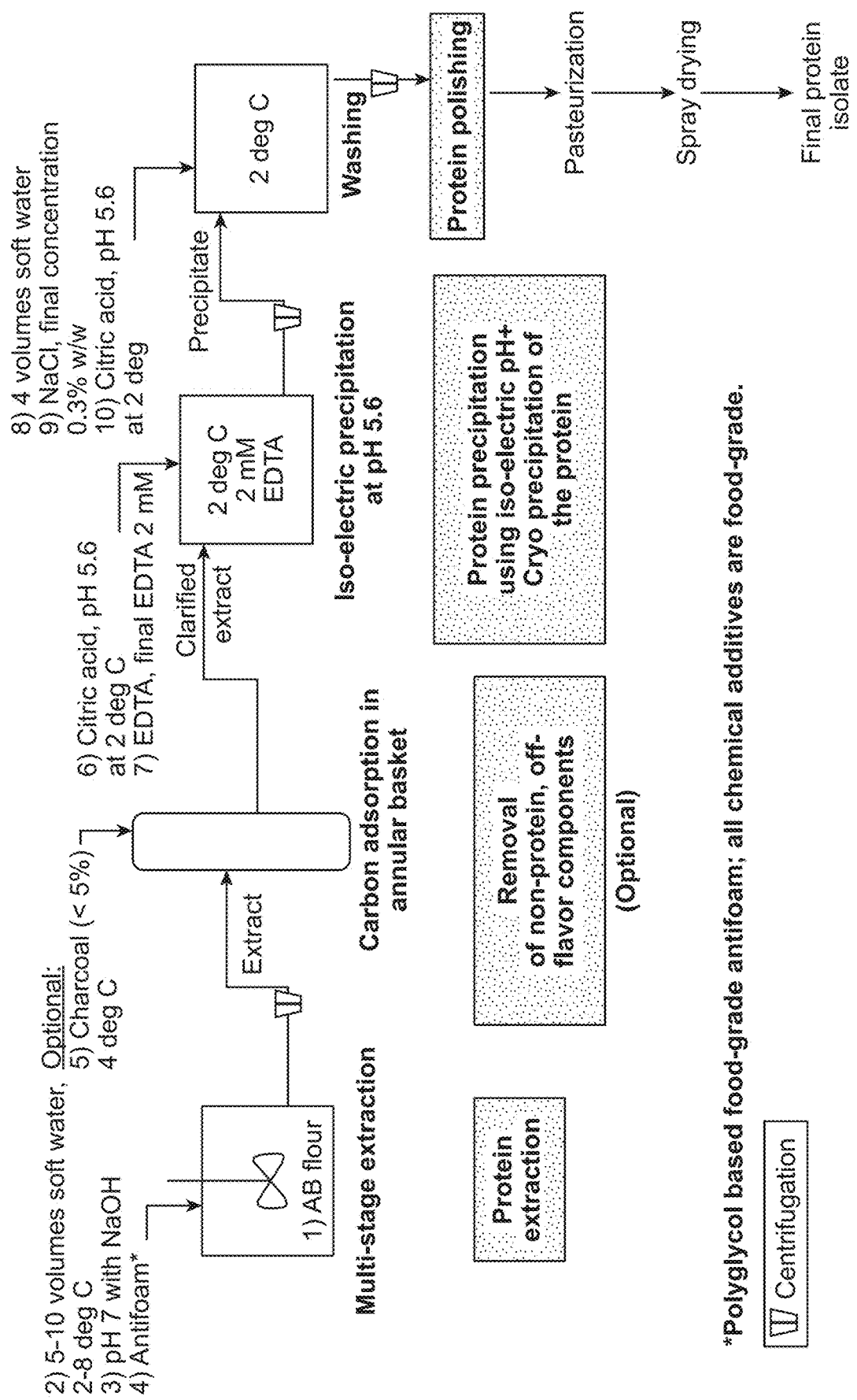

FIG. 3 depicts a general process block flow diagram for pilot scale protein isolation.

Figure 4A:
Figure 4B:
Figure 4C:
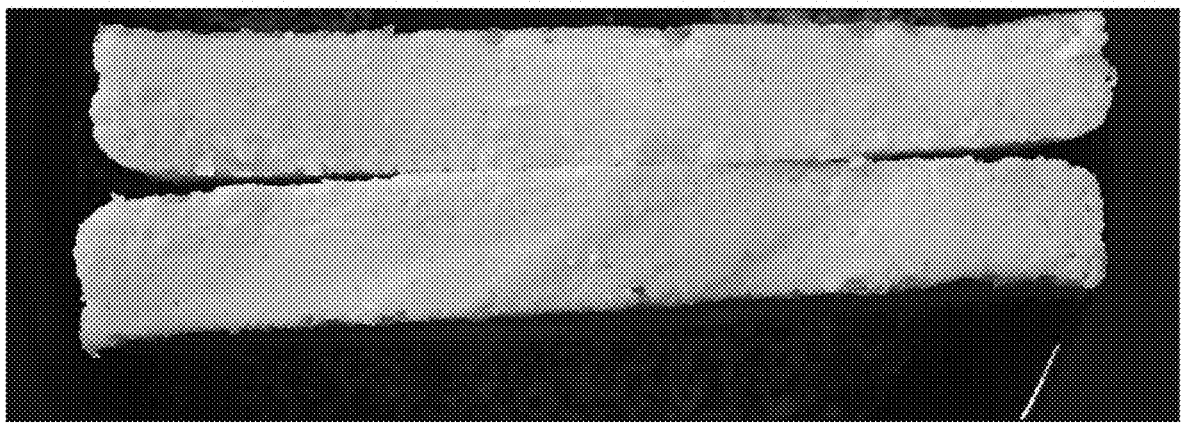

FIG. 4 (A-C) graphically depicts denaturation temperature profiles of different purified protein isolates.

Figure 5:
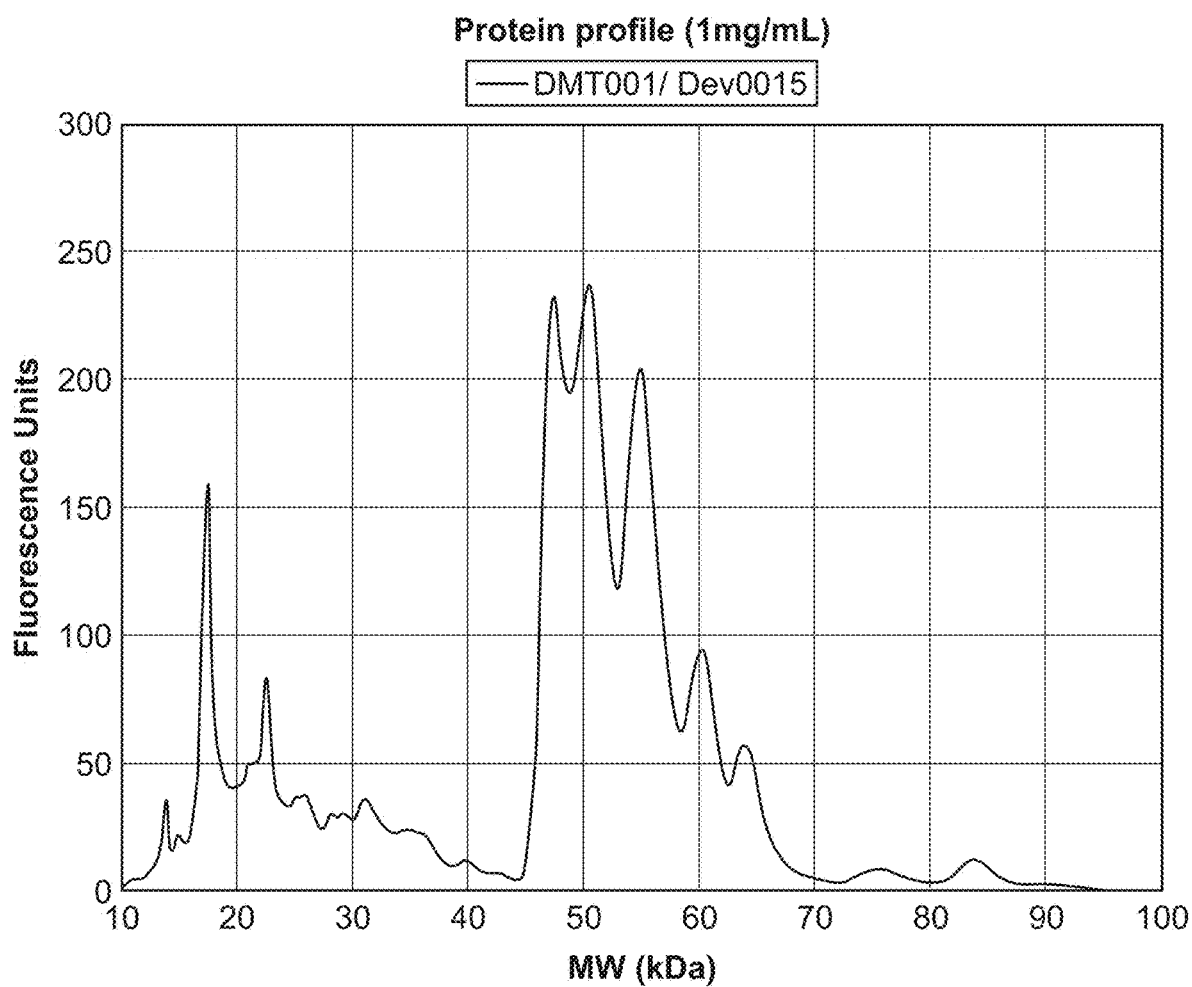

FIG. 5 depicts a protein profile chromatogram resulting from a capillary gel electrophoresis analysis of an adzuki protein isolate provided herein.

Figure 6:
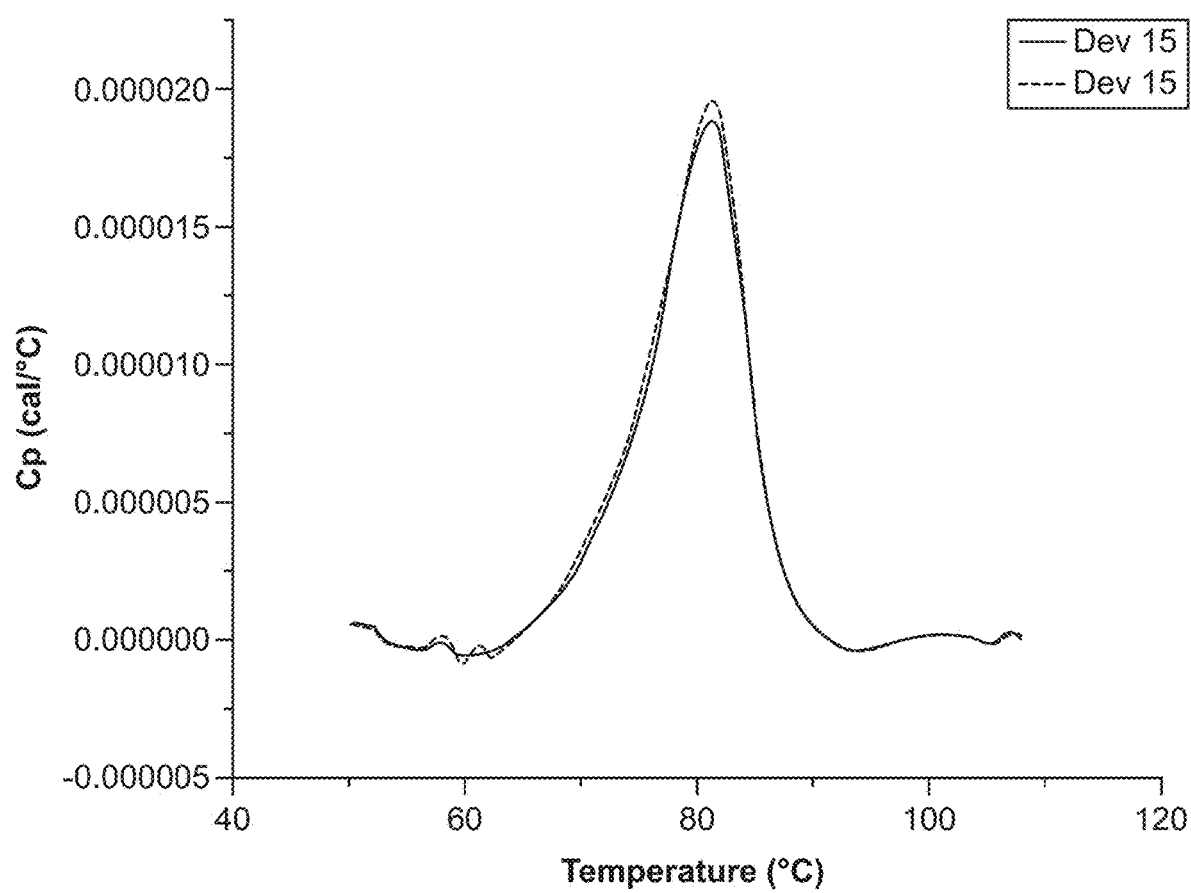

FIG. 6 depicts a thermogram indicating a thermal denaturation temperature of 81.2° C. for an adzuki bean protein isolate provided herein.

Figure 7:
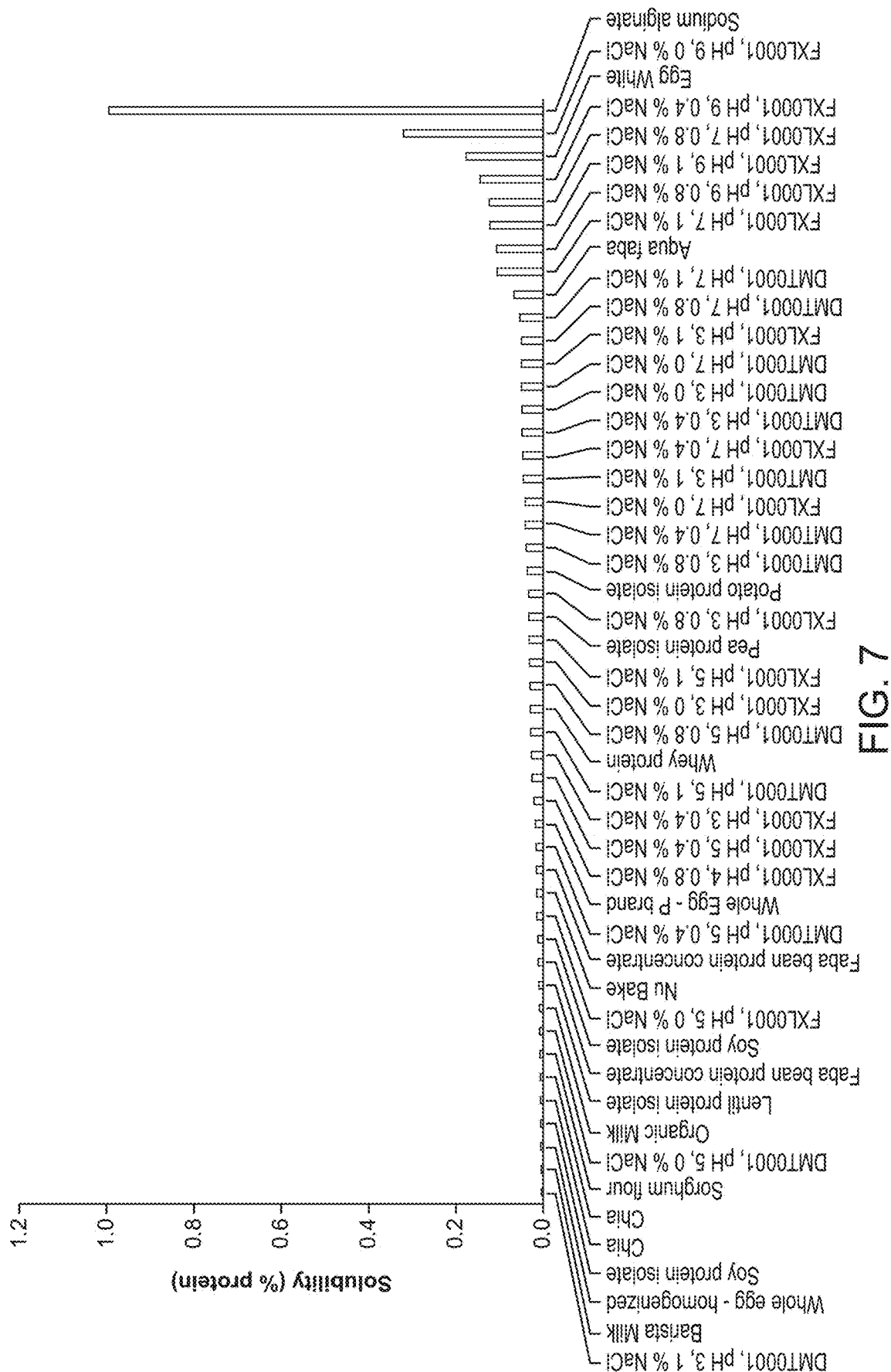

FIG. 7 depicts solubility of adzuki bean isolates that were prepared by wahing the isolate pellet (DMT0001) and not washing the pellet of precipitation buffer (FXL0001), as well as several reference materials.

Figure 8:
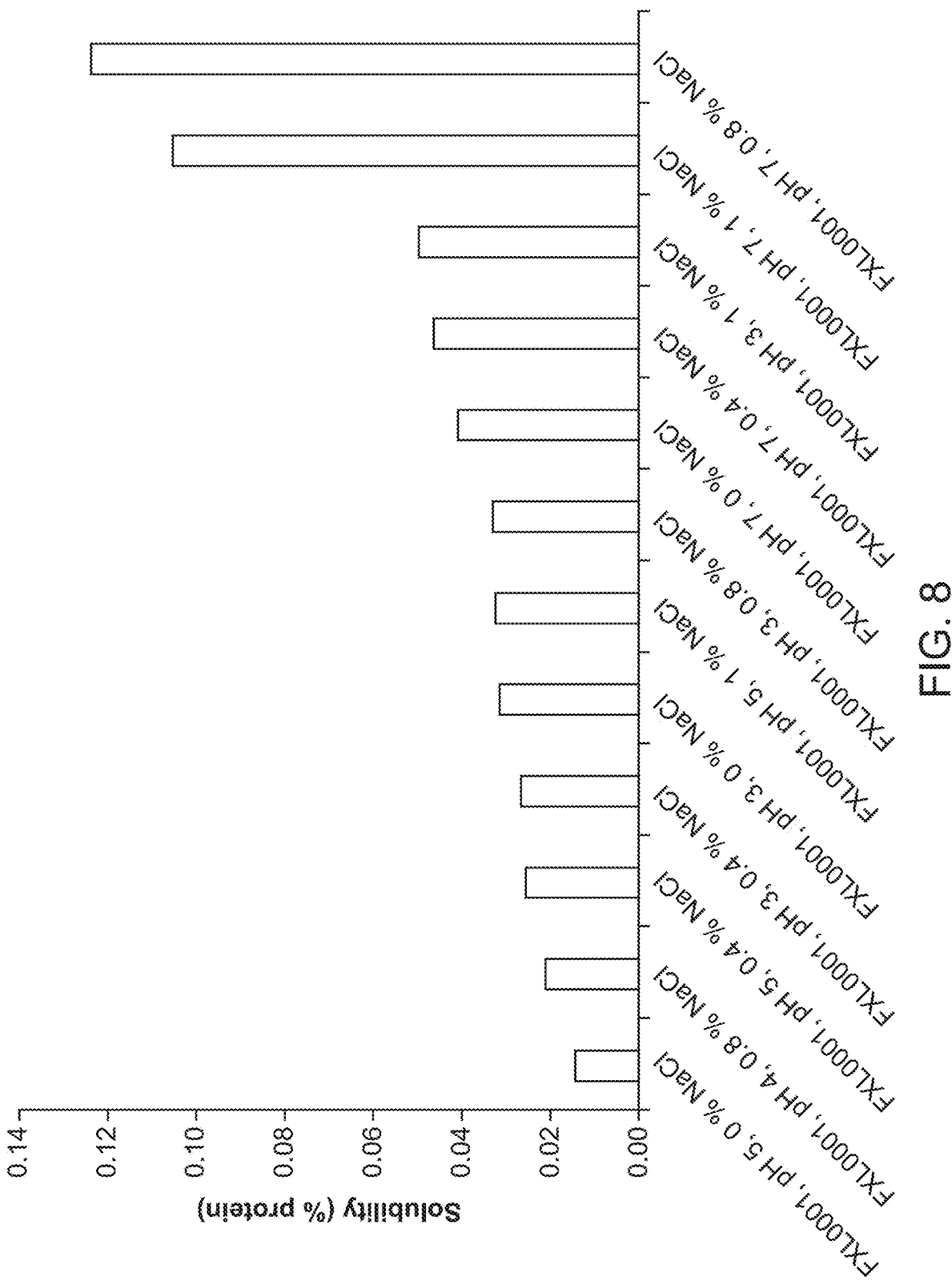

FIG. 8 depicts solubility of adzuki bean isolates that were prepared without washing the isolate pellet of precipitation buffer (FXL0001), under various solvent conditions.

Figure 9:
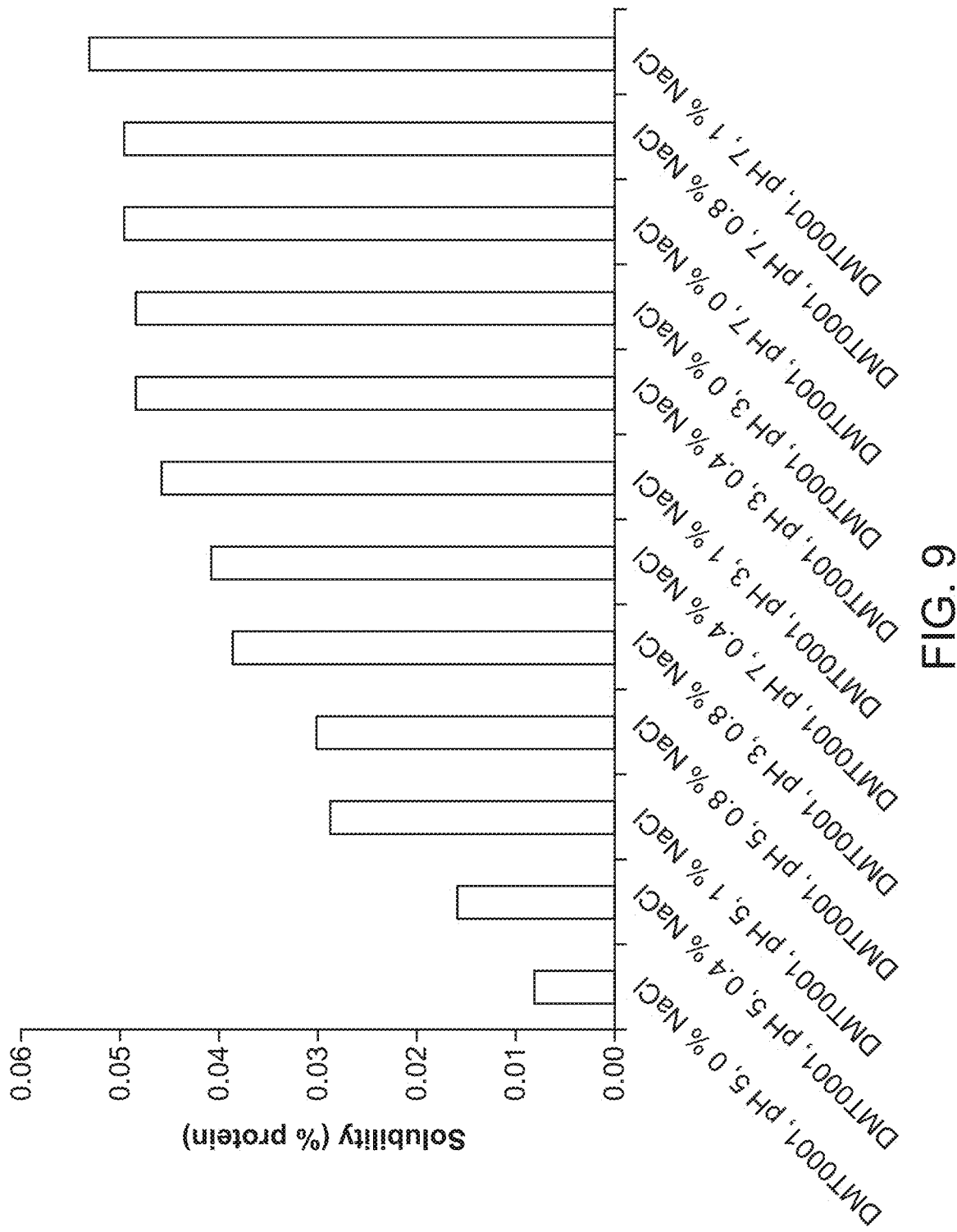

FIG. 9 depicts solubility of adzuki bean isolates that were prepared by washing the isolate pellet of precipitation buffer (DMT0001), under various solvent conditions.

Figure 10:
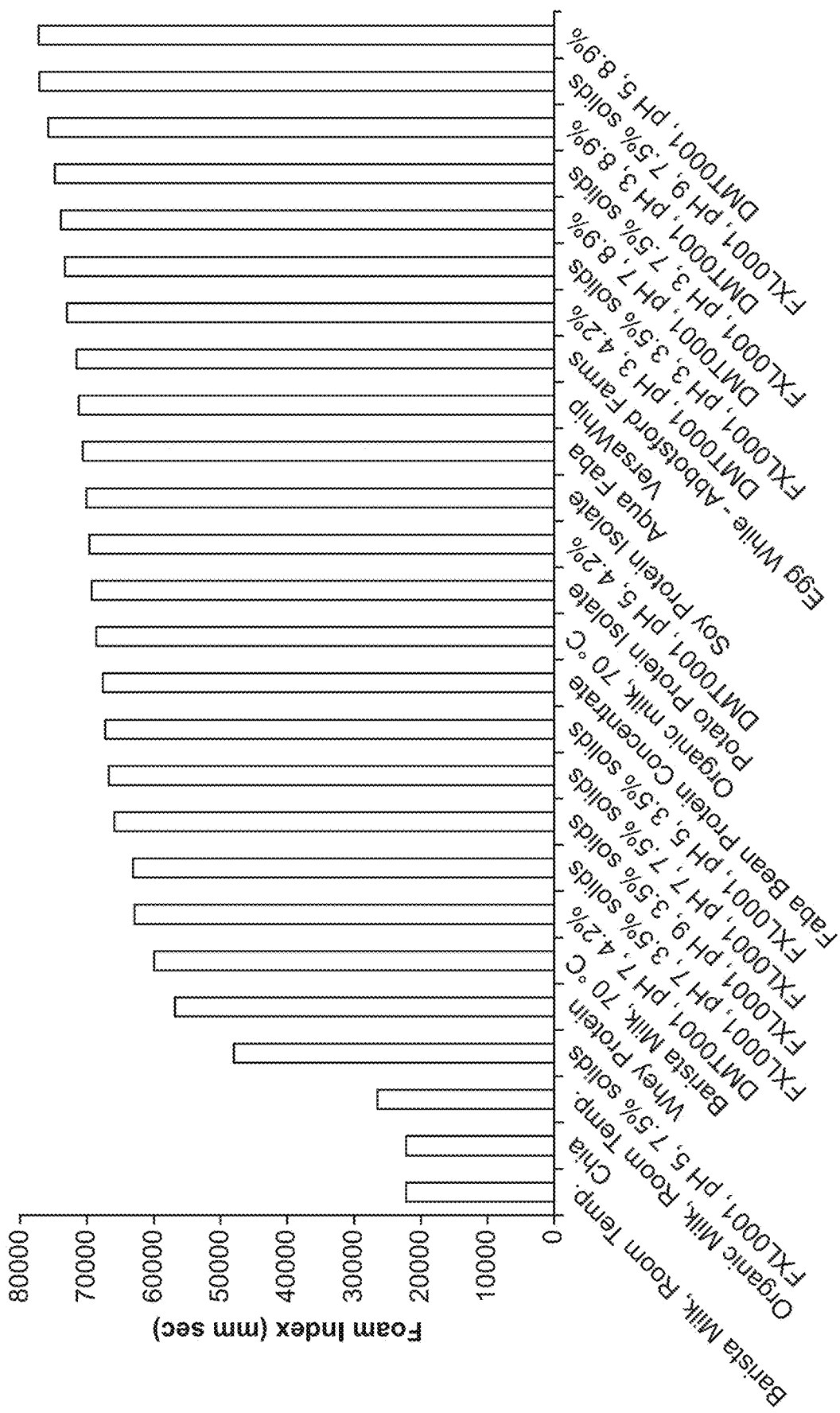

FIG. 10 depicts foam stability of adzuki bean isolates that were prepared by washing the isolate pellet (DMT0001) and not washing the pellet of precipitation buffer (FXL0001) in various buffer and protein conditions, as well as several reference materials.

Figure 11:
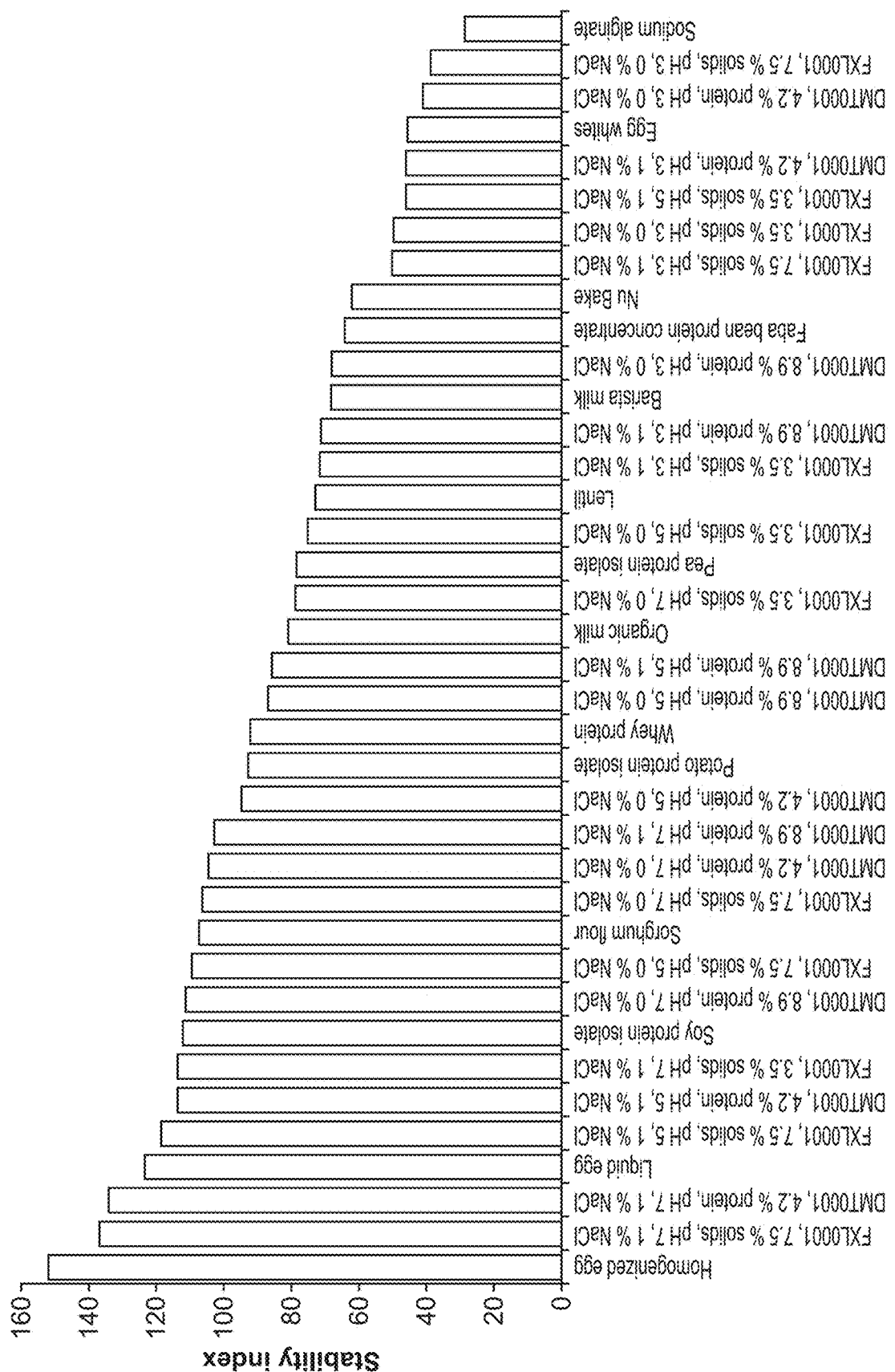

FIG. 11 depicts emulsion stability of adzuki bean isolates that were prepared by washing the isolate pellet (DMT0001) and not washing the pellet of precipitation buffer (FXL0001) in various buffer and protein conditions, as well as several reference materials. Lower stability index values indicate emulsions that are more stable over time.

Figure 12:
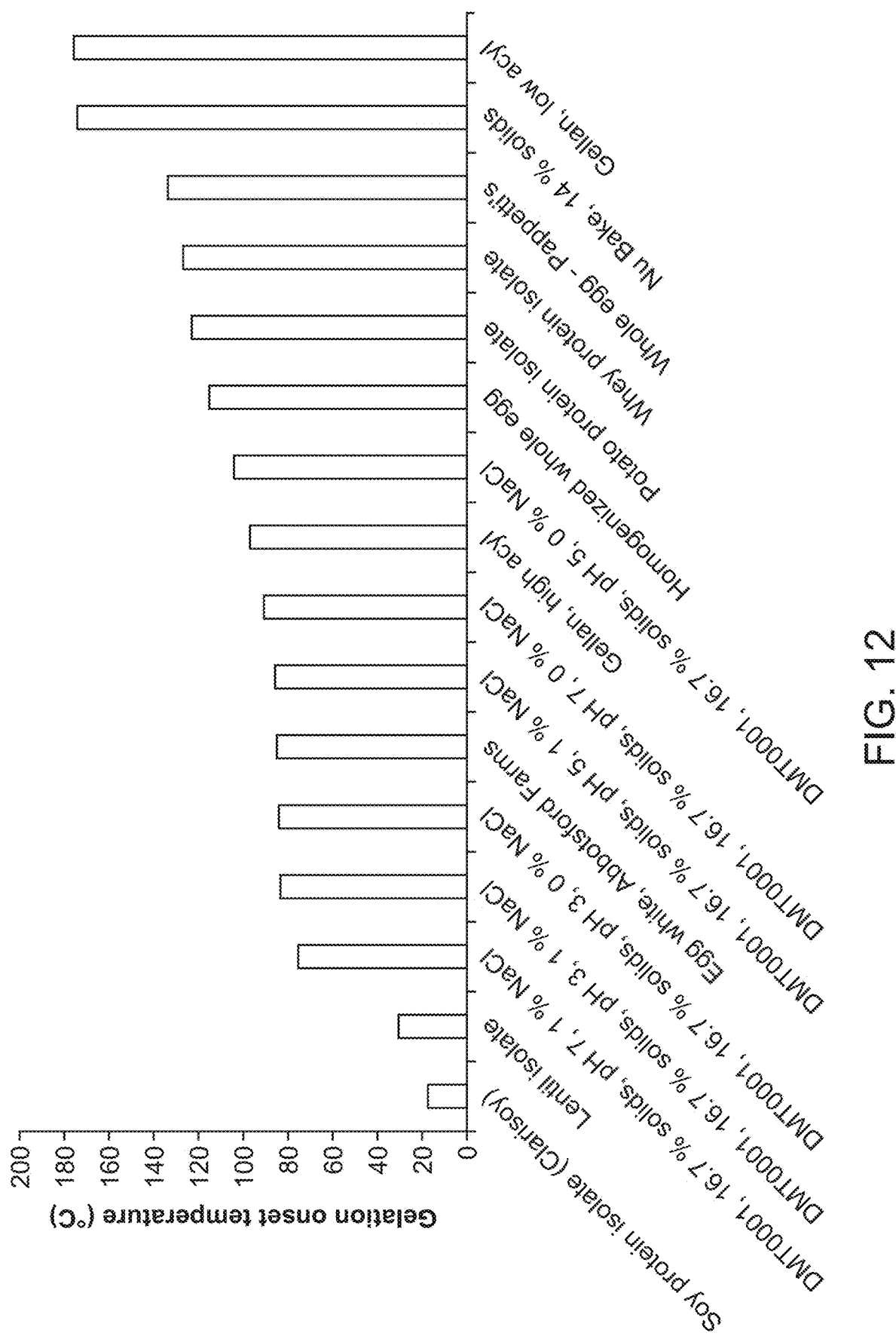

FIG. 12 depicts gelation onset temperature of gels formed by heating of adzuki bean isolates that were prepared by washing the isolate pellet (DMT0001) in various buffer and protein conditions, as well as several reference materials.

Figure 13:
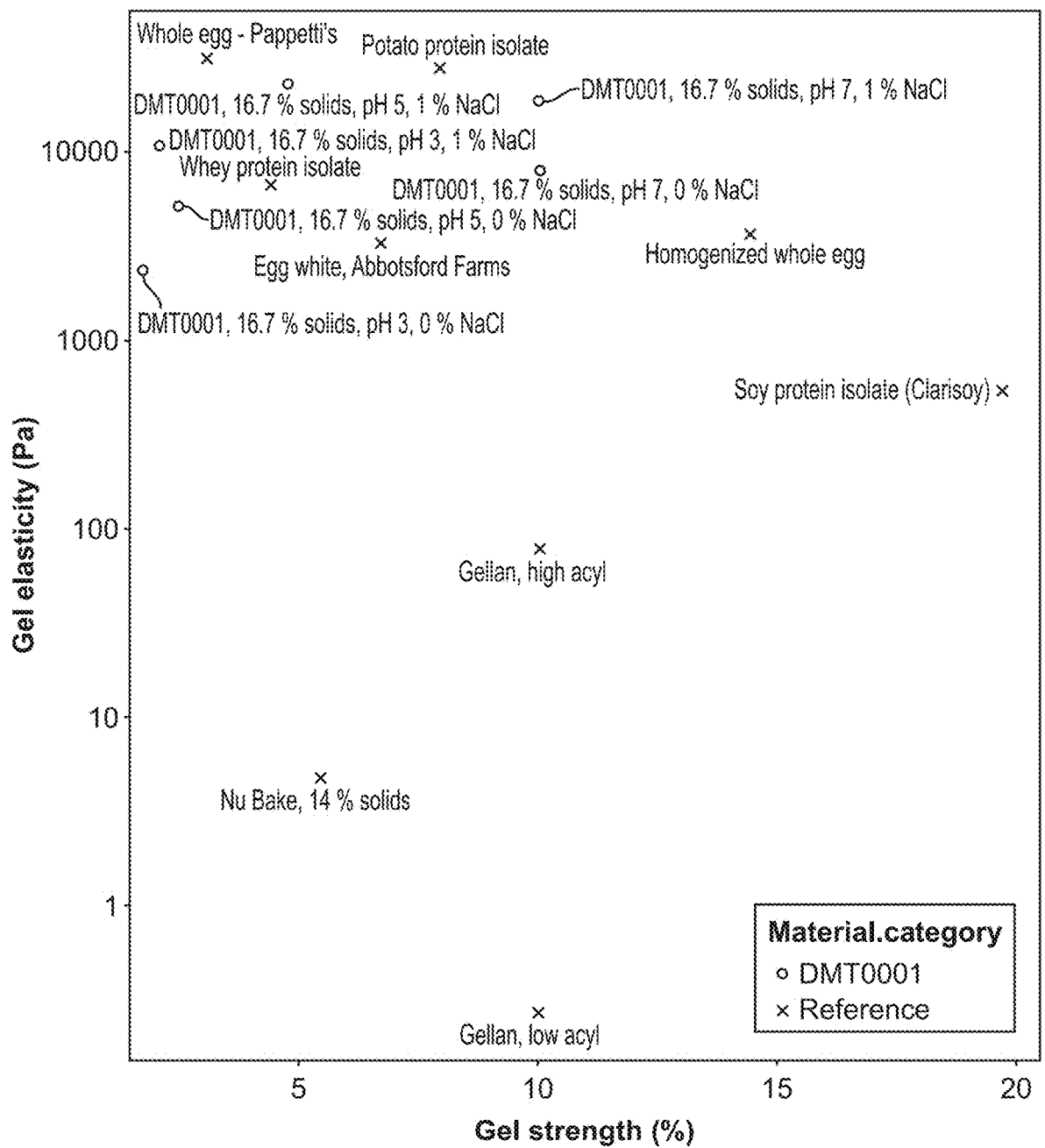

FIG. 13 depicts gel elasticity versus gel strength of adzuki bean isolates that were prepared by washing the isolate pellet (DMT0001) in various buffer and protein conditions, as well as several reference materials.

Figure 14:

FIG. 14 depicts viscosity at zero shear rate of adzuki bean isolates that were prepared by washing the isolate pellet (DMT0001) in various buffer and protein conditions, as well as several reference materials.

Figure 15:
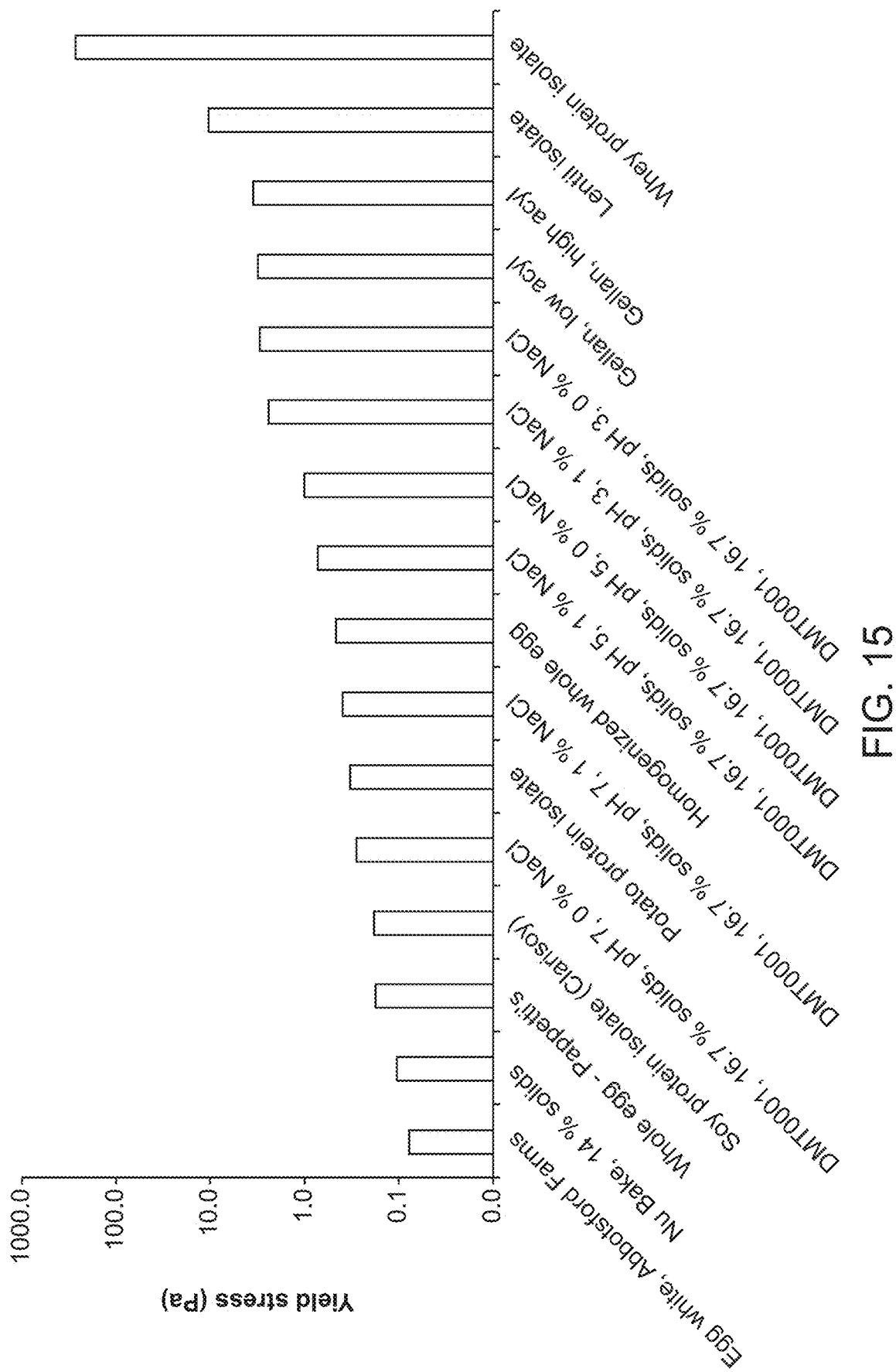

FIG. 15 depicts yield stress of adzuki bean isolates that were prepared by washing the isolate pellet (DMT0001) in various buffer and protein conditions, as well as several reference materials.

6. DETAILED DESCRIPTION OF THE EMBODIMENTS

6.1 Terminology

As used herein, the singular forms "a," "an," and "the" include the plural referents unless the context clearly indicates otherwise.

The term "about" indicates and encompasses an indicated value and a range above and below that value. In certain embodiments, the term "about" indicates the designated value ±10%, ±5%, or ±1%. In certain embodiments, the term "about" indicates the designated value ±one standard deviation of that value.

The term "reduce" indicates a lessening or decrease of an indicated value relative to a reference value. In some embodiments, the term "reduce" (including "reduction") refers to a lessening or a decrease of an indicated value by about 5%, 10%, 15%, 20%, 25%, 30%, 35%, 40%, 45%, or 50% relative to a reference value. In some embodiments, the term "reduce" (including "reduction") refers to a lessening or a decrease of an indicated value by at least about 5%, 10%, 15%, 20%, 25%, 30%, 35%, 40%, 45%, or 50% relative to a reference value.

As used herein, the term "eggs" includes but is not limited to chicken eggs, other bird eggs (such as quail eggs, duck eggs, ostrich eggs, turkey eggs, bantam eggs, goose eggs), and fish eggs such as fish roe. Typical food application comparison is made with respect to chicken eggs.

As used herein, the term "enriched" refers to an increase in a percent amount of a molecule, for example, a protein, in one sample relative to the percent amount of the molecule in a reference sample. For example, an isolate enriched in a certain type of globulin protein relative to whole adzuki bean means that, the amount of the globulin protein in the isolate expressed as a percentage of the amount of total protein in the isolate, is higher than the amount of the globulin protein in a whole adzuki bean expressed as a percentage of the amount of total protein in the whole adzuki bean. In some embodiments, the enrichment is on a weight to weight basis. In some embodiments, the enrichment refers to an increase of about 5%, 10%, 15%, 20%, 25%, 30%, 35%, 40%, 45%, or 50% relative to the reference value or amount. In some embodiments, the enrichment refers to an increase of at least about 5%, 10%, 15%, 20%, 25%, 30%, 35%, 40%, 45%, or 50% relative to the reference value or amount.

As used herein, "plant source of the isolate" refers to a whole plant material such as whole adzuki bean, or from an intermediate material made from the plant, for example, a dehulled bean, a flour, a powder, a meal, ground grains, a cake (such as, for example, a defatted or de-oiled cake), or any other intermediate material suitable to the processing techniques disclosed herein to produce a purified protein isolate.

The term "transglutaminase" refers to an enzyme (R-glutamyl-peptide:amine glutamyl transferase) that catalyzes the acyl-transfer between γ-carboxyamide groups and various primary amines, classified as EC 2.3.2.13. It is used in the food industry to improve texture of some food products such as dairy, meat and cereal products. It can be isolated from a bacterial source, a fungus, a mold, a fish, a mammal and a plant.

The terms "majority" or "predominantly" with respect to a specified component, e.g., protein content refer to the component having at least 50% by weight of the referenced batch, process stream, food formulation or composition.

Unless indicated otherwise, percentage (%) of ingredients refer to total % by weight typically on a dry weight basis unless otherwise indicated.

The term "purified protein isolate", "protein isolate", "isolate", "precipitate", "protein extract", "isolated protein" or "isolated polypeptide" refers to a protein fraction, a protein or polypeptide that by virtue of its origin or source of derivation (1) is not associated with naturally associated components that accompany it in its native state, (2) exists in a purity not found in nature, where purity can be adjudged with respect to the presence of other cellular material (e.g., is free of other proteins from the same species) (3) is expressed by a cell from a different species, or (4) does not occur in nature (e.g., it is a fragment of a polypeptide found in nature or it includes amino acid analogs or derivatives not found in nature or linkages other than standard peptide bonds). One or more proteins or fractions may be partially removed or separated from residual source materials and/or non-solid protein materials and, therefore, are non-naturally occurring and are not normally found in nature. A polypeptide or protein may also be rendered substantially free of naturally associated components by isolation, using protein purification techniques known in the art and as described herein. A polypeptide that is chemically synthesized or synthesized in a cellular system different from the cell from which it naturally originates will be "isolated" from its naturally associated components. As thus defined, "isolated" does not necessarily require that the protein, polypeptide, peptide or oligopeptide so described has been physically removed from its native environment.

Sequence homology for polypeptides, which is also referred to as percent sequence identity, is typically measured using sequence analysis software. See, e.g., the Sequence Analysis Software Package of the Genetics Computer Group (GCG), University of Wisconsin Biotechnology Center, 910 University Avenue, Madison, Wis. 53705. Protein analysis software matches similar sequences using a measure of homology assigned to various substitutions, deletions and other modifications, including conservative amino acid substitutions. For instance, GCG contains programs such as "Gap" and "Bestfit" which can be used with default parameters to determine sequence homology or sequence identity between closely related polypeptides, such as homologous polypeptides from different species of organisms or between a wild-type protein and a mutein thereof. See, e.g., GCG Version 6.1.

A preferred algorithm when comparing a particular polypeptide sequence to a database containing a large number of sequences from different organisms is the computer program BLAST (Altschul et al., J. Mol. Biol. 215:403-410 (1990); Gish and States, Nature Genet. 3:266-272 (1993); Madden et al., Meth. Enzymol. 266:131-141 (1996); Altschul et al., Nucleic Acids Res. 25:3389-3402 (1997); Zhang and Madden, Genome Res. 7:649-656 (1997)), especially blastp or tblastn (Altschul et al., Nucleic Acids Res. 25:3389-3402 (1997)).

Preferred parameters for BLASTp are: Expectation value: 10 (default); Filter: seg (default); Cost to open a gap: 11 (default); Cost to extend a gap: 1 (default); Max. alignments: 100 (default); Word size: 11 (default); No. of descriptions: 100 (default); Penalty Matrix: BLOW SUM62.

The length of polypeptide sequences compared for homology will generally be at least about 16 amino acid residues, usually at least about 20 residues, more usually at least about 24 residues, typically at least about 28 residues, and preferably more than about 35 residues. When searching a database containing sequences from a large number of different organisms, it is preferable to compare amino acid sequences. Database searching using amino acid sequences can be measured by algorithms other than blastp known in the art. For instance, polypeptide sequences can be compared using FASTA, a program in GCG Version 6.1. FASTA provides alignments and percent sequence identity of the regions of the best overlap between the query and search sequences. Pearson, Methods Enzymol. 183:63-98 (1990) (incorporated by reference herein). For example, percent sequence identity between amino acid sequences can be determined using FASTA with its default parameters (a word size of 2 and the PAM250 scoring matrix), as provided in GCG Version 6.1, herein incorporated by reference.

6.2 Adzuki Bean Protein Isolate Compositions

In preferred embodiments, the protein isolate provided herein is derived from adzuki bean. In some embodiments, the adzuki bean is *Vigna angularis*. In various aspects of the invention, the purified adzuki bean protein isolate described herein can be produced from any source of adzuki bean protein, including any varietal or cultivar of *V. angularis*. For example, the protein isolate can be prepared directly from whole plant material such as whole adzuki bean, or from an intermediate material made from the plant, for example, a dehulled bean, a flour, a powder, a meal, ground grains, a cake (such as, for example, a defatted or de-oiled cake), or any other intermediate material suitable to the processing techniques disclosed herein to produce a purified protein isolate. In some embodiments, the source of the plant protein may be a mixture of two or more intermediate materials. The examples of candidate intermediate materials provided herein are not intended to be limiting.

In preferred embodiments, provided herein are adzuki bean protein isolate compositions predominantly comprising a protein-based fraction. In preferred embodiments, the protein fraction is 50%-60%, 60%-70%, 70%-80%, 80%, 81%, 82%, 83%, 84%, 85%, 86%, 87%, 88%, 89%, 90%, 91%, 92%, 93%, 94%, 95%, 96%, 97%, 98%, 99% or even 100% of the adzuki bean isolate. In preferred embodiments, at least 60% by weight of the purified isolate is the protein fraction. In preferred embodiments, at least 65% by weight of the purified isolate is the protein fraction. In preferred embodiments, at least 70% by weight of the purified isolate is the protein fraction. In some embodiments, at least 75% by weight of the purified isolate is the protein fraction. In some embodiments, at least 80% by weight of the purified isolate is the protein fraction. In some embodiments, up to about 95% by weight of the purified isolate is the protein fraction.

Preferred embodiments include high purity protein isolates from adzuki bean that comprise at least 10% by weight of protein consisting of or comprising at least one globulin-type protein. While not wishing to be bound by a particular theory, it is believed that the globulin fraction provides the basis for functionality. Accordingly, the purified protein isolates are enriched in globulin protein relative to whole adzuki bean. In some embodiments, the globulin-like protein is adzuki bean 8s globulin/beta-conglycinin. In some embodiments, the globulin-like protein is adzuki bean 11s globulin/glycinin. In some embodiments, at least about 10%, 11%, 12%, 13%, 14%, 15%, 16%, 17%. 18%, 19%, 20% or greater than 20% by weight of the protein fraction of the isolate consists of or comprises adzuki bean 8s globulin/beta-conglycinin. In some embodiments, at least about 10%, 11%, 12%, 13%, 14%, 15%, 16%, 17%. 18%, 19%, 20% or greater than 20% by weight of the protein fraction of the isolate consists of or comprises adzuki bean 11s globulin/glycinin.

In some embodiments, purified protein isolate is concentrated between 100-200 g/L or higher.

In some embodiments, proteins in the composition comprise nondenatured proteins. In other embodiments, proteins in the composition comprise denatured proteins.

In some embodiments, the adzuki bean protein isolate comprises about 1% to 10%, 2% to 9%, 3% to 8%, or 4% to 6% of carbohydrates (e.g., starch, polysaccharides, fiber) derived from the plant source of the isolate. In some embodiments, the adzuki bean protein isolate comprises less than about 10%, 9%, 8%, 7%, 6%, 5%, 4%, 3%, 2% or 1% of carbohydrates derived from the plant source of the isolate. In some embodiments, the adzuki bean protein isolate comprises about 9%, 8%, 7%, 6%, 5%, 4%, 3%, 2%, or about 1% of carbohydrates derived from the plant source of the isolate. In some embodiments, practice of the methods of provided herein results in producing an adzuki bean protein isolate in which at least 10%, 20%, 30%, 40%, 50%, 60%, 70%, 80%, or 90% of the carbohydrate originally found in the adzuki bean protein source has been reduced.

In some embodiments, the adzuki bean protein isolate comprises about 1% to 10%, 2% to 9%, 3% to 8%, or 4% to 6% of ash derived from the plant source of the isolate. In some embodiments, the adzuki bean protein isolate comprises less than about 10%, 9%, 8%, 7%, 6%, 5%, 4%, 3%, 2% or 1% of ash derived from the plant source of the isolate. In some embodiments, the adzuki bean protein isolate comprises about 9%, 8%, 7%, 6%, 5%, 4%, 3%, 2%, or about 1% of ash derived from the plant source of the isolate. In some embodiments, practice of the methods of provided herein results in producing an adzuki bean protein isolate in which at least 10%, 20%, 30%, 40%, 50%, 60%, 70%, 80%, or 90% of the ash originally found in the adzuki bean protein source has been reduced.

In some embodiments, the adzuki bean protein isolate comprises about 1% to 10%, 2% to 9%, 3% to 8%, or 4% to 6% of fats derived from the plant source of the isolate. In some embodiments, the adzuki bean protein isolate comprises less than about 10%, 9%, 8%, 7%, 6%, 5%, 4%, 3%, 2% or 1% of fats derived from the plant source of the isolate. In some embodiments, the adzuki bean protein isolate comprises about 9%, 8%, 7%, 6%, 5%, 4%, 3%, 2%, or about 1% of fats derived from the plant source of the isolate. In some embodiments, practice of the methods of provided herein results in producing an adzuki bean protein isolate in which at least 10%, 20%, 30%, 40%, 50%, 60%, 70%, 80%, or 90% of the fats originally found in the adzuki bean protein source has been reduced.

In some embodiments, the adzuki bean protein isolate comprises about 1% to 10% of moisture derived from the plant source of the isolate. In some embodiments, the adzuki bean protein isolate comprises less than about 10%, 9%, 8%, 7%, 6% or 5% of moisture derived from the plant source of the isolate. In some embodiments, the adzuki bean protein isolate comprises about 9%, 8%, 7%, 6%, 5%, 4%, 3%, 2%, or about 1% of moisture derived from the plant source of the isolate.

In a particular embodiment, the adzuki bean protein isolate comprises less than 5% of carbohydrates, less than 5% of ash, less than 5% of fats, and less than 80% of moisture derived from the plant source of the isolate.

6.2.1 Adzuki Bean Proteins of the Isolate Compositions

Leguminous plants contain many types of proteins, two of which are globulins and albumins. Globulins and albumins are soluble proteins and make up the majority of the total proteins in adzuki bean. Globulins can be further classified as legumins, vicilins and convicilins.

The globulin-type protein making up the majority by weight of the protein fraction of the isolates provided herein may all be of the same type of globulin-type protein, or it may comprise more than one types of globulin-type protein. For example, the globulin-type protein may include 7S globulin, 8S globulin, and/or 11S globulin. The globulin-type protein may also or alternatively include protein(s) homologous to 7S, 8S, and/or 11S globulin.

In some embodiments, the adzuki bean protein isolate comprises a protein having sequence at least 75% identical to one or more globulin-type proteins from adzuki bean (e.g. 7S, 8S, 11S), wherein the protein is enriched in the isolate in relation to the amount of protein found in the plant source of the isolate. In some embodiments, the enriched protein has at least 50%, 60, 70%, 80%, 85%, 90%, 95%, 98%, 98.1%, 98.2%, 98.3%, 98.4%, 98.5%, 98.6%, 98.7%, 98.8%, 98.9%, 99%, 99.1%, 99.2%, 99.3%, 99.4%, 99.5%, 99.6%, 99.7%, 99.8%, 99.9% or even higher identity to one or more globulin-type proteins from adzuki bean (e.g. 7S, 8S, 11S).

In some embodiments, the adzuki bean protein isolate provided herein comprises at least one protein comprising an amino acid sequence having at least 50%, 60%, 70%, 80%, 90%, or 95% identity, or higher, to a sequence selected from the group of sequences consisting of SEQ ID NO:1, SEQ ID NO:2, SEQ ID NO:3, SEQ ID NO:4, SEQ ID NO:5, or SEQ ID NO:6. In some embodiments, the adzuki bean protein isolate comprises at least two, three, four, five, or six, or more enriched proteins comprising an amino acid sequence having at least 50%, 60%, 70%, 80%, 90%, or 95% identity, or higher, to a sequence selected from the group of sequences consisting of SEQ ID NO:1, SEQ ID NO:2, SEQ ID NO:3, SEQ ID NO:4, SEQ ID NO:5 and SEQ ID NO:6.

In, some embodiments, the adzuki bean protein isolate comprises a protein having at least 90% identity to SEQ ID NO:1. In some embodiments, the adzuki bean protein isolate comprises a protein having at least 90% identity to SEQ ID NO:1, in an amount that is at least 1% of the total protein of the isolate. In some embodiments, the amount the protein having at least 90% identity to SEQ ID NO:1 is at least 5, 10, 15, or 20% of the isolate. In some embodiments, the adzuki bean protein isolate is enriched for a protein having at least 90% identity to SEQ ID NO:1, in relation to the amount of the protein found in the plant source of the isolate. In some embodiments, the enriched protein is enriched by at least 5%, 10%, 15%, 20% or greater than 20%. In any of the preceding embodiments, the adzuki bean protein isolate can comprise a protein having at least 95% identity to SEQ ID NO: 1.

In, some embodiments, the adzuki bean protein isolate comprises a protein having at least 90% identity to SEQ ID NO:2. In some embodiments, the adzuki bean protein isolate comprises a protein having at least 90% identity to SEQ ID NO:2, in an amount that is at least 1% of the total protein of the isolate. In some embodiments, the amount the protein having at least 90% identity to SEQ ID NO:2 is at least 5, 10, 15, or 20% of the isolate. In some embodiments, the adzuki bean protein isolate is enriched for a protein having at least 90% identity to SEQ ID NO:2, in relation to the amount of the protein found in the plant source of the isolate. In some embodiments, the enriched protein is enriched by at least 5%, 10%, 15%, 20% or greater than 20%. In any of the preceding embodiments, the adzuki bean protein isolate can comprise a protein having at least 95% identity to SEQ ID NO: 2.

In, some embodiments, the adzuki bean protein isolate comprises a protein having at least 90% identity to SEQ ID NO:3. In some embodiments, the adzuki bean protein isolate comprises a protein having at least 90% identity to SEQ ID NO:3, in an amount that is at least 1% of the total protein of the isolate. In some embodiments, the adzuki bean protein isolate is enriched for a protein having at least 90% identity to SEQ ID NO:3, in relation to the amount of the protein found in the plant source of the isolate. In some embodiments, the enriched protein is enriched by at least 5%, 10%, 15%, 20% or greater than 20%. In any of the preceding embodiments, the adzuki bean protein isolate can comprise a protein having at least 95% identity to SEQ ID NO: 3.

In, some embodiments, the adzuki bean protein isolate comprises a protein having at least 90% identity to SEQ ID NO:4. In some embodiments, the adzuki bean protein isolate comprises a protein having at least 90% identity to SEQ ID NO:4, in an amount that is at least 1% of the total protein of the isolate. In some embodiments, the adzuki bean protein isolate is enriched for a protein having at least 90% identity to SEQ ID NO:4, in relation to the amount of the protein found in the plant source of the isolate. In some embodiments, the enriched protein is enriched by at least 5%, 10%, 15%, 20% or greater than 20%. In any of the preceding embodiments, the adzuki bean protein isolate can comprise a protein having at least 95% identity to SEQ ID NO: 4.

In, some embodiments, the adzuki bean protein isolate comprises a protein having at least 90% identity to SEQ ID NO:5. In some embodiments, the adzuki bean protein isolate comprises a protein having at least 90% identity to SEQ ID NO:5, in an amount that is at least 1% of the total protein of the isolate. In some embodiments, the adzuki bean protein isolate is enriched for a protein having at least 90% identity to SEQ ID NO:5, in relation to the amount of the protein found in the plant source of the isolate. In some embodiments, the enriched protein is enriched by at least 5%, 10%, 15%, 20% or greater than 20%. In any of the preceding embodiments, the adzuki bean protein isolate can comprise a protein having at least 95% identity to SEQ ID NO: 5.

In, some embodiments, the adzuki bean protein isolate comprises a protein having at least 90% identity to SEQ ID NO:6. In some embodiments, the adzuki bean protein isolate comprises a protein having at least 90% identity to SEQ ID NO:6, in an amount that is at least 1% of the total protein of the isolate. In some embodiments, the adzuki bean protein isolate is enriched for a protein having at least 90% identity to SEQ ID NO:6, in relation to the amount of the protein found in the plant source of the isolate. In some embodiments, the enriched protein is enriched by at least 5%, 10%, 15%, 20% or greater than 20%. In any of the preceding embodiments, the adzuki bean protein isolate can comprise a protein having at least 95% identity to SEQ ID NO: 6.

According to other embodiments, purified protein isolates comprising a fragment of the above-described proteins are provided. These fragments preferably include at least 20 contiguous amino acids, more preferably at least 25, 30, 35, 40, 45, 50, 60, 70, 80, 90, 100 or even more contiguous amino acids.

6.3 Methods of Producing Adzuki Bean Protein Isolates

Also provided herein are methods for producing an adzuki bean protein isolate having high functionality for a broad range of food applications. In some embodiments, the methods for producing the isolate comprise one or more steps selected from:

(a) Extracting one or more adzuki bean proteins from an adzuki bean protein source in an aqueous solution. In some embodiments, the extraction is performed at a pH between about 6.5-10.0.

(b) Purifying protein from the extract using at least one of two methods:

(i) precipitating protein from the extract at a pH near the isoelectric point of a globulin-rich fraction, for example a pH between about 5.0-6.0; and/or (ii) fractionating and concentrating protein from the extract using filtration such as microfiltration, ultrafiltration or ion-exchange chromatography.

(c) Recovering purified protein isolate.

In preferred embodiments, the methods provided herein produce adzuki bean protein isolates comprising one or more of the following features: a protein content of at least 60% by weight; a globulin-type protein content of at least 50% by weight of the protein content; a reduced oxidative enzyme activity relative to an otherwise unmodified source of the adzuki bean protein; and one or more modulated organoleptic properties that differ from the otherwise unmodified source of the adzuki bean protein.

In preferred embodiments, the adzuki bean protein isolate is produced using a series of mechanical processes, with the only chemicals used being pH adjusting agents, such as sodium hydroxide and citric acid, and ethylenediaminetetraacetic acid (EDTA) to prevent lipid oxidation activities that may affect the flavor of the isolate.

6.3.1 Dehulling and Milling

Although the adzuki bean protein isolates provided herein may be prepared from any suitable source of adzuki bean protein, where the starting material is whole plant material such as whole adzuki bean, a first step of the methods provided herein comprises dehulling the raw source material. In some such embodiments, raw adzuki beans may be de-hulled in one or more steps of pitting, soaking, and drying to remove the seed coat (husk) and pericarp (bran). The de-hulled adzuki beans are then milled to produce flour with a well-defined particle distribution size. In some embodiments, the particle distribution size is less than 1000, 900, 800, 700, 600, 500, 400, 300, 200 or 100 µm. In a particular embodiment, the particle distribution size is less than 300 µm to increase the rate and yield of protein during the extraction step. The types of mills employed may include one or a combination of a hammer, pin, knife, burr, and air classifying mills.

When feasible, air classification of the resultant flour may be deemed necessary to expedite the protein extraction process and enhance efficiency of the totality of the process. The method employed is to ensure the adzuki beans are milled to a particle size that is typically less than 45 µm, utilizing a fine-grinding mill, such as an air classifying mill. The resultant flour is then passed through an air classifier, which separates the flour into both a coarse and fine fraction. The act of passing the flour through the air classifier is intended to concentrate the majority of the available protein in the flour into a smaller portion of the total mass of the flour. Typical fine fraction (high-protein) yields may be 10-50%. The fine fraction tends to be of a particle size of less than 20 μm; however, this may be influenced by growing season and region of the original adzuki bean. The high-protein fraction typically contains 150-220% of the protein in the original sample. The resultant starch-rich byproduct stream also becomes value added, and of viable, saleable interest as well.

6.3.2 Extraction

In preferred embodiments, the methods comprise an extraction step. In some embodiments of the extraction step, an intermediate starting material, for example, adzuki bean flour, is mixed with aqueous solution to form a slurry. In some embodiments, the aqueous solution is water, for example soft water. The aqueous extraction may include creating an aqueous solution comprising one part of the source of the plant protein (e.g., flour) to about, for example, 3 to 15 parts aqueous extraction solution. In other embodiments, 5 to 10 volumes of aqueous extraction solution is used per one part of the source of the plant protein. Additional useful ratios of aqueous extraction solution to flour include 1:1, 2:1, 4:1, 6:1, 7:1, 8:1, 9:1, 10:1, 11:1, 12:1, 13:1, 14:1, 15:1 or alternatively 1:2, 1:3, 1:4, 1:5, 1:6, 1:7, 1:8, 1:9, 1:10, 1:11, 1:12, 1:13, 1:14, 1:15.

Preferably, the aqueous extraction is performed at a desired temperature, for example, about 2-10° C. in a chilled mix tank to form the slurry. In some embodiments, the mixing is performed under moderate to high shear. In some embodiments, a food-grade de-foaming agent (e.g., KFO 402 Polyglycol) is added to the slurry to reduce foaming during the mixing process.

The pH of the slurry may be adjusted with a food-grade 50% sodium hydroxide solution to reach the desired extraction pH for solubilization of the target protein into the aqueous solution. In some embodiments, the extraction is performed at a pH between about 6.5-10.0. In some embodiments, the extraction is performed at a pH of about pH 5.5-pH 9, pH 6.0-pH 8.5 or more preferably pH 6.5-pH 8. In a particular embodiment, the extraction is performed at a pH of about 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0. In a particular embodiment, the extraction is performed at a pH of about 7.0.

Following extraction, the solubilized protein extract is separated from the slurry, for example, in a solid/liquid separation unit, consisting of a decanter and a disc-stack centrifuge. The extract is centrifuged at a low temperature, preferably between 3-10° C. The extract is collected and the pellet is resuspended, preferably in 3:1 water-to-flour. The pH is adjusted again and centrifuged. Both extracts are combined and filtered through using a Nylon mesh.

6.3.3 Charcoal Treatment

Optionally, the protein extract may be subjected to a carbon adsorption step to remove non-protein, off-flavor components, and additional fibrous solids from the protein extraction. This carbon adsorption step leads to a clarified protein extract. In one embodiment of a carbon adsorption step, the protein extract is then sent through a food-grade granular charcoal-filled annular basket column (<5% w/w charcoal-to-protein extract ratio) at 4° C. to 8° C. An illustrative carbon adsorption protocol is also provided in Example 1 below.

6.3.4 Acid Precipitation

In some embodiments, following extraction and optionally carbon adsorption, the clarified protein extract is acidified with a food-safe acidic solution to reach its isoelectric point under chilled conditions (e.g., 2° C. to 8° C.). Under this condition, the target protein precipitates and becomes separable from the aqueous solution. In some embodiments, the pH of the aqueous solution is adjusted to approximately the isoelectric point of at least one of the one or more globulin-type proteins in the protein-rich fraction. In some embodiments, the pH is adjusted from an aqueous solution comprising the protein extract which has an initial pH of about 6.5-10.0 prior to the adjusting step. In some embodiments, the pH is adjusted to about 5.0 to 6.5. In some embodiments, the pH is adjusted to about 5.2-6.5, 5.3 to 6.5, 5.4 to 6.5, 5.5 to 6.5, or 5.6 to 6.5. In some embodiments, the pH is adjusted to about 5.2-6.0, 5.3 to 6.0, 5.4 to 6.0, 5.5 to 6.0, or 5.6 to 6.0. In certain embodiments, the pH is adjusted to about pH 5.4-5.8. In some embodiments, the pH is adjusted to about 5.2, 5.3, 5.4, 5.5, 5.6, 5.7, 5.8, 5.9, 6.0, 6.1, 6.2, 6.3, 6.4 or 6.5. In a preferred embodiment of the methods provided herein, the pH is adjusted, and precipitation of desired adzuki bean proteins is achieved, at about pH 5.6.

Suitable food-grade acids to induce protein precipitation include but are not limited to malic, lactic, hydrochloric acid, and citric acid. In a particular embodiment, the precipitation is performed with a 20% food-grade citric acid solution. In other embodiments, the precipitation is performed with a 40% food-grade citric acid solution.

In some embodiments, in addition to the pH adjustment, EDTA, for example, 2 mM of food-grade EDTA, may be added to the precipitation solution to inhibit lipid oxidation that may produce off-flavor compounds.

In alternative embodiments, the precipitation step comprises isoelectric precipitation at pH 5.6 combined with cryo-precipitation (at 1-4° C.), wherein the pH is adjusted to 5.4-5.8.

In another alternative embodiment, low ionic strength precipitation at high flow rates is combined with cryo-precipitation (at 1-4° C.). In some such embodiments, rapid dilution of the filtrate is performed in cold (1-4° C.) 0.3% NaCl at a ratio of 1 volume of supernatant to 3 volumes of cold 0.3% NaCl. Additional resuspension and homogenization steps ensure production of desired protein isolates.

The precipitated protein slurry is then removed from the pH-adjusted aqueous solution and sent to a solid/liquid separation unit (for example, a one disc-stack centrifuge) with the addition of 0.3% (w/w) food-grade sodium chloride, and a protein curd is recovered in the heavy phase. In preferred embodiments the protein curd is washed with 4 volumes of soft water under chilled conditions (2 to 8° C.), removing final residual impurities such as fibrous solids, salts, and carbohydrates.

6.3.5 Filtration

In some embodiments of the methods, filtration is used as an alternative, or an addition to, acid precipitation. Without being bound by theory, it is believed that while acid precipitation of the protein aids to remove small molecules, alternative methods such as ultrafiltration (UF) may be employed to avoid precipitation/protein aggregation events. Thus, in some embodiments, purifying the protein-rich fraction to obtain the adzuki bean protein isolate comprises performing a filtration, microfiltration or ultrafiltration procedure utilizing at least one selective membrane.

6.3.6 Pasteurization

In some embodiments, the washed protein curd solution resulting from acid precipitation and separation is pasteurized in a high temperature/short time pasteurization step to kill any pathogenic bacteria that may be present in the solution. In a particular embodiment, pasteurization is performed at 74° C. for 20 to 23 seconds. In particular embodiments where a dry isolate is desired, the pasteurized solution is passed through a spray dryer to remove any residual water content. The typical spray drying conditions include an inlet temperature of 170° C. and an outlet temperature of 70° C. The final dried protein isolate powder typically has less than 5% moisture content.

6.3.7 Particular Embodiments of the Isolation Methods

An exemplary embodiment of the methods for producing an adzuki bean protein isolate provided herein is as follows:
1) Extraction with soft water at pH>6.5 in one or more stages. Extraction involves contacting adzuki bean flour with the aqueous solution in a ratio of 1:3-1:15 (flour:water) under moderate-to-high shear followed by solid-liquid separation step;
2) Optional treatment with activated carbon;
3) Isoelectric precipitation (pH 5.6+/−0.2) combined with cryo-precipitation method (at 1-4° C.) OR low ionic strength precipitation at very high flow rates combined with cryo-precipitation method (at 1-4° C.);
4) Followed by solid-liquid separation step.

Typically, the separation step includes washing with low concentration NaCl solution, 0.1% to 0.9% NaCl, preferably 0.3% to 0.5% NaCl.

Additional details of protein isolate purification protocols are described in Examples 2 and 3 below.

6.3.8 Order Of Steps And Additional Steps

It is to be understood that the steps of the method described above may be performed in alternative orders. For example, in some embodiments, subjecting the source of the plant protein to the fractionation process occurs before reducing the at least one impurity and before purifying the protein-rich fraction to obtain the purified protein isolate. In such embodiments, reducing the at least one impurity may occur either before or after purifying the protein-rich fraction to obtain the purified protein isolate. In some embodiments, reducing an impurity occurs before subjecting the source of the plant protein to the fractionation process and before purifying the protein-rich fraction to obtain the purified protein isolate, and subjecting the source of the plant protein to the fractionation process occurs before purifying the protein-rich fraction to obtain the purified protein isolate.

In some embodiments, the process includes additional steps, including one or more selected from: recovering the purified protein isolate (e.g., using centrifugation), washing the purified protein isolate, making a paste using the purified protein isolate, or making a powder using the purified protein isolate. In some embodiments, the purified protein isolate is rehydrated (e.g., to about 80% moisture content), and the pH of the rehydrated purified protein isolate is adjusted to a pH of about 6.0.

In other aspects, the compositions and methods provided herein reduce or remove a fraction comprising carbohydrate (e.g., starch) or a carbohydrate-rich protein isolate, post extraction, and provides opportunities to utilize these streams as product streams for multiple food applications including noodles and multiple bakery applications. Accordingly, also provided herein is an adzuki bean-derived carbohydrate (e.g., starch) fraction or a carbohydrate-rich protein isolate produced by the methods of extraction described herein.

6.4 Scrambled Egg Analog Using Transglutaminase

In another aspect, provided herein is a plant-based scrambled egg analog comprising an adzuki bean protein isolate produced by the methods described herein, wherein the adzuki bean protein has been contacted with transglutaminase to provide advantageous textural, functional and organoleptic properties.

Food processing methods employing transglutaminases have been described in, for example, Japanese Patent 59059151, which discloses treating an emulsion containing proteins, oils or fats, and water with transglutaminase to produce gelatinous, crosslinked gel. Numerous patents disclose use of transglutaminase with milk or cheese such as U.S. Pat. No. 6,093,424 and other references disclose transglutaminase with pea protein isolates, for example, Chinese Patent 101703147A. Even in view of these efforts, the need still exists for methods and compositions to produce an edible emulsion such as an egg substitute or a scrambled egg analog.

Thus, in some embodiments of the methods and compositions provided herein, transglutaminase is added to plant-based egg mimetic emulsions comprising adzuki bean protein isolate to achieve firmer and smoother gel textures upon heating of the emulsions.

In some embodiments, the transglutaminase is microencapsulated when utilized in the preparation of plant-based egg analogs provided herein. Microencapsulation of transglutaminase enzyme in plant-based egg mimetic emulsions maintains a stable emulsion by preventing contact of the protein substrate with the transglutaminase enzyme. Cross-linking reaction is initiated upon heating to melt the microencapsulating composition. Egg mimetic emulsions which include transglutaminase are inherently unstable in that the cross-linking reaction commences upon addition of the transglutaminase enzyme to the emulsion.

In addition to the preparation of plant-based egg analogs from adzuki bean protein isolates, this approach can be applied to other pulse relatives of the legume family which show similar functionality.

One advantage of transglutaminase is enhancing shelf-stable refrigerated or room temperature egg-mimetic emulsions which can be used to produce high-quality prepared food products exhibiting many of the characteristics of cooked or scrambled eggs or baked products, e.g. cakes and cookies, which normally contain eggs. Additional advantage includes producing protein-rich ingredients with variable molecular weight and size creating a range of textures in finished food products. Accordingly, in various aspects, transglutaminase aids in functionality and texture of the final products.

In certain aspects of the invention, the method for producing egg substitute composition comprises contacting a legume protein with an amount of transglutaminase, preferably between 0.0001% to 0.1% to produce desired plant protein isolates. In some preferred embodiments, the method provides an amount of transglutaminase between 0.001% and 0.05%. In more preferred embodiments, the method provides an amount of transglutaminase between 0.001% and 0.0125%. In other embodiments, protein isolates produced outside of the preferred ranges produced scramble analog that were thicker or not readily homogenized into a formulation. Increased amount of transglutaminase to the protein does not appear to precipitate at pH 5.6 when the protein extract is treated with transglutaminase. Accordingly, the additional step of contacting the protein with the preferred amount of transglutaminase produced a desirable scramble analog.

Accordingly, in various aspects, the invention provides a scramble analog comprising the following formulation: Protein Solids: 11.3 g, Water: 81.79 g, Disodium phosphate: 0.4 g, Oil: 6.2 g, NaCl: 0.31 g (based on total weight of 100 g) wherein the protein solids are contacted with between 0.001% and 0.0125% of transglutaminase.

In additional embodiments, the methods and compositions lack lipoxygenase.

Accordingly, the present invention provides compositions for egg replacement, said composition comprising a plant-based protein isolate modified by transglutaminase; wherein said composition is essentially egg-free and, wherein said composition comprises one or more functional properties of a natural egg. Preferably, composition comprises emulsifying properties of a natural egg. More preferably, the composition provides plant-based protein isolate modified by 0.0001% to 0.0125% transglutaminase and exhibits reduced or even significantly reduced lipoxygenase activity or other enzymes which can oxidize lipids, as expressed on a volumetric basis relative to the whole plant extract. More preferably, the composition is essentially free of lipoxygenase or enzymes that can oxidize lipids. In further embodiments, the plant-based protein isolate is stably cross-linked.

In some aspects, the transglutaminase reduces or does not cross-link to lipoxygenase or enzymes that can oxidize lipids. Additional embodiments include encapsulating transglutaminase in microcapsules. The composition comprising the plant-based protein isolate is suitable for refrigeration or storage at room temperature and is shelf stable in emulsion. In further aspects, the transglutaminase is free, cross-linked and/or immobilized.

Additional aspects of the invention include a purified protein isolate comprising: a transglutaminase modified plant protein content of at least 60% by weight; a globulin-type protein content of at least 50% by weight of the plant protein; a reduced oxidative enzyme activity relative to an otherwise unmodified source of the plant protein; and one or more modulated organoleptic properties that differ from the otherwise unmodified source of the plant protein. Preferred embodiments include purified protein isolate modified by 0.0001% to 0.0125% transglutaminase.

In accordance with preferred methods of the invention, provided are methods for producing a purified protein isolate comprising: a. extracting one or more plant protein from a source in an aqueous solution at a pH between about 6.5-10.0; b. precipitating the plant protein at pH near its isoelectric point of a globulin-rich fraction or a pH between about 5.0-6.0; or fractionating and concentrating the plant protein using filtration, microfiltration or ultrafiltration or ion-exchange chromatography; c. recovering the purified protein isolate comprising a plant protein content of at least 60% by weight; a globulin-type protein content of at least 50% by weight of the plant protein; a reduced oxidative enzyme activity relative to an otherwise unmodified source of the plant protein; and one or more modulated organoleptic properties that differ from the otherwise unmodified source of the plant protein; and d. modifying the plant protein with transglutaminase in the extraction step a. or the recovery step b.

Preferred embodiments of the method to produce a purified protein isolate include step d. of modifying the plant protein with transglutaminase in the extraction step a. or the recovery step b. comprises 0.0001% to 0.0125% transglutaminase. Further embodiments provide compositions comprising purified protein isolate that is stably cross-linked and is essentially free of lipoxygenase or enzymes that can oxidize lipids. Additional embodiments include encapsulating and/or immobilizing the transglutaminase.

In accordance with preferred compositions of the invention, provided is an egg substitute composition comprising: plant protein solids, water, disodium phosphate, oil and salts such as NaCl, wherein said plant protein solid comprises a plant-based protein isolate modified by transglutaminase. Preferably, the plant-based protein isolate of the egg substitute composition is modified with 0.0001% to 0.0125% transglutaminase. The transglutaminase reduces or does not cross-link to lipoxygenase or enzymes that can oxidize lipids. In such embodiments, the egg substitute composition exhibits reduced or even significantly reduced lipoxygenase activity or other enzymes which can oxidize lipids. The transglutaminase cross-links proteins other than lipoxygenase and leaves the lipoxygenase free allowing it to stay in the supernatant in the isoelectric precipitation and centrifugation steps, away from the cross-linked protein. More preferably, the egg substitute composition is essentially free of lipoxygenase or enzymes that can oxidize lipids. Additional embodiments include contacting the plant-based protein isolate with transglutaminase that are encapsulated in microcapsules. The resulting egg substitute composition is suitable for refrigeration or storage at room temperature and is shelf stable in emulsion. Upon heating the emulsion, the egg substitute composition forms a gel, e.g., a scrambled egg analog. The egg substitute composition of the invention exhibits one or more organoleptic properties similar to a natural egg. The composition has modulated organoleptic properties such as increased or decreased fluffiness, airiness and mealy texture.

6.4.1 Cross-Linking to Prepare Egg-like Textures

Adzuki bean protein isolates suitable for producing egg-like textures can be prepared by adding a cross-linking step to the methods of preparing adzuki bean isolates provided herein. In one example, the cross-linking step can be added to the extraction step of the procedure, as depicted in FIG. 1B. For instance, a homogenous aqueous solution combining one part of adzuki bean flour with three to fifteen parts of water is prepared and pH adjusted to 6.5 to 8 with a suitable inorganic or organic acid or base. This mixture is centrifuged and the protein rich supernatant is decanted from the carbohydrate rich heavy phase. Transglutaminase powder is added to the protein rich solution at a concentration of 0.001 to 0.5% (w/w), heated to roughly 50 C (optimum reaction temperature for transglutaminase) and incubated for 15 to 90 minutes. The reaction mixture was quickly heated to >70 C for 1 to 5 minutes to inactivate the transglutaminase enzyme. The pH of the solution is adjusted to or near the isoelectric point of the globulin-rich component of the protein mixture (pH of about 5.4-5.8), rapidly cooled to less than 50 C and centrifuged at >3,000×g. The supernatant is decanted, leaving a protein-rich powder, white to light tan in appearance, which can then further processed by commonly-available methods into a dried powder. The protein-rich powder can be incorporated into plant-based egg-mimetic emulsions which produce an egg-like texture upon heating, either in an oven, pan, skillet or hot water bath.

In another example, a homogenous aqueous solution combining one part of adzuki bean flour with three to fifteen parts of water is prepared and pH adjusted to 6.5 to 8 with a suitable inorganic or organic acid or base. The solution is centrifuged at >3000×g and the protein rich supernatant is separated from the carbohydrate rich heavy phase. Transglutaminase powder is added to the solution at a concentration of 0.001 to 0.5% (w/w), heated to roughly 50 C (optimum reaction temperature for transglutaminase) and incubated for 15 to 90 minutes. After incubation, hydrogen peroxide solution is added to the solution to a final concentration of 0.01 to 0.1% (w/w). This oxidizes the cysteine residue on the transglutaminase, arresting activity. The solution is then brought to the PI point of the protein or protein fraction of interest (about 5.4-5.8 pH). The solution is then chilled and centrifuged. The supernatant is then decanted leaving a globulin rich heavy fraction. The globulin-rich fraction is diluted with water to a solids concentration of roughly 5-20% solids (w/w) and then spray dried. This is then mixed with water for spray drying. Sodium hydroxide is a process aid in this process. It has the added benefit of being an anti-microbial agent as well as a bleaching agent. After spray drying, all remnants of the oxidizing agent should have fully decayed.

In another example, adzuki bean extract is contacted with transglutaminase, but the process does not include a step to stop transglutaminase activity. A homogenous aqueous solution combining one part of adzuki bean flour with three to fifteen parts of water is prepared and pH adjusted to 6.5 to 8 with a suitable inorganic or organic acid or base. This is centrifuged at >3000×g and the protein rich supernatant is separated from the carbohydrate rich heavy phase. Transglutaminase powder is added to the solution at a concentration of 0.001 to 0.5% (w/w). The transglutaminase concentration would be chosen to create the desired texture for the finished product. The solution is heated to roughly 50 C (optimum reaction temperature for transglutaminase) and incubated for 15 to 90 minutes. The solution is then brought to the PI point of the protein or protein fraction of interest (about 5.4-5.8 pH). The solution is then chilled and centrifuged. The supernatant is then decanted leaving a globulin rich heavy fraction. The resulting heavy fraction is quickly heated to >70 C for 1 to 5 minutes to inactivate the transglutaminase enzyme. The heavy fraction is mixed with water and spray dried.

Adzuki bean protein isolates suitable for producing egg-like textures can also be prepared by performing cross-linking after acid precipitation of the protein, as depicted in FIG. 1C. In one example, a homogenous aqueous solution combining one part of adzuki bean flour with three to fifteen parts of water is prepared and pH adjusted to 6.5 to 8 with a suitable inorganic or organic acid or base. The solution is then centrifuged at >3,000×g. The protein-rich supernatant is decanted leaving a carbohydrate rich heavy phase. The pH of the protein rich solution is adjusted to or near the isoelectric point of the globulin-rich component of the protein mixture (pH of about 5.4-5.8), resulting in the precipitation of the globulin-rich protein. The solution is centrifuged at >3,000×g. The supernatant is decanted, leaving a globulin-rich protein fraction. This globulin-rich protein fraction is re-diluted in water to achieve a protein concentration of 5 to 25%. Transglutaminase powder is added to the solution at a concentration of 0.001 to 0.5% (w/w), heated to roughly 50 C (optimum reaction temperature for transglutaminase) and incubated for 15 to 90 minutes. The reaction mixture is quickly heated to >70 C for 1 to 5 minutes to inactivate the transglutaminase enzyme. The mixture is then rapidly cooled to less than 50 C and centrifuged at >3,000×g. The supernatant is decanted, leaving a protein-rich powder, white to light tan in appearance, which can then further processed by commonly-available methods into a dried powder. The protein-rich powder can be incorporated into plant-based egg-mimetic emulsions which produce an egg-like texture upon heating, either in an oven, pan, skillet or hot water bath.

In another embodiment in which cross-linking is applied after acid precipitation of the protein, dry fractionation is used in place of aqueous extraction to produce the concentrate, as depicted in FIG. 1D. De-hulled adzuki beans are passed through successive mills, e.g. roller mill, followed by pin mill, to develop a flour with very fine particle size. The flour is then passed through a high-speed cyclone to separate larger from smaller particles. The protein-rich particles, roughly 55-60% protein, are then diluted in water to achieve a solution of roughly 5-25% solids. The pH of the solution is adjusted to or near the isoelectric point of the globulin-rich component of the protein mixture (pH of about 5.4-5.8), resulting in the precipitation of the globulin-rich protein. The solution is centrifuged at >3,000×g. The supernatant is decanted, leaving a globulin-rich protein fraction. This globulin-rich protein fraction is re-diluted in water to achieve a protein concentration of 5 to 25%. Transglutaminase powder is added to the solution at a concentration of 0.001 to 0.5% (w/w), heated to roughly 50 C (optimum reaction temperature for transglutaminase) and incubated for 15 to 90 minutes. The reaction mixture is quickly heated to >70 C for 1 to 5 minutes to inactivate the transglutaminase enzyme. The mixture is then rapidly cooled to less than 50 C and centrifuged at >3,000×g. The supernatant is decanted, leaving a protein-rich powder, white to light tan in appearance, which can then further processed by commonly-available methods into a dried powder. The protein-rich powder can be incorporated into plant-based egg-mimetic emulsions which produce an egg-like texture upon heating, either in an oven, pan, skillet or hot water bath.

6.4.2 Cross-Linking with Immobilized Transglutaminase

As an alternative to using bulk, single-use transglutaminase enzyme, one may treat the process streams using transglutaminase enzyme immobilized on inert porous beads or polymer sheets, which may be used in either flat or spiral-wound configurations in a reactor. Typical immobilized enzyme supports for beads include silicon dioxide (perlite) or calcium alginate. The immobilized transglutaminase is prepared by contacting an aqueous solution of transglutaminase with the bead material and a cross-linking agent, such as glutaraldehyde which fixes the enzyme to the solid substrate. The enzyme-containing support is then dried and conditioned prior to use. The advantages of immobilized enzyme reactors include: 1) improved control of the enzymatic reaction exposure and temperature conditions leading to a more uniform outcome from batch-to-batch; and 2) improved economics enabled by reuse of the transglutaminase enzyme. The solid substrate reduces the potential and rate of denaturation of the transglutaminase enzyme.

6.4.3 Cross-Linking with Microencapsulated Transglutaminase

In some embodiments of the methods provided herein, a microencapsulated transglutaminase enzyme is used for preparing a plant-based liquid egg-like emulsion. For example, an emulsion containing a fat, water and emulsifier is prepared with the fat having a melting point between 50 and 80 C. Representative fats include stearic acid, palm and coconut shortening. Transglutaminase enzyme is then dispersed in the emulsion using a high shear mixer or homogenizer to achieve a flowable solution of rough 5-20% solids. The emulsion is then spray dried under typical conditions (150-175 C), with short residence time. The transglutaminase enzyme-containing spray dried powder can then be incorporate into plant-based egg-mimetic emulsions as described herein.

6.5 Adzuki Bean Isolates with Modified Organoleptic Properties

Also provided herein is a process to produce an edible adzuki bean protein isolate from a source of an adzuki bean protein, the process comprising: subjecting the source of the adzuki bean protein to a fractionation process to obtain a protein-rich fraction, wherein at least 50% by weight of the protein-rich fraction comprises or consists of one or more globulin-type proteins; reducing at least one impurity, the at least one impurity associated with an off-odor or an off-flavor in the edible adzuki bean protein isolate; and purifying the protein-rich fraction to obtain the edible adzuki bean protein isolate. In some embodiments, at least 60% by weight of the edible adzuki bean protein isolate is plant protein. In some embodiments, an oxidative enzymatic activity of the edible protein isolate is lower than a corresponding oxidative enzymatic activity of the source of the plant protein. In some embodiments, an organoleptic property of the edible adzuki bean protein isolate differs from a corresponding organoleptic property of the source of the adzuki bean protein.

In certain aspects, the methods and compositions provide producing purified protein isolates having modulated organoleptic properties of one or more of the following characteristics: astringent, beany, bitter, burnt, buttery, nutty, sweet, sour, fruity, floral, woody, earthy, beany, spicy, metallic, sweet, musty, grassy, green, oily, vinegary, neutral and bland flavor or aromas. Preferably, the purified protein isolates exhibit modulated organoleptic properties such as a reduction or absence in one or more of the following: astringent, beany, bitter, burnt, buttery, nutty, sweet, sour, fruity, floral, woody, earthy, beany, spicy, metallic, sweet, musty, grassy, green, oily, vinegary neutral and bland flavor or aromas.

6.5.1 Methods for Modifying Organoleptic Properties

Preferably, the methods provided herein reduce or remove at least one impurity that may impart or is associated with an off-flavor or off-odor in the purified protein isolate. The one or more impurity may be a volatile or nonvolatile compound and may comprise, for example, lipoxygenase (EC 1.13.11.-), which is known to catalyze oxidation of fatty acids. As other examples, the at least one impurity may comprise a phenol, an alcohol, an aldehyde, a sulfide, a peroxide, or a terpene. Other biologically active proteins classified as albumins are also removed including lectins and protease inhibitors such as serine protease inhibitors and tryptic inhibitors.

In some embodiments, reducing an impurity comprises reducing at least one enzyme that reacts with a lipid substrate. In such embodiments, reducing such impurity reduces at least one lipophilic off-flavor, lipophilic substrate, or a co-factor. In some embodiments, impurities are reduced by a solid absorption procedure using, for example, charcoal, a bentonite clay, or activated carbon.

In some embodiments, the purified adzuki bean protein isolate has a reduced oxidative enzymatic activity relative to the source of the adzuki bean protein. In some embodiments, the oxidative enzymatic activity is lipoxygenase activity. In some embodiments, the purified protein isolate has lower oxidation of lipids or residual lipids relative to the source of the plant protein due to reduced lipoxygenase activity.

In some embodiments, reduced lipoxygenase activity in the adzuki bean protein isolate is effected by contacting an adzuki bean protein extract or isolate with transglutaminase activity. Thus, also provided herein are adzuki bean protein isolates modified by transglutaminase, wherein the isolate exhibits reduced or even significantly reduced lipoxygenase activity (or other enzymes which can oxidize lipids) relative to the plant source of the isolate. For example, the adzuki bean protein isolates modified by transglutaminase can have at least about a 20%, 25%, 30%, 35%, 40%, 45%, 50%, 55%, 60%, 65%, 70%, or 75% reduction in lipoxygenase activity (or activity of an enzyme that can oxidize lipids) relative to the plant source of the isolate. In some embodiments, the amount of transglutaminase used to modify the adzuki bean protein isolates is between about 0.0001% to 0.0125%), as expressed on a volumetric basis to the amount of isolate or extract being modified.

In additional embodiments, reducing the at least one impurity comprises removing a fibrous solid, a salt, or a carbohydrate. Reducing such impurity comprises removing at least one compound that may impart or is associated with the off-flavor or off-odor. Such compounds may be removed, for example, using an activated charcoal, carbon, or clay. As another example, the at least one compound may be removed using a chelating agent (e.g., EDTA, citric acid, or a phosphate) to inhibit at least one enzyme that oxidizes a lipid or a residual lipid. In a particular example, EDTA may be used to bind co-factor for lipoxygenase, an enzyme that can oxidize residual lipid to compounds, e.g. hexanal, which are known to leave to off-flavors.

In some embodiments, separation of the protein from the residual source materials removes the undesirable organoleptic properties associated with proteins such as beany flavors or any of the unsuitable flavor profiles associated with compounds from Table 1, below.

The methods and compositions disclosed herein provide protein isolate characterized by its capacity to exhibit good organoleptic properties, for example by reducing undesired characteristics such as a "beany" aroma and taste. In preferred embodiments, components that are associated with off-flavors are removed or substantially reduced. Removal of undesired compounds may improve aroma, flavor or taste or a combination thereof. In some embodiments, methods for producing proteins isolates reduced in off-flavors involve one or more of the following methods:

1) isoelectric point (pH~5.6+/−0.2) precipitation to significantly reduce the level of lipoxygenase, which can oxidize any residual lipid to compounds, e.g. hexanal, which are known to leave to off-flavors;

2) use of a chelating agent, e.g. EDTA, to bind co-factor for lipoxygenase; and/or 3) use of immobilized activated charcoal after extraction to remove compounds which can contribute to off-flavors. In cases where lipid substrate is abundant, lipids may be collected in the supernatant and removed or reduced. The disclosed methods may provide improved functionality of a protein isolate through enrichment of a class of proteins and reduction of enzymes such as lipoxygenase, that catalyze oxidation primarily of unsaturated fatty acids or unsaturated fats. Accordingly, in some embodiments, methods for purifying a protein fraction or reducing a class of proteins to reduce off-flavors minimally affect the protein isolate composition's capacity to retain one or more desired functional properties.

Accordingly, in certain aspects, the methods and compositions disclosed herein modulate or improve the flavor profile of the protein isolate, which in turn modulates or improves the flavor profile of the food product comprising the protein isolate. In certain embodiments, the removal or reduction of certain non-protein fractions of the source of the plant protein, such as polysaccharides, especially those indigestible forms in legumes, may impart more desirable flavors. The removal or reduction of the non-protein fractions may result in the removal or reduction of undesirable small molecules, including cross-linked polyphenols, volatiles, and heavy metal ions. The disclosed methods and compositions may provide for the removal or reduction of target compounds including but not limited to cross-linked polyphenols, volatiles, heavy metal ions, p-coumaric acid (4-Hydroxycinnamic acid), ferulic acid (4-Hydroxy-3-methoxycinnamic acid) and 4-hydroxybenzoic acid (known polyphenols) in addition to various compounds that are attributed to undesired flavors or aroma. Accordingly, the methods and compositions may provide solubilized plant proteins characterized as having a neutral flavor and/or aroma. In yet other embodiments, the methods and compositions provide for modulation of flavors or aroma wherein a select compound is removed, reduced, or even incorporated.

Accordingly, one or more desired flavors or aroma may be removed, reduced, or added by modulating one or more small molecules that are attributed to certain flavors. One such method involves precipitation of protein to remove small molecules that are commonly associated with imparting undesirable flavors.

One way to characterize the aroma of a food product sample includes use of a GC SNFR Olfactory Port (PerkinElmer). Volatilized compounds from samples are injected into the GC column and the resulting compounds are separated and identified using mass spectrum. Table 1 provides an exemplary list of compounds and their effect on sensory properties. Additional compounds can be separated and identified to associate their sensory properties.

TABLE 1

| Compound Name | Sensory Properties |
| --- | --- |
| 1-heptanol | Green, solvent flavor |
| 1-Hexanol | Sharp, green, fruity |
| 1-pentanol | unpleasant aroma |
| 1-propene, 1-(methylthio) | herbicide |
| 11,4-pentadiene | hydrocarbon odor |
| 2-heptenal | natural nematocyte |
| 2-hexenal | leaf aldehyde |

TABLE 1-continued

| Compound Name | Sensory Properties |
| --- | --- |
| 2-Octenal, (E)- | nutty, cooked flour |
| 2-pentyl-furan | green, fruity |
| Benzaldehyde | almond |
| Benzyl Alcohol | floral |
| Butanedial | — |
| Diallyl disulphide | garlic-derived sulphur compound |
| Dodecanal | natural oil, citrus oil |
| nonanal | naturaloil/Culex attractant/perfume |
| Hstragole | natural oil: anise, tarragon, basil etc. |
| Hexanal | fresh cut grass |
| Hydroperoxide, hexyl | — |
| Pentadecanal pentanal | waxy |
| Sulfoxide, methyl | valeraldehyde; flavoring |
| phenethyl | — |
| Tetradecanal | strong fatty oris odor |
| Trifluoroacetyl-a-terpineol | — |

Accordingly, in some embodiments, the method provides for the removal or reduction of one or more of these and/or other compounds. For example, as shown in Table 1, the presence of hexanal may result in a food product having an aroma resembling fresh cut grass. In some embodiments, such odor is removed or reduced. Similarly, the method provides for iterating, modifying or improving formulations by identifying certain compounds in the formulation, associating the one or more compounds to an olfactory sense and removing or reducing the compounds.

In some embodiments, the purified protein isolate has one or more organoleptic properties that differ from a corresponding organoleptic property of the source of the plant protein. Examples of organoleptic properties include, but are not limited to, astringent flavor or aroma, beany flavor or aroma, bitter flavor or aroma, burnt flavor or aroma, buttery flavor or aroma, nutty flavor or aroma, sweet flavor or aroma, sour flavor or aroma, fruity flavor or aroma, floral flavor or aroma, woody flavor or aroma, earthy flavor or aroma, beany flavor or aroma, spicy flavor or aroma, metallic flavor or aroma, sweet flavor or aroma, musty flavor or aroma, grassy flavor or aroma, green flavor or aroma, oily flavor or aroma, vinegary flavor or aroma, neutral flavor or aroma, or bland flavor or aroma. The source of the plant protein may have a flavor, an aroma, or a sensory impression (e.g., a beany flavor or smell) that makes the source of the plant protein undesirable or unsuitable for use in place of a reference food, such as, for example, an egg. Relative to the source of the plant protein, the purified protein isolate has a modified organoleptic property, and this modified organoleptic property may make the purified protein isolate more suitable for use in or as a substitute for the reference food. In other words, the purified protein isolate may have an organoleptic property that gives the purified protein isolate, or a composition incorporating the purified protein isolate, a flavor, aroma, or sensory impression that is similar or equivalent to the flavor, aroma, or sensory impression of the reference food. For example, the purified protein isolate may reduce or eliminate an organoleptic property of the source of the plant protein.

In some embodiments, an organoleptic property of the purified protein isolate may be similar or equivalent to the corresponding organoleptic property of an egg. In some embodiments, the purified protein isolate provides a flavor, an aroma, or a sensory impression that is similar or equivalent to the flavor, aroma, or sensory impression of a reference food product, such as, for example, an egg (liquid, scrambled, or in patty form), a cake (e.g., pound cake, yellow cake, or angel food cake), a cream cheese, a pasta, an emulsion, a confection, an ice cream, a custard, milk, a deli meat, chicken (e.g., chicken nuggets), or a coating.

6.6 Food Functionality of Adzuki Bean Protein Isolates

In certain aspects, the high purity adzuki bean protein isolates provided herein exhibit desirable functional characteristics such as emulsification, water binding, foaming and gelation properties as measured by standard methods in industry. In comparison to characteristics of an egg, such properties of purified protein isolates as measured are comparable to at least 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or greater. The methods provided herein produce high purity, preferably 50%, 60%, 70%, 80%, 90% or greater adzuki bean protein isolates that exhibit functional properties, e.g., emulsification and gelation consistent to a food product such as an egg. In preferred embodiments, the protein content is at least 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or greater.

The functional properties may include but are not limited to crumb density, structure/texture, elasticity/springiness, coagulation, binding, moisturizing, mouthfeel, leavening, aeration/foaming, creaminess, and emulsification of the food product such as an egg. Mouthfeel is a concept used in the testing and description of food products. Products made using exemplary protein isolates can be assessed for mouthfeel. In some embodiments products, e.g., baked goods, made using exemplary protein isolates have mouthfeel that is similar to products made with natural eggs. In some embodiments the mouthfeel of the products made using the exemplary protein isolates is superior to the mouthfeel of previously known or attempted egg substitutes, e.g., bananas, modified whey proteins, or Egg Beaters™.

Examples of properties which may be included in a measure of mouthfeel include: Cohesiveness: Degree to which the sample deforms before rupturing when biting with molars; Density: Compactness of cross section of the sample after biting completely through with the molars; Dryness: Degree to which the sample feels dry in the mouth; Fracturability: Force with which the sample crumbles, cracks or shatters. Fracturability encompasses crumbliness, crispiness, crunchiness and brittleness; Graininess: Degree to which a sample contains small grainy particles, may be seen as the opposite of smoothness; Gumminess: Energy required to disintegrate a semi-solid food to a state ready for swallowing; Hardness: Force required to deform the product to given distance, i.e., force to compress between molars, bite through with incisors, compress between tongue and palate; Heaviness: Weight of product perceived when first placed on tongue; Moisture absorption: Amount of saliva absorbed by product; Moisture release: Amount of wetness/juiciness released from sample; Mouthcoating: Type and degree of coating in the mouth after mastication (for example, fat/oil); Roughness: Degree of abrasiveness of product's surface perceived by the tongue; Slipperiness: Degree to which the product slides over the tongue; Smoothness: Absence of any particles, lumps, bumps, etc., in the product; Uniformity: Degree to which the sample is even throughout; homogeneity; Uniformity of Bite: Evenness of force through bite; Uniformity of Chew: Degree to which the chewing characteristics of the product are even throughout mastication; Viscosity: Force required to draw a liquid from a spoon over the tongue; and Wetness: Amount of moisture perceived on product's surface.

The purified protein isolate may also have one or more functional properties by itself or when incorporated into a composition. Such functional properties may include, but are not limited to, one or more of emulsification, water binding capacity, foaming, gelation, crumb density, structure forming, texture building, cohesion, adhesion, elasticity, springiness, solubility, viscosity, fat absorption, flavor binding, coagulation, leavening, aeration, creaminess, film forming property, sheen addition, shine addition, freeze stability, thaw stability, or color.

In some embodiments, at least one functional property of the purified protein isolate differs from the corresponding functional property of the source of the plant protein. In some embodiments, at least one functional property of the purified protein isolate is similar or equivalent to the corresponding functional property of a reference food product, such as, for example, an egg (liquid, scrambled, or in patty form), a cake (e.g., pound cake, yellow cake, or angel food cake), a cream cheese, a pasta, an emulsion, a confection, an ice cream, a custard, milk, a deli meat, chicken (e.g., chicken nuggets), or a coating.

In some embodiments, when the purified protein isolate is included in a food composition, the food composition has at least one functional property that is similar or equivalent to the corresponding functional property of a reference food product, such as, for example, an egg, liquid egg, scrambled egg, an egg patty, a cake (e.g., pound cake, yellow cake, or angel food cake), cream cheese, pasta, an emulsion, a confection, an ice cream, a custard, milk, a deli meat, chicken (e.g., chicken nuggets), or a coating.

In some embodiments, the purified protein isolate, either alone or when incorporated into a composition, is capable of forming a gel under heat or at room temperature.

6.7 Food Applications of Adzuki Bean Isolates

In some embodiments, the adzuki bean protein isolate provided herein is used as a direct protein replacement of animal- or vegetable-based protein in a variety of conventional food and beverage products across multiple categories at use levels. In some embodiments, the adzuki bean protein isolate is also used as a supplement to existing protein in food products. Table 2 provides exemplary uses of the adzuki protein a wide range of food categories.

TABLE 2

Exemplary Food-Uses and Use Levels for Adzuki Bean Protein Isolate in Conventional Food and Beverage Products

| Food Category | Proposed Food-Uses | Highest Use Level of Adzuki Bean Protein Isolate (%) in Final Product |
|---|---|---|
| Baked Goods and Baking Mixes | Cereal and granola bars | 10 |
|  | Crackers | 5 |
|  | Meal replacement/nutritional bars/energy bars | 30 |

TABLE 2-continued

Exemplary Food-Uses and Use Levels for Adzuki Bean Protein Isolate in Conventional Food and Beverage Products

| Food Category | Proposed Food-Uses | Highest Use Level of Adzuki Bean Protein Isolate (%) in Final Product |
|---|---|---|
| Beverages and Beverage Bases | Fermented beverages made from rice/barley/grains/legumes/tea | 8 |
| | Non-milk based instant protein powders | 90 (powder) |
| | Non-milk based nutritional beverages (RTD, and powdered types) including protein-enriched fruit smoothies | 20 (as consumed) |
| | Non-milk based weight control beverages, instant shakes, and protein drinks (RTD and powdered types) | 10 (as consumed) |
| Breakfast Cereals | Breakfast cereals (RTE) | 3 |
| Condiments and Relishes | Bean dips and spreads | 5 |
| | Seasoning sauces | 3 |
| Dairy Product Analogs | Non-dairy cheese | 5 |
| | Non-dairy cream cheese, spread, and dips | 5 |
| | Non-dairy cream or sour cream (liquid and powder) | 3 |
| | Non-dairy ice cream and frozen desserts | 3 |
| | Non-dairy milk | 3 |
| | Non-dairy coffee whiteners | 3 |
| | Non-dairy yogurt and non-dairy drinkable yogurts | 8 |
| | Whipped topping | 3 |
| Frozen Dairy Desserts and Mixes | Ice cream and other frozen dairy desserts | 3 |
| Fruit and Water Ices | Ice pops and sorbets | 3 |
| Gelatins, Puddings, and Fillings | Puddings and mousse | 3 |
| Grain Products and Pasta | Pasta | 4 |
| Milk Products | Milk-based instant protein powders | 90 (powder) |
| | Milk-based nutritional beverages (RTD and powdered types) | 5 (as consumed) |
| | Milk-based weight control beverages, instant milkshakes, protein drinks (RTD and powdered types), and milk-based smoothies | 3 (as consumed) |
| Plant Protein Products | Egg product analogs (meringue) | 5 |
| | Egg product analogs (quiche, frittata) | 8 |
| | Egg product analogs (scrambled eggs, omelet, hard boiled, liquid) | 20 |
| | Vegetarian food products and meat analogues | 20 |
| Snack Foods | Snack chips, popcorn, extruded snacks | 5 |

The purified adzuki bean protein isolates provided herein are suitable for various food applications and have been incorporated into, e.g., edible egg-free emulsion, egg analog, egg-free scrambled eggs, egg-free patty, egg-free pound cake, egg-free angel food cake, egg-free yellow cake, egg-free cream cheese, egg-free pasta dough, egg-free custard, egg-free ice cream, and dairy-free milk.

In various aspects, the compositions and methods incorporate one or more purified protein isolates in multiple food applications including liquid and patty scrambled egg substitute to a desired level of emulsification, water binding and gelation. In a preferred embodiment, a functional egg replacement product comprises purified protein isolate or extract (10-15%), oil (10%), hydrocolloid, preservative, and optionally flavors, water, lecithin, xanthan, sodium carbonate, black salt.

Accordingly, the methods and compositions enable ingredients to have desired functionalities from one or more purified protein isolates that are suitable as replacement ingredients in various food applications including but not limited to meat substitutes, egg substitutes, baked goods and fortified drinks.

In some embodiments, the purified protein isolate is incorporated in an egg substitute. In some such embodiments, the organoleptic property of the purified protein isolate (e.g., a flavor or an aroma) is similar or equivalent to a corresponding organoleptic property of an egg. The egg substitute may exhibit at least one functional property (e.g., emulsification, water binding capacity, foaming, gelation, crumb density, structure forming, texture building, cohesion, adhesion, elasticity, springiness, solubility, viscosity, fat absorption, flavor binding, coagulation, leavening, aeration, creaminess, film forming property, sheen addition, shine addition, freeze stability, thaw stability, or color) that is similar or equivalent to a corresponding functional property of an egg. In addition to the purified protein isolate, the egg substitute may include but are not limited to one or more of iota-carrageenan, gum arabic, konjac, xanthan gum, or gellan.

In some embodiments, the purified protein isolate is incorporated in an egg-free cake, such as a pound cake, a yellow cake, or an angel food cake. In some such embodiments, at least one organoleptic property (e.g., a flavor or an aroma) of the egg-free cake is similar or equivalent to a corresponding organoleptic property of a cake containing eggs. The egg-free cake may exhibit at least one functional property similar or equivalent to a corresponding functional property of a cake containing eggs. The at least one function property may be, for example, one or more of emulsification, water binding capacity, foaming, gelation, crumb density, structure forming, texture building, cohesion, adhesion, elasticity, springiness, solubility, viscosity, fat absorption, flavor binding, coagulation, leavening, aeration, creaminess, film forming property, sheen addition, shine addition, freeze stability, thaw stability, or color.

In some embodiments, the purified protein isolate is incorporated into an egg-free cake mix or an egg-free cake batter. In some such embodiments, the egg-free cake mix or batter has at least one organoleptic property (e.g., a flavor or aroma) of the egg-free cake batter is similar or equivalent to a corresponding organoleptic property of a cake mix or batter containing eggs. The egg-free cake mix or batter may exhibit at least one functional property similar or equivalent to a corresponding functional property of a cake batter containing eggs. The at least one functional property may be, for example, one or more of emulsification, water binding capacity, foaming, gelation, crumb density, structure forming, texture building, cohesion, adhesion, elasticity, springiness, solubility, viscosity, fat absorption, flavor binding, coagulation, leavening, aeration, creaminess, film forming property, sheen addition, shine addition, freeze stability, thaw stability, or color.

In some embodiments in which the purified protein isolate is included in an egg-free pound cake, a peak height of the egg-free pound cake is at least 90% of the peak height of a pound cake containing eggs. In some embodiments in which the purified protein isolate is included in an egg-free pound cake batter, a specific gravity of the egg-free pound cake batter is 0.95-0.99.

In some aspects, increased functionality is associated with the purified protein isolate in a food application. For instance, food products produced with the purified protein isolate may exhibit increased functionality in dome or crack, cake resilience, cake cohesiveness, cake springiness, cake peak height, specific gravity of batter, center doming, center crack, browning, mouthfeel, spring-back, off flavors or flavor.

In some embodiments, the purified protein isolate is included in a cream cheese, a pasta dough, a pasta, a milk, a custard, a frozen dessert (e.g., a frozen dessert comprising ice cream), a deli meat, or chicken (e.g., chicken nuggets).

In some embodiments, the purified protein isolate is incorporated in a food or beverage composition, such as, for example, an egg substitute, a cake (e.g., a pound cake, a yellow cake, or an angel food cake), a cake batter, a cake mix, a cream cheese, a pasta dough, a pasta, a custard, an ice cream, a milk, a deli meat, or a confection. The food or beverage composition may provide sensory impressions similar or equivalent to the texture and mouthfeel that replicates a reference food or beverage composition. In some embodiments, before being included in a food or beverage composition, the purified protein isolate is further processed in a manner that depends on a target application for the purified protein isolate. For example, the purified protein isolate may be diluted in a buffer to adjust the pH to a pH appropriate for the target application. As another example, the purified protein isolate may be concentrated for use in the target application. As yet another example, the purified protein isolate may be dried for use in the target application.

Various food applications incorporating high purity protein isolates from adzuki bean as the main functional ingredient were made including an egg-free emulsion (e.g. for an egg-free food product similar or equivalent to scrambled eggs), pound cake, yellow cake, angel food cake, a cream cheese, a pasta dough, a pasta, a custard, an ice cream, a milk, a deli meat, or a confection.

6.7.1 Vegan Patty

Various experiments provide evidence that adzuki bean protein isolate are suited for use as the sole gelling agent in a formulated vegan patty. In some embodiments, a hydrocolloid system comprised of iota-carrageenan and gum arabic enhances native gelling properties of adzuki bean isolate in a formulated patty. In other embodiments, a hydrocolloid system comprised of high-acyl and low-acyl gellan in a 1.5:1 ratio enhances native gelling properties of adzuki bean isolate in a formulated patty. In further embodiments, a hydrocolloid system comprised of konjac and xanthan gum enhances native gelling properties of adzuki bean isolate in a formulated patty.

6.7.2 Egg-Free Emulsion

In another aspect, provided herein is an edible egg-free emulsion comprising an adzuki bean protein isolate described herein. In some embodiments, the emulsion comprises one or more additional components selected from water, oil, fat, hydrocolloid, and starch. In some embodiments, at least or about 60-85% of the edible egg-free emulsion is water. In some embodiments, at least or about 10-20% of the edible egg-free emulsion is the protein isolate. In some embodiments, at least or about 5-15% of the edible egg-free emulsion is oil or fat. In some embodiments, at least or about 0.01-6% of the edible egg-free emulsion is the hydrocolloid fraction or starch. In some embodiments, the hydrocolloid fraction comprises high-acyl gellan gum, low-acyl gellan gum, iota-carrageenan, gum arabic, konjac, locust bean gum, guar gum, xanthan gum, or a combination of one or more gums thereof. In some embodiments, the emulsion further comprises one or more of: a flavoring, a coloring agent, an antimicrobial, a leavening agent, and salt.

In some embodiments, the emulsion further comprises phosphate. In some embodiments, the phosphate is selected from the group consisting of disodium phosphate (DSP), sodium hexamethaphosphate (SHMP), tetrasodium pyrophosphate (TSPP). In a particular embodiment, the emulsion comprises DSP. In another particular embodiment, the emulsion comprises DSP. In some embodiments, the amount of DSP in the emulsion is at least or about 0.01%, 0.02%, 0.03%, 0.04%, 0.05%, 0.06%, 0.07%, 0.08%, 0.09%, 0.1%, 0.11%, 0.12%, 0.13%, 0.14% or 0.15%; or greater than 0.15%. In another particular embodiment, the emulsion comprises SHMP. In some embodiments, the SHMP is a short chain SHMC, regular chain SHMP or a long chain SHMP. In some embodiments, the amount of SHMP in the emulsion is at least or about 0.4%, 0.5%, 0.6%, 0.7%, 0.8%, 0.9%, or 1%; or greater than 1%.

In a particular embodiment, provided herein is an edible egg-free emulsion having a pH of about 5.6 to 6.8. In some embodiments, the edible egg-free emulsion comprises water, an adzuki bean protein isolate described herein, an enzyme that modifies a structure of the protein isolate, and oil or fat. In some embodiments, the enzyme comprises a transglutaminase or proteolytic enzyme. In some embodiments, at least or about 70-85% of the edible egg-free emulsion is water. In some embodiments, at least or about 7-15% of the edible egg-free emulsion is the protein isolate. In some embodiments, at least or about 0.0005-0.0025% (5-25 parts per million) of the edible egg-free emulsion is the enzyme that modifies the structure of the protein isolate. In some embodiments, at least or about 5-15% of the edible egg-free emulsion is oil or fat.

Also provided herein is a patty made using any of the egg-free emulsions described above.

In some embodiments, a method provides an egg-free emulsion prepared using the protein isolate described herein, wherein the egg-free emulsion may be used to make for example an egg-free food product similar or equivalent to scrambled eggs, an omelet, or a quiche prepared using eggs. Accordingly, in some embodiments an egg-free emulsion comprises one or more of the exemplary protein isolates disclosed herein. The egg-free emulsion may further comprise for example a lipid, one or more carbohydrates, and optionally a protein-modifying enzyme, salt, flavorings, and/or colors. The proportions of these ingredients may be selected to modulate the texture, flavor, and/or color of the resulting egg-free food product. The resulting egg-free food product may provide sensory impressions similar or equivalent to the texture and mouthfeel that replicates an egg. Sensory quality parameters of a liquid scramble and patty are characterized as soft, compact gel with clean bite and moderate chewiness similar to eggs.

6.7.3 Baked Cakes

In another aspect, provided herein are one or more egg-free cake mixes, suitable for preparing one or more egg-free cake batters, from which one or more egg-free cakes can be made. In some embodiments, the egg-free cake mix comprises flour, sugar, and an adzuki bean protein isolate described herein. In some embodiments, the egg-free cake mix further comprises one or more additional components selected from: cream of tartar, disodium phosphate, baking soda, and a pH stabilizing agent. In some embodiments, the flour comprises cake flour.

Also provided herein is an egg-free cake batter comprising an egg-free cake mix described above, and water. In some embodiments, the egg-free cake batter is an egg-free pound cake batter, an egg-free angel food cake batter, or an egg-free yellow cake batter. In some embodiments, the egg-free cake batter has a specific gravity of 0.95-0.99.

Also provided herein is an egg-free cake made from an egg-free cake batters described above. In some embodiments, a peak height of the egg-free cake is at least 90% of a peak height of a pound cake containing eggs. In some embodiments, one or more characteristics of the egg-free cake is similar or equivalent to one or more corresponding characteristics of a cake containing eggs. In some embodiments, the one or more characteristics comprise resilience, cohesiveness, springiness, peak height, center doming, center crack, browning, mouthfeel, spring-back, or flavor. In some embodiments, the one or more characteristics comprise hardness, resilience, cohesiveness, springiness, or chewiness. In some embodiments, the one or more characteristics comprise a functional property or an organoleptic property. In some embodiments, the functional property comprises one or more of: emulsification, water binding capacity, foaming, gelation, crumb density, structure forming, texture building, cohesion, adhesion, elasticity, springiness, solubility, viscosity, fat absorption, flavor binding, coagulation, leavening, aeration, creaminess, film forming property, sheen addition, shine addition, freeze stability, thaw stability, or color.

In a particular embodiment, provided herein is an egg-free pound cake mix, comprising flour, sugar, and an adzuki bean protein isolate described herein. In some embodiments, the flour comprises cake flour. In some embodiments, the egg-free pound cake mix further comprises oil or fat. In some embodiments, the oil or fat comprises butter or shortening. In some embodiments, at least or about 25-31% of the egg-free pound cake batter is flour. In some embodiments, at least or about 25-31% of the egg-free pound cake batter is oil or fat. In some embodiments, at least or about 25-31% of the egg-free pound cake batter is sugar. In some embodiments, at least or about 6-12% of the egg-free pound cake batter is the protein isolate. In some embodiments, the batter further comprises disodium phosphate or baking soda.

Also provided herein is an egg-free pound cake batter comprising an egg-free pound cake mix described above, and further comprising water. In some embodiments, the egg-free pound cake batter comprises about four parts of the egg-free pound cake mix; and about one part water. In some embodiments, at least or about 20-25% of the egg-free pound cake batter is flour. In some embodiments, at least or about 20-25% of the egg-free pound cake batter is oil or fat. In some embodiments, at least or about 20-25% of the egg-free pound cake batter is sugar. In some embodiments, at least or about 5-8% of the egg-free pound cake batter is the protein isolate. In some embodiments, at least or about 18-20% of the egg-free pound cake batter is water.

In another particular embodiment, provided herein is an egg-free angel food cake mix comprising flour, sugar, and an adzuki bean protein isolate described herein. In some embodiments, at least or about 8-16% of the egg-free angel food cake mix is flour. In some embodiments, at least or about 29-42% of the egg-free angel food cake mix is sugar. In some embodiments, at least or about 7-10% of the egg-free angel food cake mix is the protein isolate. In some embodiments, the egg-free angel food cake mix further comprises cream of tartar, disodium phosphate, baking soda, or a pH stabilizing agent. In some embodiments, the flour comprises cake flour. Also provided herein is an egg-free angel food cake batter comprising an egg-free angel food cake mix described above, and water.

In another particular embodiment, provided herein is an egg-free yellow cake mix, comprising flour, sugar, and an adzuki bean protein isolate described herein. In some embodiments, at least or about 20-33% of the egg-free yellow cake mix is flour. In some embodiments, at least or about 19-39% of the egg-free yellow cake mix is sugar. In some embodiments, at least or about 4-7% of the egg-free yellow cake mix is the protein isolate. In some embodiments, the egg-free yellow cake mix further comprises one or more of baking powder, salt, dry milk, and shortening. Also provided herein is an egg-free yellow cake batter comprising an egg-free yellow cake mix described above, and water.

Some embodiments provide methods to produce an egg-free pound cake using a protein isolate. For instance, a batter is created by mixing liquid solution comprising adzuki bean protein isolate with sugar, cake flour, and butter at 17° C. to 20° C. in 1:1:1:1 w/w ratio. The ingredients are blended together using single stage mixing on Hobart mixer for 6 minutes at 22° C. The batter is baked in pound cake pan for 45 minutes in 150° C. and cooled in pan for 2 hours at 22° C.

Sensory quality parameters of cakes made with the protein isolates are characterized as fluffy, soft, airy texture. The peak height was measured to be 90-110% of pound cake containing eggs. The specific gravity of cake batter with the purified adzuki bean protein isolate was 0.95-0.99 which was similar to that of cake batter with whole eggs of 0.95-0.96.

6.7.4 Cream Cheese Analog

In another aspect, provided herein is an egg-free cream cheese comprising an adzuki bean protein isolate described herein. In some embodiments, the egg-free cream cheese comprises one or more additional components selected from water, oil or fat, and hydrocolloid. In some embodiments, at least or about 75-85% of the egg-free cream cheese is water. In some embodiments, at least or about 10-15% of the egg-free cream cheese is the protein isolate. In some embodiments, at least or about 5-10% of the egg-free cream cheese is oil or fat. In some embodiments, at least or about 0.1-3% of the egg-free cream cheese is hydrocolloid. In some embodiments, the hydrocolloid comprises xanthan gum or a low-methoxy pectin and calcium chloride system. In some embodiments, the egg-free cream cheese further comprises a flavoring or salt. In some embodiments, one or more characteristics of the egg-free cream cheese is similar or equivalent to one or more corresponding characteristics of a cream cheese containing eggs. In some embodiments, the characteristic is a taste, a viscosity, a creaminess, a consistency, a smell, a spreadability, a color, a thermal stability, or a melting property. In some embodiments, the characteristic comprises a functional property or an organoleptic property. In some embodiments, the functional property comprises: emulsification, water binding capacity, foaming, gelation, crumb density, structure forming, texture building, cohesion, adhesion, elasticity, springiness, solubility, viscosity, fat absorption, flavor binding, coagulation, leavening, aeration, creaminess, film forming property, sheen addition, shine addition, freeze stability, thaw stability, or color. In some embodiments, the organoleptic property comprises a flavor or an odor.

Example 31 provides an exemplary cream cheese analog using a hydrocolloid system comprised of low-methoxy pectin with CaCl2 forms a continuous, soft gel with textural organoleptic properties reminiscent of cream cheese. Additional results provide a hydrocolloid system comprised of xanthan gum forms a continuous, soft gel with textural organoleptic properties reminiscent of cream cheese.

6.7.5 Egg-Free Pasta Dough

In another aspect, provided herein is an egg-free pasta dough comprising an adzuki bean protein isolate described herein. In some embodiments, the egg-free pasta dough comprises one or more additional components selected from flour, oil or fat, and water. In some embodiments, the flour comprises semolina flour. In some embodiments, the oil or fat comprises extra virgin oil. In some embodiments, the egg-free pasta dough further comprises salt. Also provided herein is an egg-free pasta made from an egg-free pasta dough described above. In some embodiments, the egg-free pasta is fresh. In some embodiments, the egg-free pasta is dried. In some embodiments, one or more characteristics of the egg-free pasta is similar or equivalent to one or more corresponding characteristics of a pasta containing eggs. In some embodiments, the one or more characteristics comprise chewiness, density, taste, cooking time, shelf life, cohesiveness, or stickiness. In some embodiments, the one or more characteristics comprise a functional property or an organoleptic property. In some embodiments, the functional property comprises: emulsification, water binding capacity, foaming, gelation, crumb density, structure forming, texture building, cohesion, adhesion, elasticity, springiness, solubility, viscosity, fat absorption, flavor binding, coagulation, leavening, aeration, creaminess, film forming property, sheen addition, shine addition, freeze stability, thaw stability, or color. In some embodiments, the organoleptic property comprises a flavor or an odor.

6.7.6 Plant-Based Milk

In another aspect, provided herein is a plant-based milk comprising an adzuki bean protein isolate described herein. In some embodiments, the plant-based milk comprises one or more additional components selected from water, oil or fat, and sugar. In some embodiments, at least or about 5% of the plant-based milk is the protein isolate. In some embodiments, at least or about 70% of the plant-based milk is water. In some embodiments, at least or about 2% of the plant-based milk is oil or fat. In some embodiments, the plant-based milk further comprises one or more of: disodium phosphate, soy lecithin, and trace minerals. In particular embodiments, the plant-based milk is lactose-free. In other particular embodiments, the plant-based milk does not comprise gums or stabilizers.

6.7.7 Egg-Free Custard

In another aspect, provided herein is an egg-free custard comprising an adzuki bean protein isolate described herein. In some embodiments, the egg-free custard comprises one or more additional components selected from cream and sugar. In some embodiments, at least or about 5% of the egg-free custard is the protein isolate. In some embodiments, at least or about 81% of the egg-free custard is cream. In some embodiments, at least or about 13% of the egg-free custard is sugar. In some embodiments, the egg-free custard further comprises one or more of: iota-carrageenan, kappa-carrageenan, vanilla, and salt. In some embodiments, the cream is heavy cream.

6.7.8 Egg-Free Ice Cream

In another aspect, provided herein is an egg-free ice cream comprising an adzuki bean protein isolate described herein. In some embodiments, the egg-free ice cream is a soft-serve ice cream or a regular ice cream. In some embodiments, the egg-free ice cream comprises one or more additional components selected from cream, milk, and sugar. In some embodiments, at least or about 5% of the egg-free ice cream is the protein isolate. In some embodiments, at least or about 41% of the egg-free ice cream is cream. In some embodiments, at least or about 40% of the egg-free ice cream is milk. In some embodiments, at least or about 13% of the egg-free ice cream is sugar. In some embodiments, the egg-free ice cream further comprises one or more of iota-carrageenan, kappa-carrageenan, vanilla, and salt. In some embodiments, the cream is heavy cream. In some embodiments, the milk is whole milk. In particular embodiments, the egg-free ice cream is lactose-free. In other particular embodiments, the egg-free ice cream does not comprise gums or stabilizers. In other embodiments, the egg-free ice provides a traditional mouthfeel and texture of an egg-based ice cream but melts at a slower rate relative to an egg-based ice cream.

6.7.9 Food Applications: Co-Ingredients

6.7.9.1 Gums

Various gums useful for formulating food products include, e.g., gum acacia, Versawhip, Guar+Xanthan, Q-extract, CMC 6000 (Carboxymethylcellulose), *Citri*-Fi 200 (citrus fiber), Apple fiber, Fenugreek fiber.

6.7.9.2 Starches

Starch is one of the most prevalent food ingredients, and has been shown to have useful emulsifying properties. Starch and starch granules are known to stabilize emulsions. Consequently, one or more starches are produced from plant compositions, such as, for example, arrowroot starch, cornstarch, tapioca starch, adzuki bean starch, potato starch, sweet potato starch, rice starch, sago starch, wheat starch. The hydrophobicity allows starch to be adsorbed at the oil-water interface, which prevents re-coalescence and hence droplet stability.

6.7.9.3 Preservatives

In certain embodiments, the methods and compositions comprise an effective amount of an added preservative in combination with the protein isolate.

Preservatives prevent food spoilage from bacteria, molds, fungi, or yeast (antimicrobials); slow or prevent changes in color, flavor, or texture and delay rancidity (antioxidants); maintain freshness. They include but are not limited to the following: ascorbic acid, citric acid, sodium benzoate, calcium propionate, sodium erythorbate, sodium nitrite, calcium sorbate, potassium sorbate, BHA, BHT, EDTA, tocopherols (Vitamin E) and antioxidants, which prevent fats and oils and the foods containing them from becoming rancid or developing an off-flavor. See Table 3.

TABLE 3

| Substance/class | Some foodstuffs in which they are used |
| --- | --- |
| Sorbic acid and sorbate compounds | Cheese, wines, dried fruit, fruit sauces, toppings |
| Benzoic acid, and benzoate | Pickled vegetables, low sugar jams and jellies, candied fruits, semipreserved fish products, sauces |
| Sulphur dioxide and sulphite compounds | Dried fruits, fruit preserves, potato products, wine |
| Natamycin | Surface treatment of cheese and sausage |
| Nitrite and nitrate compounds | Sausage, bacon, ham, foie gras, cheese, pickled herring |

6.8 Storage and Shelf Life of Compositions

In some embodiments, the protein isolate or compositions comprising the protein isolate may be stable in storage at room temperature for up to 1, 2, 3, 4, 5, 6, 7, 8, 9, or 10 weeks. In some embodiments, the protein isolate or compositions comprising the protein isolate may be stable for storage at room temperature for months, e.g. greater than 1, 2, 3, 4, 5, 6, 7, 8, 9, 10, 11, 12, or 13 months. In some embodiments, the protein isolate or compositions comprising the protein isolate may be stable for refrigerated or freezer storage for months, e.g. greater than 1, 2, 3, 4, 5, 6, 7, 8, 9, 10, 11, 12, or 13 months. In some embodiments, the protein isolate or compositions comprising the protein isolate may be stable for refrigerated or freezer storage for years, e.g. greater than 1, 2, 3, 4, 5, 6, 7, 8, 9, 10, 11, 12, or 13 years. In some embodiments, the protein isolate or compositions comprising the protein isolate may be stable for storage at room temperature for months, e.g. greater than 1, 2, 3, 4, 5, 6, 7, 8, 9, 10, 11, 12, or 13 months. In some embodiments, the protein isolate or compositions comprising the protein isolate may be stable for storage at room temperature for years, e.g. greater than 1, 2, 3, 4, 5, 6, 7, 8, 9, 10, 11, 12, or 13 years.

In some embodiments, storage as a dry material can increase the shelf-life of the protein isolate or a composition comprising the protein isolate. In some embodiments protein isolate or a composition comprising the protein isolate is stored as a dry material for later reconstitution with a liquid, e.g. water. In some embodiments, the purified protein isolate is in powdered form, which may be less expensive to ship, lowers risk for spoilage and increases shelf-life (due to greatly reduced water content and water activity).

In other embodiments the purified protein isolate or a composition comprising the protein isolate is reconstituted with a liquid, e.g. water, milk, or other liquid suitable for consumption. In one example, 36-45 grams of liquid can be added to 12-15 grams dry weight of the composition to produce a liquid scramble. The amount of liquid can be varied to suit a particular purpose for the reconstituted composition.

In additional embodiments, food composition comprising the purified protein isolate or a formulation thereof in an emulsion, under heat, under refrigeration or colder conditions or not ambient conditions.

7. EXAMPLES

7.1 Example 1: Charcoal Treatment of Protein Extracts

This example provides an exemplary protocol for performing a carbon adsorption step to remove non-protein, off-flavor components (such as beany flavor) in the protein extraction process. Typical starting weights for input legume flour or material range from 1-12 kg, and typical yield is about 25% with a moisture content around 78%.

Charcoal specifications: ~500 um-1500 um particle size, 12×30 mesh size, acid washed.

Charcoal preparation: 100 g charcoal is mixed in 3 kg of water, poured through a filter and collected. This wash step is repeated for a total of 2 washes.

Preparation of extract: water is combined with flour in a 3:1 water-to-flour ratio, then centrifuged at 6000×g for 20 minutes at 4° C. Supernatant is collected and filtered through 100 um Nylon mesh.

Charcoal treatment: prepared charcoal is mixed with 1 L of extract and stirred for 15 minutes. The extract-charcoal mixture is then filtered through a 100 um filter to remove large charcoal particles, and centrifuged at 10,000×g for 15 minutes at 4° C. to remove remaining ash. 500 mM CaNa2EDTA is added to the extract to a final concentration of 2 mM CaNa2 EDTA, mixed, then incubated at 4° C. for 60 minutes. Rapid dilution of the filtrate is performed in cold (4° C.) 0.3% NaCl at a ratio of 1 volume of supernatant to 3 volumes of cold 0.3% NaCl. The filtrate is then centrifuged at 10,000×g for 15 minutes at 4° C., and the pellet collected.

The pellet is suspended and homogenized 1:4 (w/w) with 0.3% NaCl+0.7 mM CaNa2 EDTA (4° C.), and centrifuged at 10,000×g for 15 minutes at 4° C. The resulting pellet is washed 1:4 (w/w) with 0.3% NaCl (4° C.), then centrifuged at 10,000×g for 15 minutes at 4° C.

The final pellet is homogenized and the moisture content is recorded.

7.2 Example 2: Protein Isolate Purification Protocol

This example provides an exemplary protocol for preparing adzuki bean protein isolate.

A. Multistage Extraction.

Water is mixed with adzuki bean flour in a 5:1 tap water-to-flour ratio. The pH of the mixture is adjusted to pH 6.5-pH 8 with NaOH. The mixture is centrifuged at 6000×g for 15 minutes at 4° C. The extract is collected and the pellet is resuspended in 3:1 water-to-flour. The pH is adjusted to pH 6.5-pH 8 with NaOH, and centrifuged again at 6000×g for 15 minutes at 4° C. Both extracts are combined and filtered through 100 um Nylon mesh.

B. Charcoal Filtration or Off-Flavor Removal (Optional).

Charcoal specifications: —500 um-1500 um particle size, 12×30 mesh size, acid washed. Charcoal preparation: 100 g of charcoal is mixed in 3 kg of water, poured through a filter, and the charcoal is collected. 1 g of charcoal is then added to 10 g of extract and incubated for ~15 min. The mixture is then centrifuged at 10000×g for 15 minutes, 4° C. The mixture can also be treated with a chelating agent, for example, 2 mM CaNa2 EDTA.

C. Acid Precipitations.

Isoelectric precipitation at pH 5.6+/−0.2 is combined with a cryo-precipitation method at 1-4° C. pH is brought down to pH 5.4-5.8 with 20% Citric Acid. Cool on ice for 1 h. Alternatively, low ionic strength precipitation can be performed at very high flow rates combined with cryo-precipitation method (at 1-4° C.). Rapid dilution of the filtrate is performed in cold (4° C.) 0.3% NaCl at a ratio of 1 volume of supernatant to 3 volumes of cold 0.3% NaCl. The filtrate is then centrifuged at 10,000×g for 15 minutes at 4° C.

D. Recovery.

The pellet is collected, resuspended and homogenized 1:4 (w/w) with 0.3% NaCl (4° C.). The pH is maintained at 5.6+/−0.1 with citric acid. The suspension is centrifuged at 10,000×g for 15 minutes at 4° C., and the final pellet is homogenized. The final pellet is homogenized and the moisture content is recorded.

7.3 Example 3: Pilot Scale Protein Isolation Method

This example provides an exemplary protocol for pilot scale preparation of adzuki bean protein isolates. A general process block flow diagram is shown in FIG. 3. The process starts with a protein extraction stage, where milled adzuki bean flour is mixed with 5-10 volumes of soft water to form a slurry in a chilled mix tank (2° C.-8° C.). The pH of the slurry is adjusted with a food-grade 50% NaOH solution to reach pH 7 for solublization of target protein into the aqueous solution. The slurry is then sent to a solid/liquid separation unit operation (typically a combination of one decanter and one disc-stack centrifuge), and the solubilized protein extract is separated from the fibrous starch fraction of the flour.

Optionally, the protein extract is pumped to pass through a food-grade charcoal filled annular basket column (at <5% charcoal to protein extract ratio, w/w) at 4° C. The primary function of this carbon adsorption step is to remove non-protein, off-flavor components (such as beany flavor) in the protein extraction. It also removes some fibrous solids and therefore leads to a clarified protein extract.

The clarified protein extract is acidified with a 20% food-grade citric acid solution to reach its isoelectric point (pH 5.6) under a Cryo condition (2° C.). Under this condition, the target protein precipitates and becomes separable from the aqueous solution. In addition to the pH adjustment, 2 mM of food-grade EDTA is added during this step to inhibit lipoxygenases activities that may incur off-flavor compounds generation. The precipitated protein slurry is then sent to a solid/liquid separation unit operation (typically one disc-stack centrifuge), and the protein curd is recovered in the heavy phase of the centrifuge step.

The protein curd is then washed with 4 volumes of soft water during the washing step under a Cryo condition (2° C.). Washing is regarded as a polishing step to remove impurities (e.g. fibrous solids, salts, carbohydrates) in the protein curd. In this step, 0.3% (w/w) food-grade sodium chloride is typically added to facilitate solid/liquid separation during centrifugation.

The washed protein curd solution is then pasteurized through a High Temperature/Short Time (HTST) pasteurization step. Similar to milk pasteurization, the primary function of this step is to kill any pathogenic bacteria that may be present in the washed protein curd solution. An exemplary HTST condition is 74° C. for 20-23 seconds.

The final step in the processing is spray drying, where the pasteurized protein solution is passed through a spray dryer to remove the water content. A typical spray drying condition has a dryer inlet temperature of 170° C., and a dryer outlet temperature of 72° C. The dried protein isolate powder typically has <5% moisture content.

7.4 Example 4: Egg-Like Patty

A representative formulation of an egg-like patty includes: water (75-85%); adzuki bean protein isolate (10-15%); oil (5-10%); hydrocolloid (0.1-3%) (which includes either one of the following combinations: (1) high-acyl & low-acyl gellan gum; (2) iota-carrageenan & gum arabic; (3) konjac & xanthan gum); starches (0.1-6%); flavors (1-2%); and salt (<1%). The emulsion mixture is at pH 5.6-6.8.

High purity isolates from adzuki bean are rehydrated to 80% moisture content and adjusted to pH 6.0 with 1M NaOH. Emulsion of plant protein isolate, oil, hydrocolloid, salt and other ingredients were prepared using a Pro Scientific shear mixer operated at 5000 rpm for 4 min at room temperature. Emulsion is deposited in round molds (3 in diameter), and the amount deposited per mold is 50 g. Convection oven is set at 220° F. for 55 min.

Adzuki bean protein isolate was prepared in accordance with the procedure described in Example 2. Yield by wet mass was 37% and moisture was 85.67%.

The adzuki bean isolate was formulated into a vegan patty using the egg-free patty representative formulation described in Example 4 using gellan gum (FIG. 4). Trace minerals were added.

The purified mung bean protein isolate was prepared in parallel and used as a positive control. In the patty system, adzuki behaved similarly to mung bean but with a creamier and smoother mouthfeel. The vegan patty made with adzuki was relatively neutral in flavor but with a slightly beanier taste than mung bean control.

Instrumental texture profile parameters were measured using a Brookfield Texture Analyzer. Results are presented below in Table 4.

TABLE 4

Texture analysis profile (mean value, n = 3)

| Sample ID | Mung bean | Adzuki bean |
|---|---|---|
| Moisture content (%) | 77.09% | 85.67% |
| Hardness cycle 1 (g) | 2362.2 | 882.67 |
| Hardness cycle 2 (g) | 21.47 | 8.44 |
| Cohesiveness | 0.26 | 0.27 |
| Springiness (mm) | 4.98 | 5.03 |
| Springiness index | 0.74 | 0.75 |
| Chewiness (mJ) | 30.77 | 11.79 |

7.5 Example 5: Particle Size Distribution

The efficiency of seed milling is reflected in the particle size distribution of the flours, and influences the composition of isolated materials and their functionality. Particle size of adzuki bean flours was characterized using Mastersizer AeroS (Malvern). The flour particle size distribution was analyzed and the size mode, $10^{th}$ (Size.quartile.10), $50^{th}$ (Size.quartile.50) and $90^{th}$ (Size.quartile.90) percentile values are provided in Table 5 below. Materials used for isolation showed particle size distribution in a range of ~9-190

TABLE 5

| Size Mode | Size.quartile.10 (µm) | Size.quartile.50 (µm) | Size.quartile.90 (µm) | Size.median.abs.dev (µm) |
|---|---|---|---|---|
| 144 | 9.86 | 58.90 | 186 | 28.66 |

7.6 Example 6: Protein Composition of Adzuki Bean Protein Isolates

Molecular analyses of adzuki bean protein isolates prepared in accordance with the methods described herein were undertaken to determine their compositional make-up. Table 6 provides a proximate analysis of protein, carbohydrate, fat, moisture and ash content in adzuki bean protein isolate prepared in accordance with the methods described herein, compared to the starting material, adzuki bean flour. Protein content was determined using the Dumas method of total nitrogen quantitation and a correction factor of 6.25.

TABLE 6

| Sample | Protein (%) | Carbohydrates (%) | Fats (%) | Moisture (%) | Ash (%) |
|---|---|---|---|---|---|
| Adzuki bean flour | 24.1 | 59.6 | 1.53 | 11.4 | 3.41 |
| Adzuki bean protein isolate | 29 | 0.25 | 0.41 | 69.1 | 1.24 |

The identity of proteins from the adzuki bean isolate was investigated by two-dimensional-liquid chromatography-tandem mass spectrometry (2D-LC-MS/MS). Raw MS/MS spectra were searched against the *Vigna angularis* genome (legumeinfo.org/organism/*Vigna/angularis*) and a decoy sequence database. 564 Proteins in total were identified. Spectrum counting was used to calculate the relative amount of each protein in reference to the total protein amount. Table 7 provides the predicted identities and relative abundance of proteins whose abundance was >1% of total protein in the sample (6 proteins representing ~57% of the total proteins).

TABLE 7

| SEQ ID | Spectrum count | relative abundance (%) | Unique Peptide | Protein Coverage | Accession | Predicted function/ Putative protein | MW |
|---|---|---|---|---|---|---|---|
| SEQ ID NO: 1 | 5711 | 27.79 | 10 | 0.21 | Vang06g13860.1 | Glycinin, putative/ 11-S seed storage protein | 56.6 |
| SEQ ID NO: 2 | 4378 | 21.30 | 9 | 0.20 | Vang06g05170.1 | beta-conglycinin, beta chain-like/ allergen gly M Bd 28 kDa protein | 46.2 |
| SEQ ID NO: 3 | 778 | 3.79 | 13 | 0.25 | Vang03g11940.2 | basic 7S globulin-like | 46.1 |
| SEQ ID NO: 4 | 420 | 2.04 | 20 | 0.32 | Vang0032ss01820.1 | NAD+:PROTEIN (ADP-ribosyl)-transferase | 87 |
| SEQ ID NO: 5 | 297 | 1.45 | 22 | 0.35 | Vang02g13530.1 | formate dehydrogenase | 80.7 |
| SEQ ID NO: 6 | 224 | 1.09 | 19 | 0.35 | Vang0053ss00110.1 | GTP-binding elongation factor Tu family protein | 54.1 |

The protein profile of the isolate was also assessed via capillary gel electrophoresis using the Perkin Elmer LabChip GXII Touch HT system. As shown in FIG. 5, the sample chromatogram consist of 16 different peaks, with a major family of proteins having molecular weights between 45-70 kDa, which overlaps with a molecular weight range of the most abundant proteins determined by 2D-LC-MS/MS.

7.7 Example 7: Thermal Stability

Adzuki bean protein isolate samples were run on a Malvern MicroCal VP Capillary Differential Scanning calorimeter (DSC) with autosampler at a scan rate of 4° C./min from 4 to 100° C. Samples were resuspended in 100 mM Hepes, pH 8.6 and diluted to 0.5 mg/ml as determined by Pierce660™ in 10 mM Na2HPO4-NaH2PO4, pH 8.0 buffer. Melting temperatures were determined by the Malvern MicroCal VP Capillary MicroCal Origin 7 software routine using automatic buffer subtraction and automatic baseline arguments. As indicated in FIG. 6, the thermal denaturation temperature for the adzuki bean protein isolate is 81.2° C.

7.8 Example 8: Characterization of Solubility and Turbidity Studies

Solubility of adzuki bean isolates was measured using the technique of nephelometry. Nephelometry measures the amount of light scattered within a liquid sample, and quantifies the turbidity with high sensitivity. A NEPHELOstar Plus plate reader (BMG Labtech) was used to perform solubility measurements in a 96 well plate based format. The NEPHELOstar uses a polarized helium-neon laser at 632.8 nm. The nephelometer settings that were used include a beam focus of 2.5 mm and intensity of 10%. Orbital averaging was used, with a diameter of 3 mm. The measurement time per well was 0.26 s with a positioning delay (settling time) of 0.1 s. Before measurement each plate was subject to 10 s of double-orbital shaking at 500 rpm to homogenize the sample solutions within the wells. Solubility measurements were performed at room temperature. Clear, flat bottom 96 Well Greiner Microplates were used. Solubility of the adzuki bean isolate was studied under various solvent conditions, including at pH 3, 5, and 7 as well as in the presence of 0, 0.4, 0.8, and 1 wt % NaCl. Citrate and disodium phosphate buffers were used to control the pH of the aqueous fractions. A concentration gradient of isolate ranging from 0-8.9 wt % protein was used to determine the protein solubility at all 12 solvent conditions (3 pHs×4 NaCl concentrations). Each measurement was run in triplicate to ensure reproducibility.

Solubility was determined by performing a linear fit of the data of Relative Nephelometer Units (RNUs) versus protein concentration. Two lines were fit and the linear regression was optimized to obtain two lines of best fit for the increase in RNU that occurs as protein concentration increases. The solubility value was determined to be the protein concentration at which these two lines intersected one another. Data provided in FIGS. 7, 8 and 9 corresponds to these values of solubility.

7.9 Example 9: Characterization of Foam Stability

Foam stability measurements were performed on a Dynamic Foam Analyzer (DFA100) instrument from Krüss. Three measurement modes were used to collect the maximal amount of information on foam stability: foam and liquid level height (measured via light scattering), structure (measured via image analysis of time lapse images of foam), and liquid content (measured via conductivity measured along a string of electrodes placed at different heights throughout the sample). Advance software was used for data analysis. The following instrument settings were used: air flow rate of 0.2 L/min, with light illumination of 40% for height measurements and light illumination of 75% for structure measurements. 45 mL of aqueous protein solution was used and twice that volume (90 mL) of air was mechanically purged through the liquid. Air was passed through a 16-40 um sintered glass frit in the DFA100. The stability of the foam was evaluated over a time period of 10 minutes, which began immediately after the purging of air through the sample. A data sampling interval of 6 frames per minute (fpm), resulting in 60 images that were analyzed for bubble structure. The camera was positioned at a height of 55 mm above the bottom of the measurement vessel.

Aqueous protein samples were prepared under various solvent conditions, including at pH 3, 5, and 7 and protein concentrations of 4.2 and 8.9 wt % protein. Citrate and disodium phosphate buffers were used to control the pH of the aqueous fractions. Each sample was run in triplicate.

The stability of the foam was calculated as the foam index. It is a measure of the maximum foam height and the decay of the foam height over time. The total height of the foam and solution was integrated in time from the end of the air purge until the end of the experiment (10 minutes). This integration incorporates the effects of both the maximum foaming capacity (as described by the maximum height) and the stability (determined by the loss in height of the foam and solution). A high foam index indicates a well-performing material for foaming. Data in FIG. 10 reports the foam quality of Adzuki Bean Isolates and several reference materials.

7.10 Example 10: Characterization of Emulsion Stability

Emulsion stability measurements were performed on oil in water emulsions containing adzuki bean protein isolate in order to study the emulsification properties of the isolates. First, aqueous solutions of isolate under various solvent conditions were prepared. Final protein concentrations in the emulsions were 4.2 and 8.9 wt % protein, and aqueous fractions were prepared at pH 3, 5, and 7 as well as in the absence and presence of NaCl (1 wt %). Citrate and disodium phosphate buffers were used to control the pH of the aqueous fractions. Aqueous solutions were mixed by vortexing at high speed for about 10 seconds. Canola oil was added at a mass ratio of ⅓ of the total volume via serological pipette and vortexed at high speed for 10 seconds. The total volume (about 15 mL) was homogenized at 5000 rpm using a 20 mm saw tooth probe with a Pro Scientific PRO25D homogenizer for 4 minutes. The emulsion was then distributed into 4 mL glass vials using a positive displacement pipette, dispensing 3 mL of sample per glass vial. Each sample was run in triplicate. Directly prior to measurement the sample was homogenized for 4 min at 5000 rpm using a 7 mm diameter saw tooth prive with the Pro Scientific PRO25D homogenizer.

A Formulaction Turbiscan Lab instrument was used to study emulsion stability. This instrument uses light scattering to characterize phase separation within an emulsion. Raw data collected by the instrument includes values of transmittance and backscattering as a function of the height of the sample and time. Each sample was measured over a period of 10 minutes, with the backscattering of incident light on the sample measured at an interval of 25 s.

Backscattering data from Turbiscan measurements was processed in order to evaluate overall emulsion stability as a function of time. Backscattering (BS) at the final time point of 10 minutes was examined after subtracting a baseline of backscattering measured at time point 0 minutes (Equation 1). This change in backscattering (ABS) at 10 minutes over the entire height of the sample was used to extract an index of emulsion stability, referred to as the Stability index (SI) (Equation 2, FIG. 11). The stability index is essentially the area under the curve of ABS versus height, and is defined by the equations shown below.

$$\Delta BS_{h,t} = BS_{h,t} - BS_{h,0} \quad (1)$$

$$SI = \frac{\sum_{h=0}^{H} |\Delta BS_{h,t} - \Delta BS_{h,t-1}|}{H} + SI_{t-1} \quad (2)$$

The higher the stability index, the less stable the emulsion. Lower stability indices indicate higher emulsion stability.

7.11 Example 11: Gelation: Structure Building Properties and Study of Effect of Increasing Temperature Gelation of high purity protein isolates of adzuki bean were characterized with dynamic oscillatory rheology. A discovery hybrid rheometer (DHR-1, TA Instruments) equipped with a flat parallel plate geometry (40 mm diameter) was used to monitor the material's viscoelastic properties as a result of increasing temperature. Samples were prepared at 16.7% protein concentration at pH values of 3, 5, and 7 and in the absence and presence of sodium chloride (1 wt %). Citrate and disodium phosphate buffers were used to control the pH of the aqueous fractions. About 1.7 mL of sample was loaded onto the lower plate of the rheometer and was trimmed according to standard procedures. A solvent trap was loaded with 1 mL of distilled $H_2O$ to prevent evaporation of water within the sample as a result of the increase in temperature during the measurement.

The storage (G') and loss (G") modulus were continuously recorded during a temperature ramp from 30 to 95° C. at a heating rate of 2° C./min under small deformation conditions (0.1% strain) at a constant angular frequency of 10 rad/s followed by a 5 minute hold at 95° C. After this hold, the temperature of the material was reduced to 50° C. and an amplitude sweep test from 0.01 to 100% strain was carried out at a constant frequency of 10 rad/s in order to characterize the gelled material's linear viscoelastic region. Each sample was run in triplicate.

Rheology data was analyzed to extract certain features which are pertinent to characterizing the behavior of gels produced by the isolate under the conditions defined above. For simplicity, three such features will be discussed herein: onset gelation temperature, gel strength, and gel elasticity.

Onset gelation temperature was extracted from the raw data and interpreted as the inflection point of the phase angle versus temperature over the range examined. Upon gelation events the phase angle decreases markedly as a function of temperature and can be used as a precise measure of the temperature at which the material underwent a distinct transition in its internal structure. See FIG. 12.

Gel strength was extracted from the raw data and defined as the oscillation strain (%) at which the storage modulus exceeded the linear viscoelastic range as a function of oscillation strain. Gel elasticity was likewise extracted from the raw data of the storage modulus versus oscillation strain, and was defined as the stress (Pa) at which the storage modulus exceeded the linear viscoelastic range as a function of oscillation strain. See FIG. 13.

7.12 Example 12: Viscosity: Flow Properties of Isolates from Adzuki Bean

Viscosity measurements were performed on a TA Instruments DHR-1 rheometer. Samples were prepared at 16.7% protein concentration at pH values of 3, 5, and 7 and in the absence and presence of sodium chloride (1 wt %). Citrate and disodium phosphate buffers were used to control the pH of the aqueous fractions. A flat parallel plate geometry was used for these rheological measurements. About 1.7 mL of sample was loaded onto the lower plate of the rheometer and was trimmed according to standard procedures.

The procedure used for the measurement of viscoelastic properties of the isolate consisted of a preshear step at 0.1 l/s for 30 seconds followed by an increasing flow ramp at 25° C. for a duration of 100 s varying the shear rate from 0.1 to 50 l/s and then a decreasing flow ramp at the same temperature and for the same duration decreasing the shear rate from 50 to 0.1 l/s. Each sample was run in triplicate.

A spline smoothed model was fit to viscosity as a function of shear rate for each of the two flow ramps (increasing and decreasing strain rate). Viscosity at zero shear rate was then extracted by extrapolating the spline model of the increasing flow ramp to zero shear rate. See FIG. 14. For extracting the yield stress, another linear model was fit to shear stress as a function of shear rate for each of the two flow ramps. The yield stress shown in FIG. 15 is the intercept of the fit line of the increasing flow ramp.

All publications, patents and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed:

1. A food or beverage composition comprising an egg substitute, the egg substitute comprising an isolated adzuki bean protein composition wherein:
   (a) the isolated adzuki bean protein composition comprises
   an adzuki bean protein content of at least 60% by weight;
   a globulin protein content of at least 50% by weight of the plant protein, wherein the globulin protein comprises 11S globulin;
   one or more modulated organoleptic properties that differ from the otherwise unmodified source of the adzuki bean protein; and
   (b) a phosphate selected from the group consisting of disodium phosphate (DSP), sodium hexametaphosphate (SHMP), and tetrasodium pyrophosphate (TSPP);
   wherein the food or beverage composition is selected from the group consisting of an edible egg-free emulsion, egg analog, egg-free scrambled eggs, egg-free patty, egg-free pound cake, egg-free angel food cake, egg-free yellow cake, egg- and dairy-free cream cheese, egg-free pasta dough, egg-free custard, egg-free ice cream, and dairy-free milk, cream cheese, pasta dough, pasta, milk or milk-like beverage, a food product comprising said milk or milk-like beverage, custard, ice cream, frozen desert, meat replicas, deli meat replicas, emulsified extruded meats, sausages, fish cake replicas, dips, fillings, spreads, chips, and crackers; and wherein the isolated adzuki bean protein composition has a foam stability greater than egg white.

2. The food or beverage composition of claim 1, wherein the isolated adzuki bean protein composition has an isoelectric point from about pH 5.2 to about pH 6.0.

3. The food or beverage composition of claim 1, wherein the isolated adzuki bean protein composition has one or more functional properties selected from emulsification, water binding, foaming, gelation, crumb density, structure forming, texture building, cohesion/adhesion, elasticity/springiness, solubility, viscosity, fat absorption, flavor binding, coagulation, leavening, aeration, creaminess, film forming property, sheen/shine addition, freeze/thaw stability, and color.

4. The food or beverage composition of claim 1, wherein the isolated adzuki bean protein composition comprises a gel, a foam, an emulsion, or an aqueous solution.

5. The food or beverage composition of claim 1, wherein the isolated adzuki bean protein composition comprises greater than 75% adzuki bean protein.

6. The food or beverage composition of claim 1, wherein the isolated adzuki bean protein composition comprises at least 60% globulin protein.

7. The food or beverage composition of claim 1, wherein the globulin protein comprises 8S globulin.

8. The food or beverage composition of claim 1, wherein the globulin protein comprises 7S globulin.

9. The food or beverage composition of claim 1, wherein the isolated adzuki bean protein composition has been enriched in the adzuki bean protein in relation to the amount of protein found in the plant source of the adzuki bean protein.

10. The food or beverage composition of claim 9, wherein the enrichment is at least 5%, 10%, 15%, 20% or greater than 20%, in relation to the amount of protein found in the plant source of the isolated adzuki bean proteins.

11. The food or beverage composition of claim 1, wherein the isolated adzuki bean protein composition further comprises one or more compounds selected from the group consisting of allergens, anti-nutritional factors, and environmental contaminants that has been reduced in the adzuki bean composition in relation to the amount of the one or more compounds found in the plant source of the adzuki bean composition.

12. The food or beverage composition of claim 1, wherein the isolated adzuki bean protein composition further comprises one or more co-ingredients selected from the group consisting of a hydrocolloid, a gum, a phosphate, and transglutaminase.

13. The food or beverage composition of claim 1, wherein the isolated adzuki bean protein composition is produced by a method comprising:
  (a) extracting one or more adzuki bean proteins from a source of adzuki bean protein in an aqueous solution at a pH between about 6.5 and 10.0; and
  (b) precipitating the extracted adzuki bean protein at a pH in a range of pH 5.2 to pH 6.0.

14. The food or beverage composition of claim 1, wherein the isolated adzuki bean protein composition comprises 7.5% solid concentration (w/w).

15. A food or beverage composition comprising an egg substitute, the egg substitute comprising an isoelectric point precipitated adzuki bean protein composition wherein:
  (a) the isolated adzuki bean protein composition comprises
    an adzuki bean protein content of at least 60% by weight;
    a globulin-type protein content of at least 50% by weight of the plant protein,
    wherein the globulin protein comprises 11S globulin;
    one or more modulated organoleptic properties that differ from the otherwise unmodified source of the adzuki bean protein; and
  (b) a phosphate selected from the group consisting of disodium phosphate (DSP), sodium hexametaphosphate (SHMP), and tetrasodium pyrophosphate (TSPP);
  wherein the food or beverage composition is selected from the group consisting of an edible egg-free emulsion, egg analog, egg-free scrambled eggs, egg-free patty, egg-free pound cake, egg-free angel food cake, egg-free yellow cake, egg- and dairy-free cream cheese, egg-free pasta dough, egg-free custard, egg-free ice cream, and dairy-free milk, cream cheese, pasta dough, pasta, milk or milk-like beverage, a food product comprising said milk or milk-like beverage, custard, ice cream, frozen desert, meat replicas, deli meat replicas, emulsified extruded meats, sausages, fish cake replicas, dips, fillings, spreads, chips, and crackers; and
  wherein the isolated adzuki bean protein composition has a foam stability greater than egg white.

16. The food or beverage composition of claim 15, wherein the isolated adzuki bean protein composition has an isoelectric point from about pH 5.2 to about pH 6.0.

17. The food or beverage composition of claim 15, wherein the isolated adzuki bean protein composition has one or more functional properties selected from emulsification, water binding, foaming, gelation, crumb density, structure forming, texture building, cohesion/adhesion, elasticity/springiness, solubility, viscosity, fat absorption, flavor binding, coagulation, leavening, aeration, creaminess, film forming property, sheen/shine addition, freeze/thaw stability, and color.

18. The food or beverage composition of claim 15, wherein the isolated adzuki bean protein composition comprises a gel, a foam, an emulsion, or an aqueous solution.

19. The food or beverage composition of claim 15, wherein the isolated adzuki bean protein composition comprises greater than 75% adzuki bean protein.

20. The food or beverage composition of claim 15, wherein the isolated adzuki bean protein composition comprises at least 60% globulin protein.

21. The food or beverage composition of claim 15, wherein the globulin protein comprises 8S globulin.

22. The food or beverage composition of claim 15, wherein the globulin protein comprises 7S globulin.

23. The food or beverage composition of claim 15, wherein the isolated adzuki bean protein composition further comprises one or more co-ingredients selected from the group consisting of a hydrocolloid, a gum, a phosphate, and transglutaminase.

24. The food or beverage composition of claim 15, wherein the isolated adzuki bean protein composition comprises 7.5% solid concentration (w/w).

* * * * *